(12) United States Patent
Arai

(10) Patent No.: US 9,329,371 B2
(45) Date of Patent: May 3, 2016

(54) ZOOM LENS, OPTICAL APPARATUS AND METHOD OF MANUFACTURING ZOOM LENS

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/094,650

(22) Filed: Apr. 26, 2011

(65) Prior Publication Data

US 2011/0261469 A1 Oct. 27, 2011

(30) Foreign Application Priority Data

Apr. 27, 2010 (JP) ................................. 2010-102001
Apr. 27, 2010 (JP) ................................. 2010-102002

(51) Int. Cl.
*G02B 15/14* (2006.01)
*G02B 15/173* (2006.01)

(52) U.S. Cl.
CPC .................... *G02B 15/173* (2013.01)

(58) Field of Classification Search
USPC ................................................. 359/687, 686
See application file for complete search history.

(56) References Cited

U.S. PATENT DOCUMENTS

| 6,462,886 | B1 | 10/2002 | Hagimori |
| 6,867,925 | B1 | 3/2005 | Sato |
| 2003/0227691 | A1 | 12/2003 | Saruwatari |
| 2007/0183043 | A1 | 8/2007 | Bito et al. |
| 2007/0183058 | A1 | 8/2007 | Bito et al. |
| 2007/0188884 | A1 | 8/2007 | Yoshitsugu et al. |
| 2007/0242368 | A1 | 10/2007 | Itoh |
| 2008/0111909 | A1 | 5/2008 | Miyajima |
| 2008/0252993 | A1 | 10/2008 | Eguchi |
| 2009/0040604 | A1 | 2/2009 | Obu et al. |
| 2009/0059387 | A1 | 3/2009 | Wada |

(Continued)

FOREIGN PATENT DOCUMENTS

| CN | 101196610 A | 6/2008 |
| JP | 2000-347102 A | 12/2000 |

(Continued)

OTHER PUBLICATIONS

Partial European Search Report issued Dec. 15, 2011 in European Patent Application. No. 11163950.6.

(Continued)

*Primary Examiner* — Alicia M Harrington
(74) *Attorney, Agent, or Firm* — Shapiro, Gabor and Rosenberger, PLLC

(57) ABSTRACT

A zoom lens having, in order from an object: a first lens group G1 having positive refractive power; a second lens G2 group having negative refractive power; a third lens group G3 having positive refractive power; and a fourth lens group G4 having positive refractive power, wherein the first lens group moves toward an image once then moves toward the object upon zooming from a wide-angle end state to a telephoto end state, and the following conditional expressions are satisfied:

$0.050 < fw/TLw < 0.100$ $0.10 < ft/TLt < 0.80$ $0.10 < fw/LG2 < 0.64$ where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, and LG2 denotes a lens configuration length of the second lens group G2.

27 Claims, 42 Drawing Sheets

(56) References Cited

U.S. PATENT DOCUMENTS

| | | |
|---|---|---|
| 2009/0231726 A1 | 9/2009 | Nanba |
| 2009/0290216 A1* | 11/2009 | Fujisaki ................. 359/687 |
| 2009/0296230 A1 | 12/2009 | Sakai |
| 2009/0323198 A1 | 12/2009 | Kusaka |
| 2010/0033839 A1 | 2/2010 | Fujisaki |
| 2010/0149654 A1 | 6/2010 | Ookubo |

FOREIGN PATENT DOCUMENTS

| | | | |
|---|---|---|---|
| JP | 2004-012639 A | 1/2004 |
| JP | 2004-212512 A | 7/2004 |
| JP | 2006-308649 A | 11/2006 |
| JP | 2007-065513 A | 3/2007 |
| JP | 2007-072117 A | 3/2007 |
| JP | 2007-178846 A | 7/2007 |
| JP | 2007-271711 A | 10/2007 |
| JP | 2008-046347 A | 2/2008 |
| JP | 2008-064777 A | 3/2008 |
| JP | 2008-076513 A | 4/2008 |
| JP | 2008-122492 A | 5/2008 |
| JP | 2008-145501 A | 6/2008 |
| JP | 2009-080483 A | 4/2009 |
| JP | 2009-175736 | 8/2009 |
| JP | 2009-223008 A | 10/2009 |
| JP | 2009-282439 A | 12/2009 |
| JP | 2009-288618 A | 12/2009 |
| JP | 2010-039429 A | 2/2010 |

OTHER PUBLICATIONS

Extended European Search Report from European Patent Application No. 11163950.6, Aug. 3, 2012.

* cited by examiner

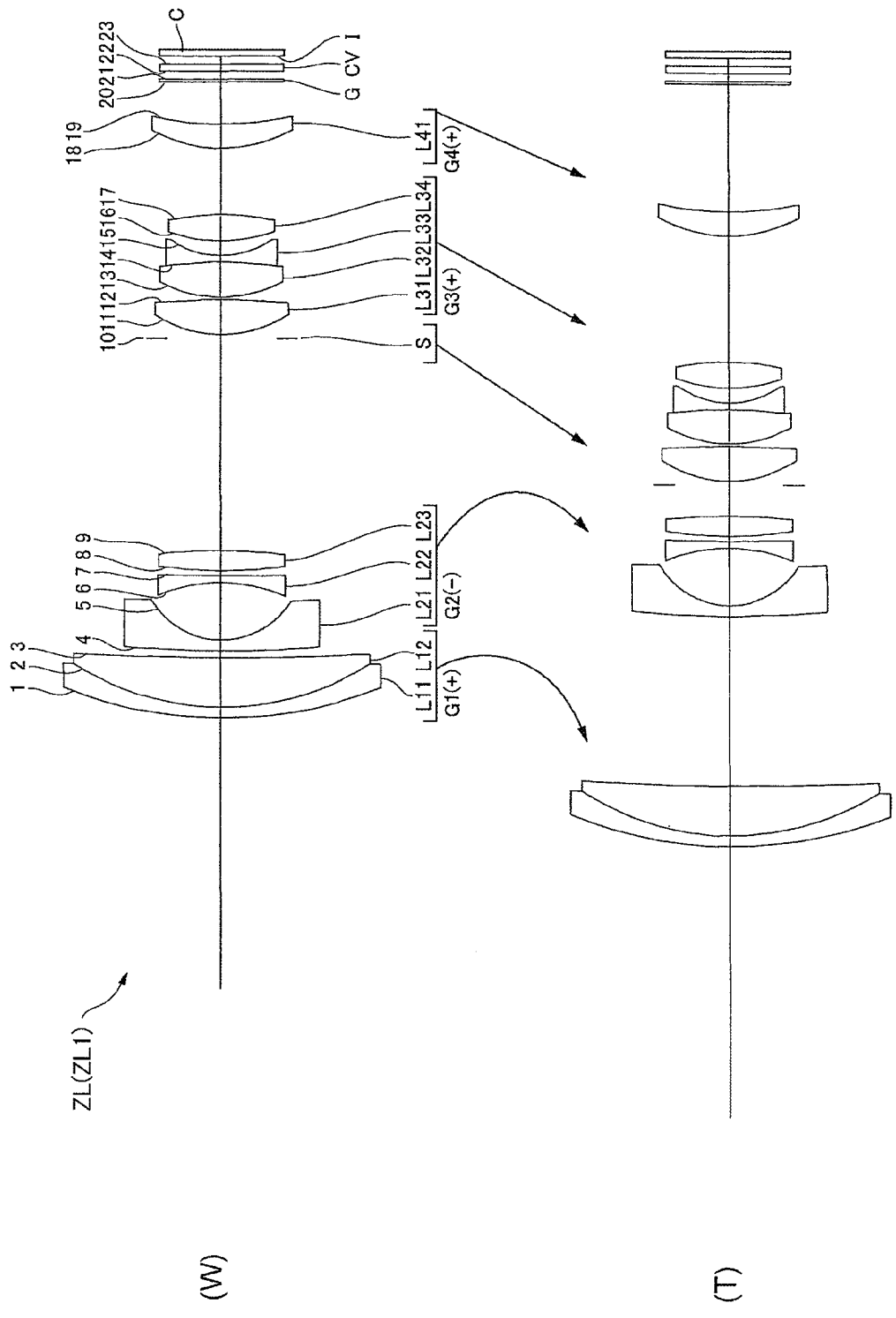

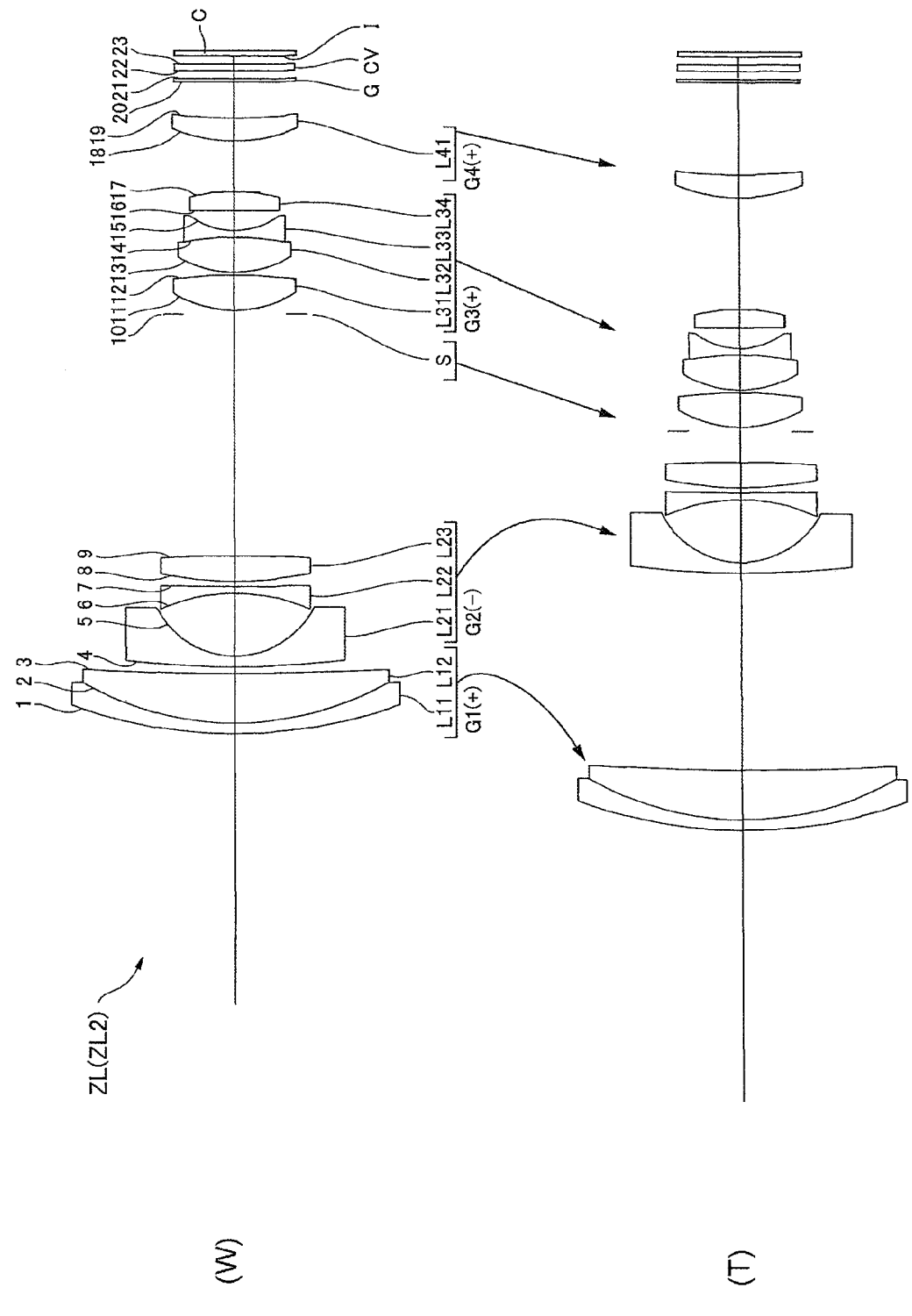

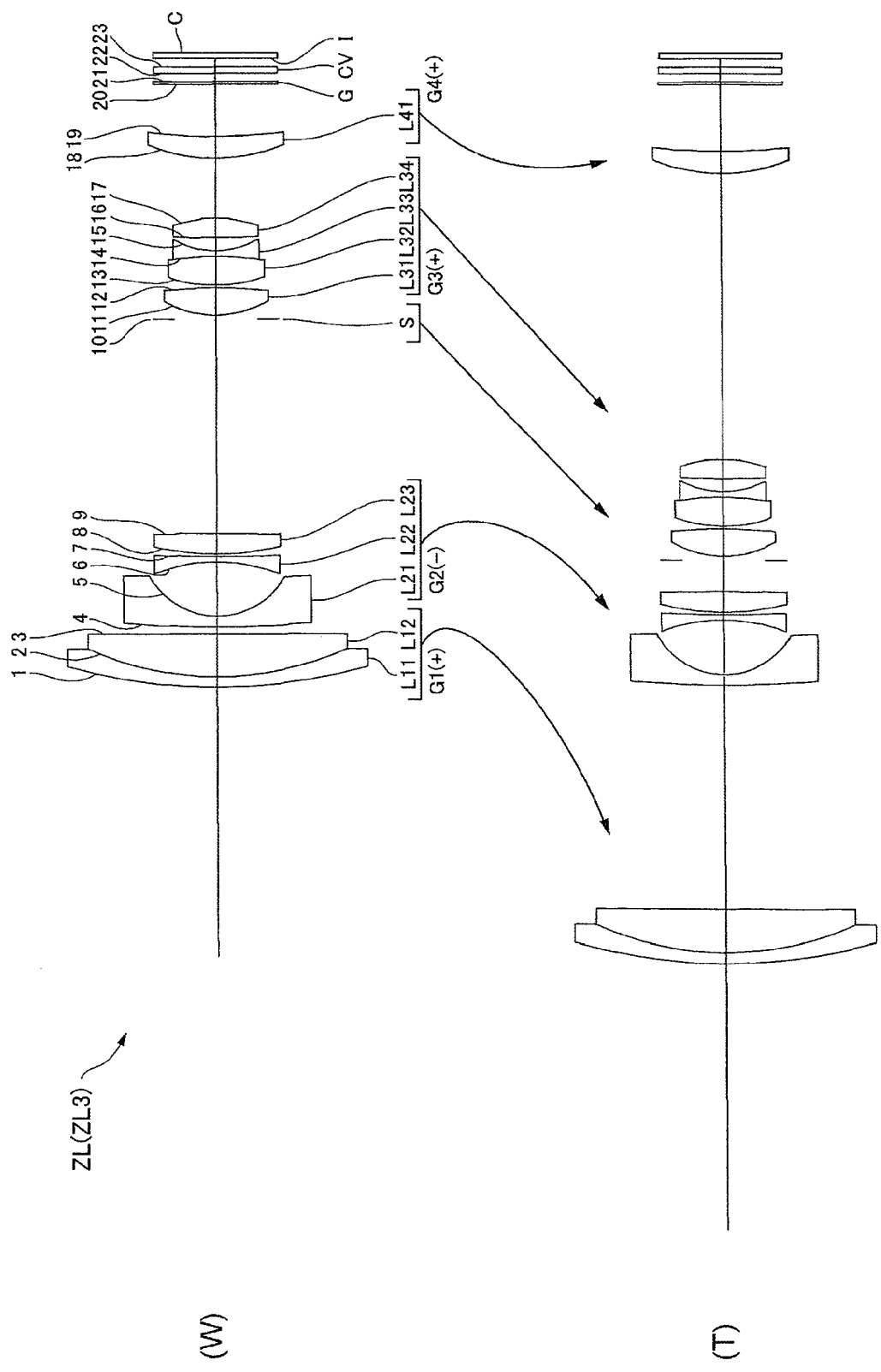

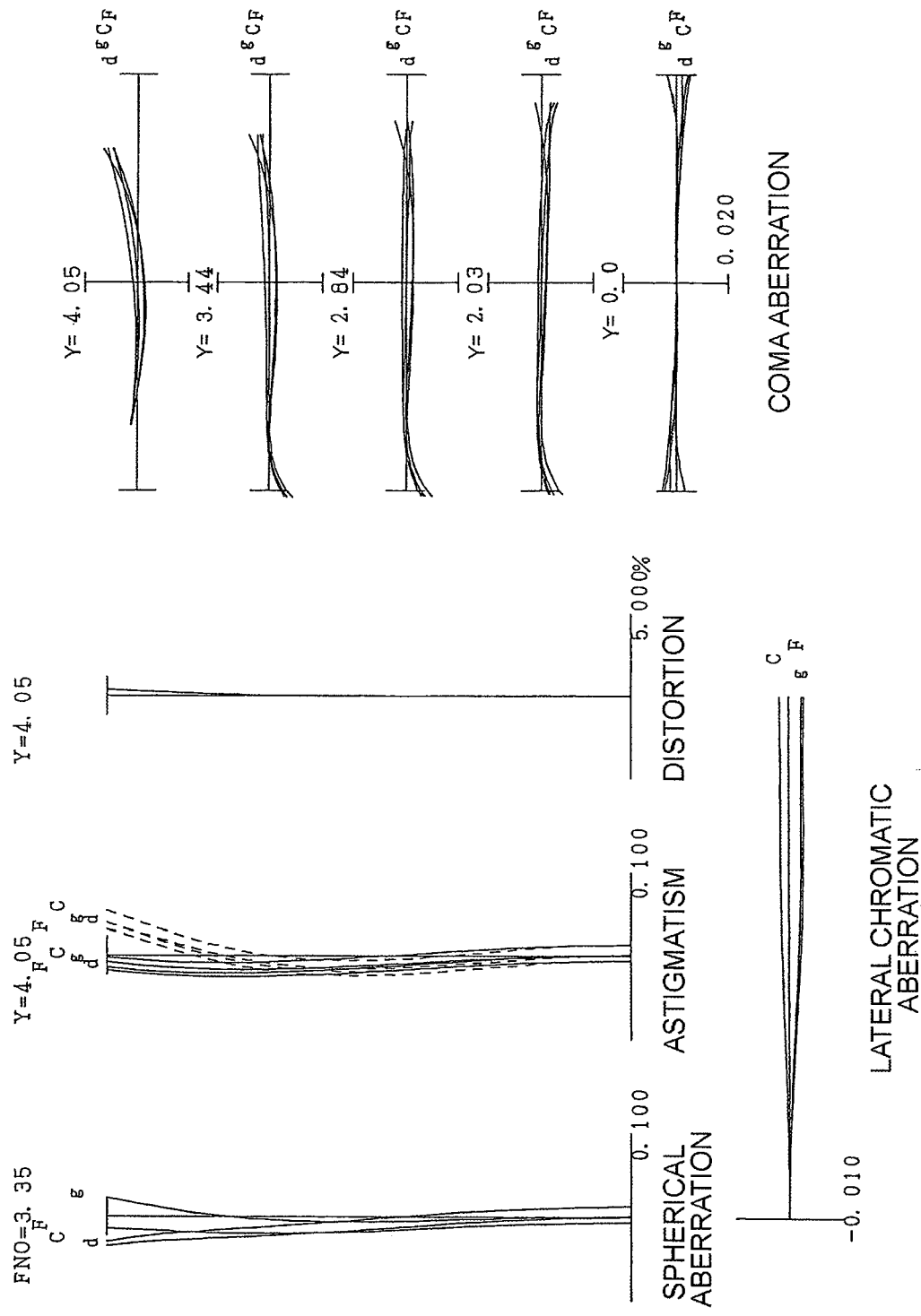

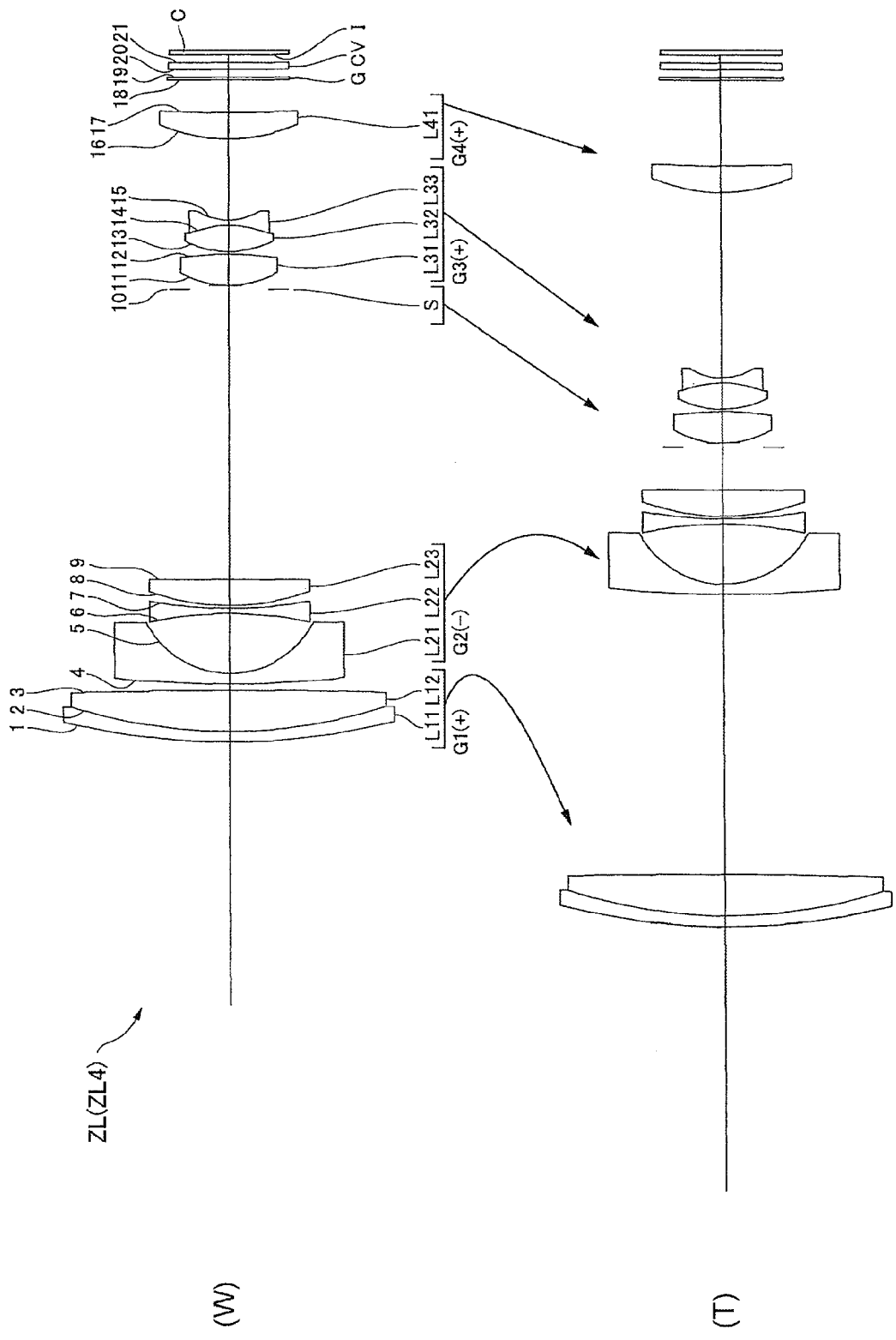

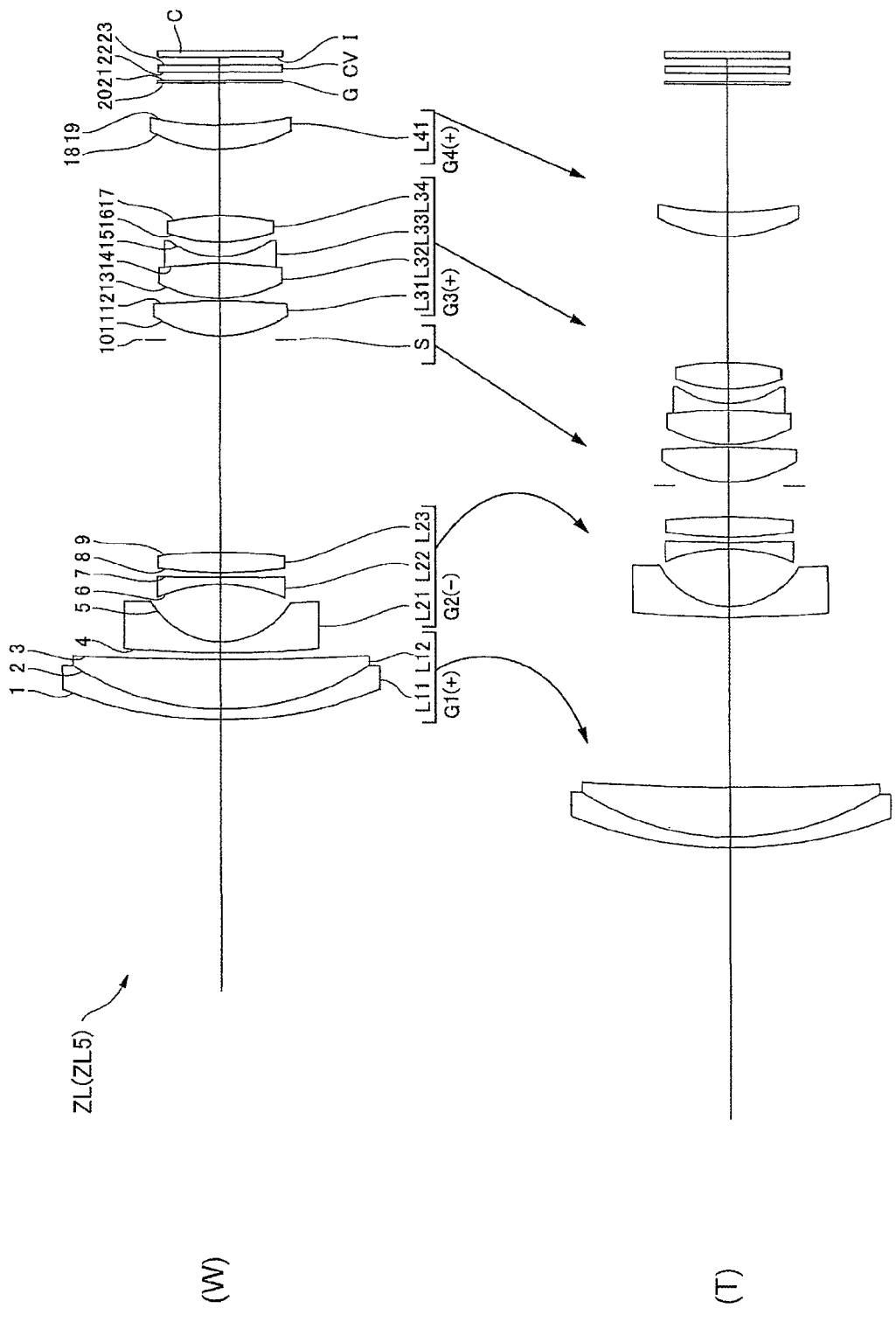

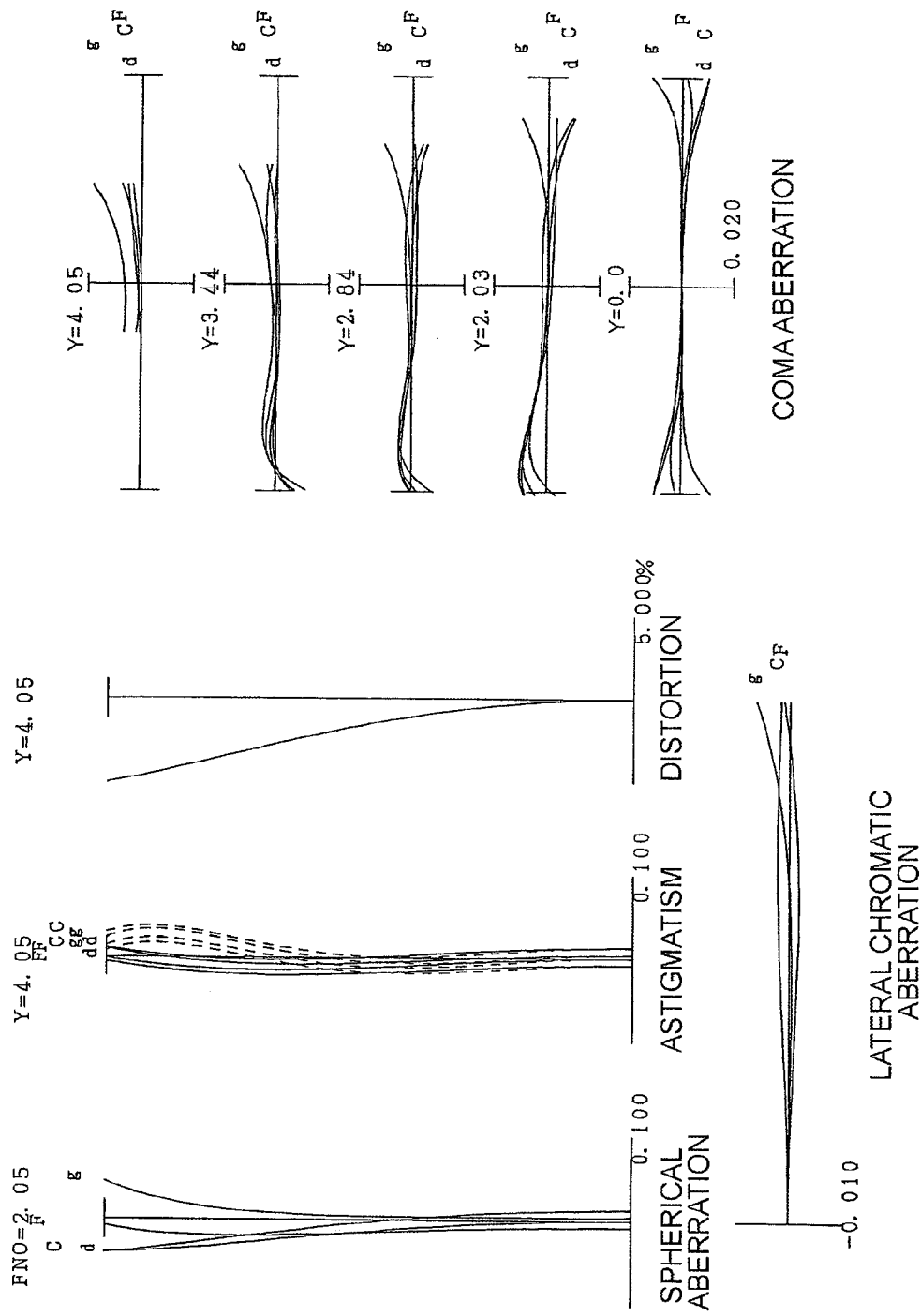

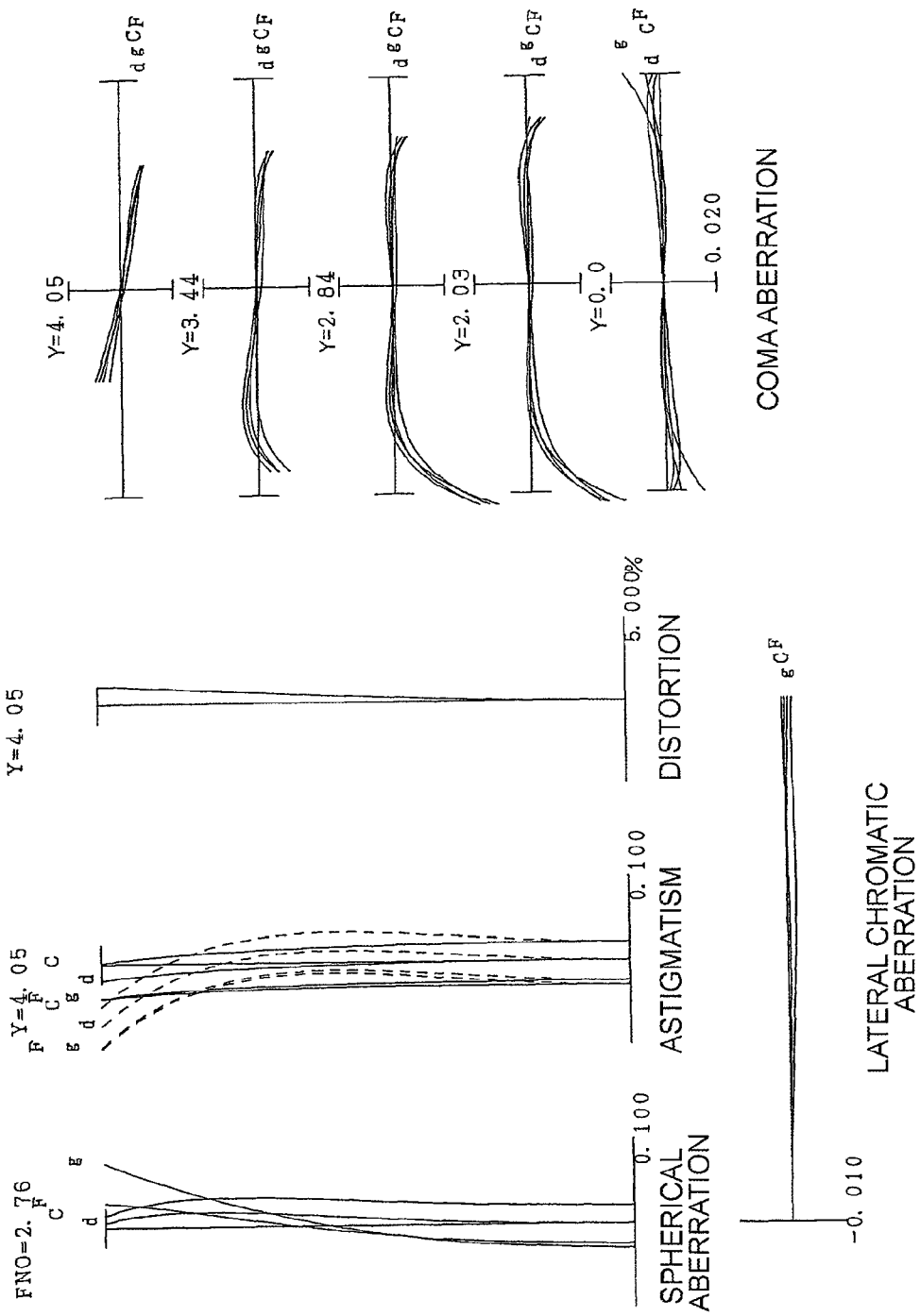

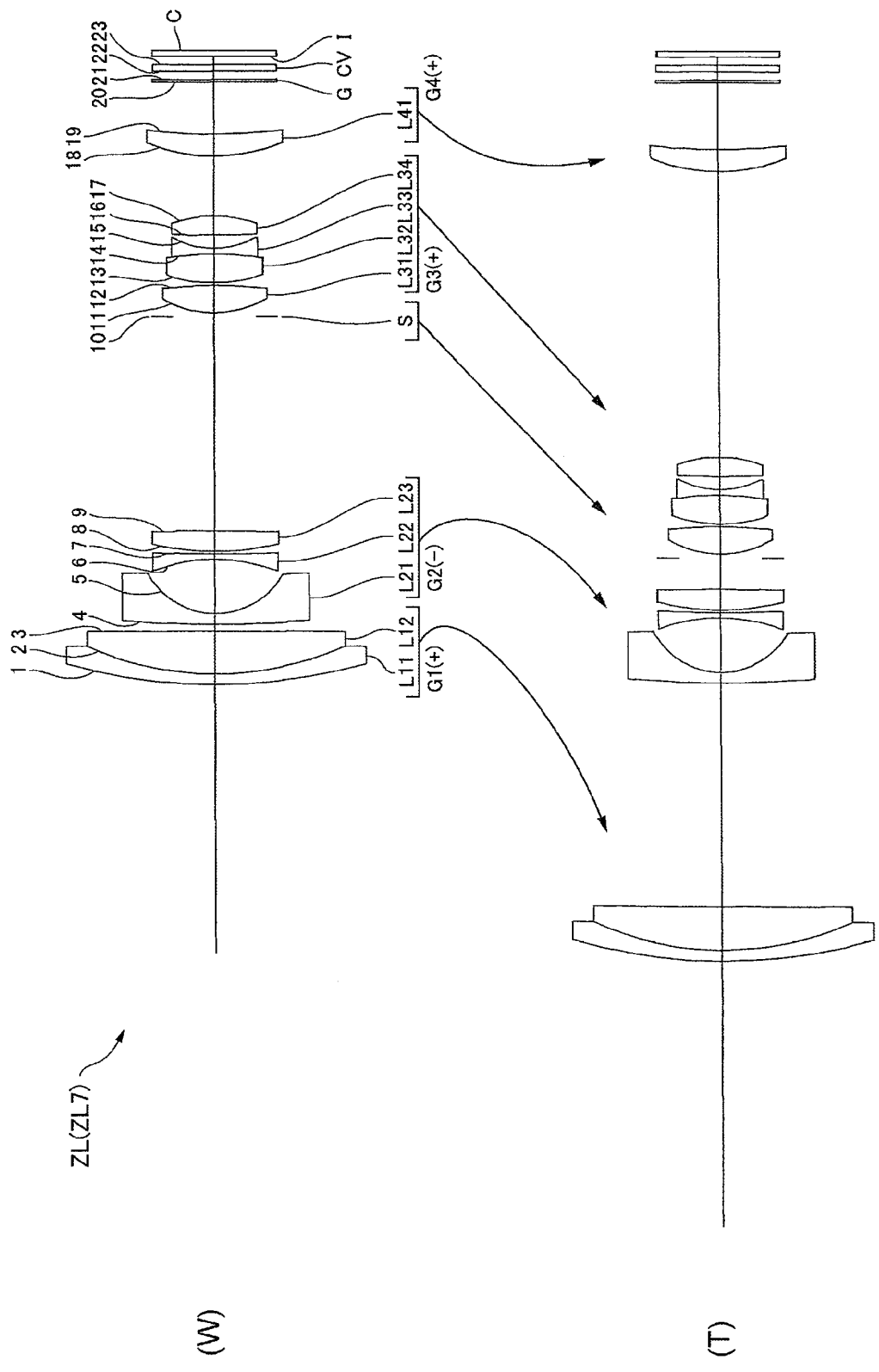

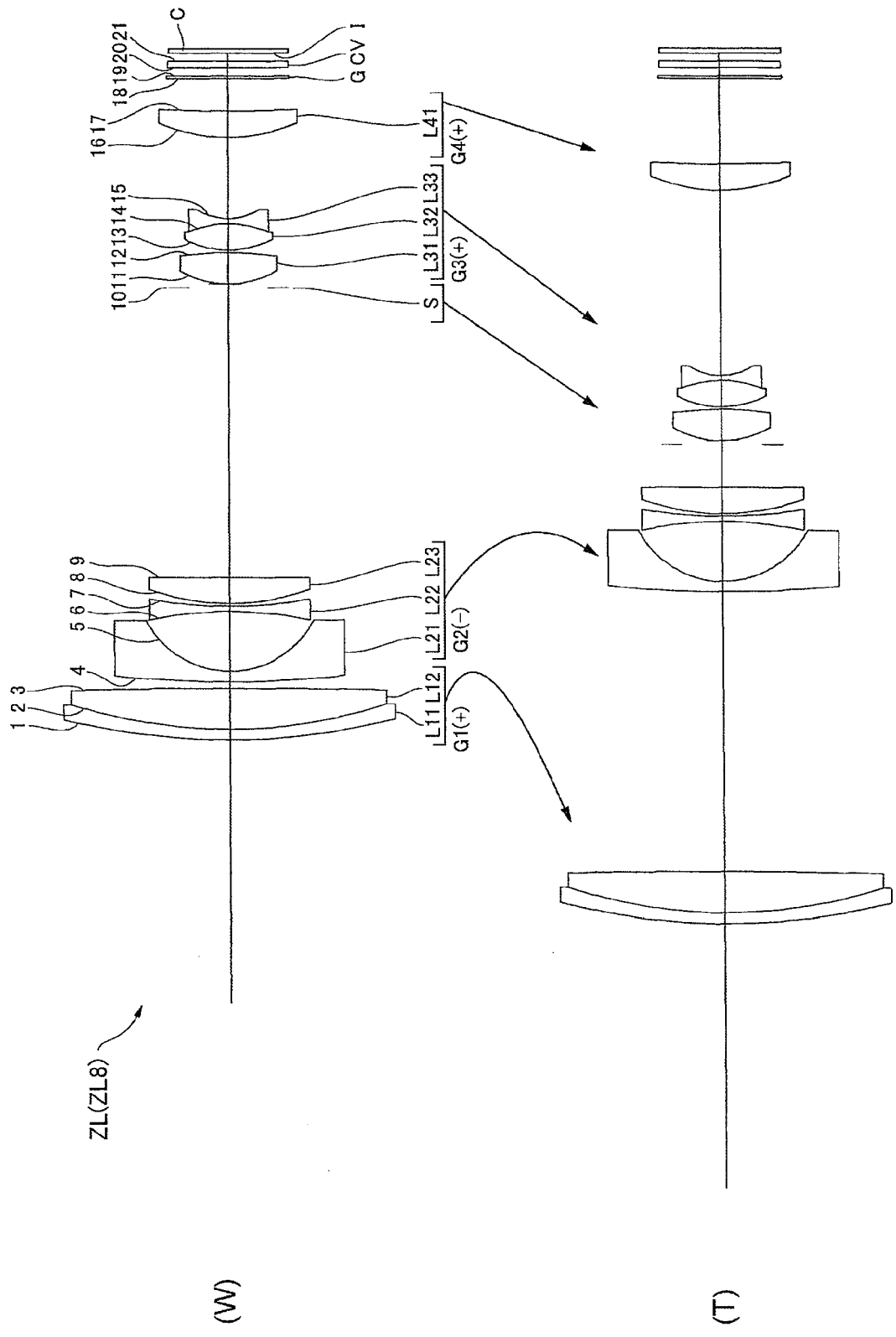

ZOOM LENS, OPTICAL APPARATUS AND METHOD OF MANUFACTURING ZOOM LENS

RELATED APPLICATIONS

This invention claims the benefit of Japanese Patent Applications Nos. 2010-102001 and 2010-102002 which are hereby incorporated by reference.

TECHNICAL FIELD

The present invention relates to a zoom lens, an optical apparatus and a method of manufacturing the zoom lens.

TECHNICAL BACKGROUND

Recently the portability of optical apparatuses, such as a digital still camera, is becoming important, and in order to implement smaller size, slimmer construction and lighter weight of a camera main unit, smaller size and lighter weight of a zoom lens, which is an image capturing lens, have been pursued. As one zoom lens to meet this demand, a zoom lens having, in order from an object, a first lens group having positive refractive power, a second lens group having negative refractive power, a third lens group having positive refractive power and a fourth lens group having positive refractive power, that is, a four-lens group type (positive, negative, positive, positive) zoom lens, has been disclosed (e.g. see Japanese Patent Application Laid-Open No. 2009-288618).

SUMMARY OF THE INVENTION

In the case of the conventional zoom lens, however, the angle of view in a wide-angle end state is in a standard range, therefore if an object at a close distance, a range where the user wants to capture an image extends outside of the angle of view. If the user cannot move away from the object in this case, the image height must be increased in order to widen the angle of view, which leads to an increase in the size of the entire optical system.

With the foregoing in view, it is an object of the present invention to provide a zoom lens which is suitable for a video camera and an electronic still camera using a solid-state image sensor or the like, and which has a wide angle of view in the wide-angle end state, is ultracompact, and generates high image quality, an optical apparatus including this zoom lens, and a method of manufacturing the zoom lens.

To achieve this object, the present invention is a zoom lens having, in order from an object: a first lens group having positive refractive power; a second lens group having negative refractive power; a third lens group having positive refractive power; and a fourth lens group having positive refractive power, wherein the first group moves toward an image once then moves toward the object, upon zooming from a wide-angle end state to a telephoto end state, and the following conditional expressions are satisfied:

$0.050 < fw/TLw < 0.100$ $0.10 < ft/TLt < 0.80$ $0.10 < fw/LG2 < 0.64$ where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, and LG2 denotes a lens configuration length of the second lens group.

In the present invention, it is preferable that the following conditional expression is satisfied:

$0.01 < fw/fG1 < 0.11$ where fG1 denotes a focal length of the first lens group.

In the present invention, it is preferable that the following conditional expression is satisfied:

$0.3 < ft/fG1 < 1.0$ where fG1 denotes a focal length of the first lens group.

In the present invention, it is preferable that the following conditional expression is satisfied:

$0.75 < fw/LG1 < 1.24$ where LG1 denotes a lens configuration length of the first lens group.

In the present invention, it is preferable that the following conditional expression is satisfied:

$1.25 < ft/fG3 < 4.00$ where fG3 is a focal length of the third lens group.

In the present invention, it is preferable that each of the first lens group, the second lens group, the third lens group and the fourth lens group moves, upon zooming from the wide-angle end state to the telephoto end state.

In the present invention, it is preferable that the first lens group is constituted only by a cemented lens.

In the present invention, it is preferable that the fourth lens group is constituted only by a single lens.

In the present invention, it is preferable that the fourth lens group has a positive lens, and the positive lens has a meniscus form.

In the present invention, it is preferable that the fourth lens group has a positive lens, and the positive lens has a meniscus form having a concave surface facing the image.

In the present invention, it is preferable that the fourth lens group has an aspherical surface.

In the present invention, it is preferable that the first lens group has, in order from the object, a negative lens and a positive lens.

In the present invention, it is preferable that focusing from an object at infinity to an object at close distance is performed by moving the fourth lens group in the optical axis direction.

An optical apparatus (e.g. a digital still camera CAM according to the present embodiment) has one of the above mentioned zoom lenses.

Another zoom lens according to the present invention is a zoom lens having a first lens group having positive refractive power; a second lens group having negative refractive power; a third lens group having positive refractive power; and a fourth lens group having positive refractive power, wherein the following conditional expressions are satisfied:

$0.75 < fw/LG1 < 1.24$ $0.10 < fw/LG2 < 0.64$ $1.25 < ft/fG3 < 4.00$ where fw denotes a focal length of the zoom lens in a wide-angle end state, ft denotes a focal length of the zoom lens in a telephoto end state, LG1 denotes a lens configuration length of the first lens group, LG2 denotes a lens configuration length of the second lens group, and fG3 denotes a focal length of the third lens group.

In the present invention, it is preferable that the following conditional expression is satisfied:

$$0.01 < fw/fG1 < 0.11$$

where fG1 denotes a focal length of the first lens group.

In the present invention, it is preferable that the following conditional expression is satisfied:

$$0.3 < ft/fG1 < 1.0$$

where fG1 denotes a focal length of the first lens group.

An optical apparatus (e.g. the digital still camera CAM according to the present embodiment) has one of the above mentioned zoom lenses.

A method of manufacturing a zoom lens according to the present invention is a method of manufacturing a zoom lens having, in order from an object: a first lens group having positive refractive power; a second lens group having negative refractive power; a third lens group having positive refractive power; and a fourth lens group having positive refractive power, wherein the first lens group moves toward an image once then moves toward the object, upon zooming from a wide-angle end state to a telephoto end state, and each lens is assembled in a lens barrel and operation is confirmed so that the following conditional expressions are satisfied:

$$0.050 < fw/TLw < 0.100$$

$$0.10 < ft/TLt < 0.80$$

$$0.10 < fw/LG2 < 0.64$$

where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, and LG2 denotes a lens configuration length of the second lens group.

In the method of manufacturing the zoom lens, it is preferable that the following conditional expression is satisfied:

$$0.01 < fw/fG1 < 0.11$$

where fG1 denotes a focal length of the first lens group.

In the method of manufacturing the zoom lens, it is preferable that the following conditional expression is satisfied:

$$0.3 < ft/fG1 < 1.0$$

where fG1 denotes a focal length of the first lens group.

In the method of manufacturing the zoom lens, it is preferable that the following conditional expression is satisfied:

$$0.75 < fw/LG1 < 1.24$$

where LG1 denotes a lens configuration length of the first lens group.

In the method of manufacturing the zoom lens, it is preferable that the following conditional expression is satisfied:

$$1.25 < ft/fG3 < 4.00$$

where fG3 is a focal length of the third lens group.

Another method of manufacturing a zoom lens according to the present invention is a method of manufacturing a zoom lens having, in order from an object: a first lens group having positive refractive power; a second lens group having negative refractive power; a third lens group having positive refractive power; and a fourth lens group having positive refractive power, wherein each lens is assembled in a lens barrel and operation is confirmed so that the following conditional expressions are satisfied:

$$0.75 < fw/LG1 < 1.24$$

$$0.10 < fw/LG2 < 0.64$$

$$1.25 < ft/fG3 < 4.00$$

where fw denotes a focal length of the zoom lens in a wide-angle end state, ft denotes a focal length of the zoom lens in a telephoto end state, LG1 denotes a lens configuration length of the first lens group, LG2 denotes a lens configuration length of the second lens group, and fG3 denotes a focal length of the third lens group.

In the method of manufacturing the zoom lens, it is preferable that the following conditional expression is satisfied:

$$0.01 < fw/fG1 < 0.11$$

where fG1 denotes a focal length of the first lens group.

In the method of manufacturing the zoom lens, it is preferable that the following conditional expression is satisfied:

$$0.3 < ft/fG1 < 1.0$$

where fG1 denotes a focal length of the first lens group.

According to the present invention, a zoom lens which is suitable for a video camera and an electronic still camera using a solid-state image sensor or the like, and which has a wide angle of view in the wide-angle end state, is ultracompact, and generates high image quality, an optical apparatus including this zoom lens, and a method of manufacturing the zoom lens, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration of a zoom lens according to Example 1, and a zoom locus of the zoom lens from a wide-angle end state (W) to a telephoto end state (T);

FIG. 4 is a diagram depicting a configuration of a zoom lens according to Example 2, and a zoom locus of the zoom lens from a wide-angle end state (W) to a telephoto end state (T);

FIG. 7 is a diagram depicting a configuration of a zoom lens according to Example 3, and a zoom locus of the zoom lens from a wide-angle end state (W) to a telephoto end state (T);

FIG. 10 is a diagram depicting a configuration of a zoom lens according to Example 4, and a zoom locus of the zoom lens from a wide-angle end state (W) to a telephoto end state (T);

FIG. 13 is a diagram depicting a configuration of a zoom lens according to Example 5, and a zoom locus of the zoom lens from a wide-angle end state (W) to a telephoto end state (T);

FIG. 19 is a diagram depicting a configuration of a zoom lens according to Example 7, and a zoom locus of the zoom lens from a wide-angle end state (W) to a telephoto end state (T);

FIG. 22 is a diagram depicting a configuration of a zoom lens according to Example 8, and a zoom locus of the zoom lens from a wide-angle end state (W) to a telephoto end state (T);

FIG. 25 is an external view of a digital camera according to the present embodiment, where

DESCRIPTION OF THE EMBODIMENTS

First Embodiments

Figure 2A:
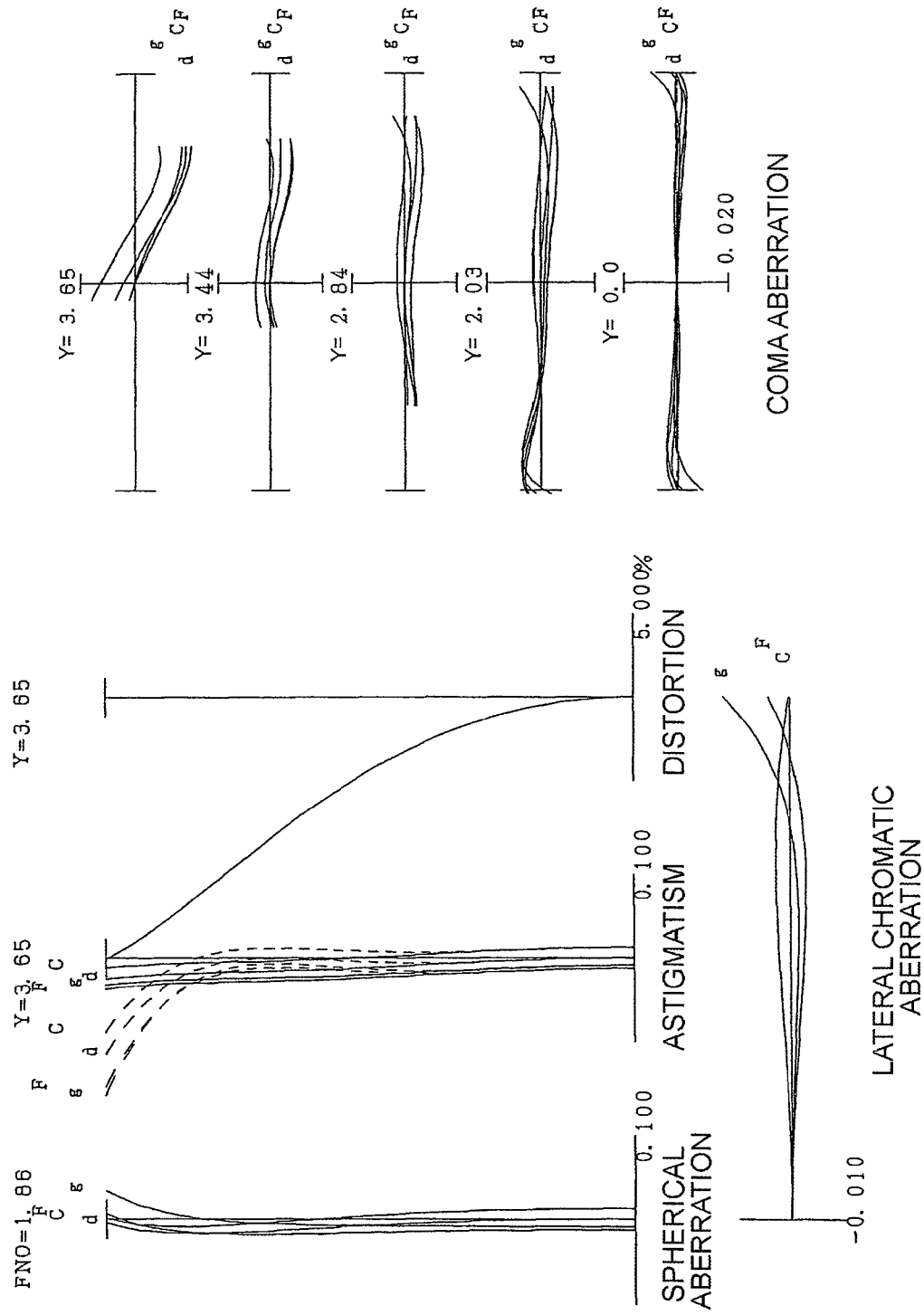
FIG. 2 are graphs showing various aberrations of the zoom lens according to Example 1, where FIG. 2A are graphs showing various aberrations of the zoom lens upon focusing on infinity in the wide-angle end state, and FIG. 2B are graphs showing various aberrations of the zoom lens upon focusing on infinity in the intermediate focal length state on the wide-angle end side.

A first embodiment will now be described with reference to FIG. 1 to FIG. 12. As FIG. 1 shows, a zoom lens according to the present embodiment is a zoom lens comprising, in order from an object, a first lens group G1 having positive refractive power, a second lens group G2 having negative refractive power, a third lens group G3 having positive refractive power, and a fourth lens group G4 having positive refractive power, wherein the first lens group moves toward an image once, then moves toward the object upon zooming from a wide-angle end state to a telephoto end state, and the following conditional expressions (1) to (3) are satisfied:

$$0.050 < fw/TLw < 0.100 \quad (1)$$

$$0.10 < ft/TLt < 0.80 \quad (2)$$

$$0.10 < fw/LG2 < 0.64 \quad (3)$$

where fw denotes a focal length of the zoom lens in a wide-angle end state, ft denotes a focal length of the zoom lens in a telephoto end state, TLw denotes a total lens length of the zoom lens in the wide-angle end state, TLt denotes a total lens length of the zoom lens in the telephoto end state, and LG2 denotes a lens configuration length of the second lens group G2.

In the zoom lens according to the present embodiment, the first lens group G1 moves toward the image once, and then moves toward the object (U turn) upon zooming from the wide-angle end state to the telephoto end state, as mentioned above. According to this configuration, the first lens group G1 can be moved close to the image in a zoom position near the wide-angle end, where the height of the abaxial ray becomes highest, and as a result, generation of an eclipse of a part of the abaxial ray can be prevented.

The conditional expression (1) specifies the relationship of the focal length of the zoom lens of the present embodiment in the wide-angle end state, and the total lens length in the wide angle end state. If the condition exceeds the upper limit value of the conditional expression (1), it becomes difficult to obtain a wide angle of view, which is not desirable. If the wide angle of view is satisfied, then the power of each lens group increases, and it becomes difficult to correct astigmatism throughout the entire zoom range, which is not desirable. If the condition is below the lower limit value of the conditional expression (1), on the other hand, the size of the entire optical system increases, which is not desirable. If downsizing is satisfied, then it becomes difficult to correct coma aberration in the wide-angle end state, which is not desirable.

To ensure the effect of the present embodiment, it is preferable that the upper limit value of the conditional expression (1) is 0.097. To further ensure the effect of the present embodiment, it is more preferable that the upper limit value of the conditional expression (1) is 0.095.

To also ensure the effect of the present embodiment, it is preferable that the lower limit value of the conditional expression (1) is 0.070. To further ensure the effect of the present embodiment, it is more preferable that the lower limit value of the conditional expression (1) is 0.075. To still further ensure the effect of the present embodiment, it is more preferable that the lower limit value of the conditional expression (1) is 0.080.

The conditional expression (2) specifies the relationship of the focal length of the zoom lens according to the present embodiment in the telephoto end state and the total lens length of the zoom lens in the telephoto end state. If the condition exceeds the upper limit value of the conditional expression (2), the moving distance of each lens group cannot be secured, therefore it becomes difficult to correct coma aberration throughout the entire zoom range, which is not desirable. If the condition is below the lower limit value of the conditional expression (2), on the other hand, it becomes difficult to secure a high zoom ratio, which is not desirable. It also becomes difficult to correct the longitudinal chromatic aberration in the telephoto end state, which is not desirable.

To ensure the effect of the present embodiment, it is preferable that the upper limit value of the conditional expression (2) is 0.40.

To also ensure the effect of the present embodiment, it is preferable that the lower limit value of the conditional expression (2) is 0.20. To further ensure the effect of the present embodiment, it is more preferable that the lower limit value of the conditional expression (2) is 0.25.

The conditional expression (3) specifies the relationship of the focal length of the zoom lens according to the present embodiment in the wide-angle end state and the lens configuration length of the second lens group G2. If the condition exceeds the upper limit value of the conditional expression (3), it becomes difficult to obtain a wide angle of view, which is not desirable. If the wide angle view is satisfied, then power of the second lens group G2 increases, and it becomes difficult to correct coma aberration throughout the entire zoom range, which is not desirable. If the conditional is below the lower limit value of conditional expression (3), on the other hand, the size of the second lens group G2 increases, and therefore the size of the entire camera increases, which is not desirable. Furthermore, it becomes difficult to correct astigmatism in the wide-angle end state, which is not desirable.

To ensure the effect of the present embodiment, it is preferable that the lower limit value of the conditional expression (3) is 0.30. To further ensure the effect of the present embodiment, it is more preferable that the lower limit value of the conditional expression (3) is 0.40. To still further ensure the effect of the present embodiment, it is even more preferable that the lower limit value of the conditional expression (3) is 0.50.

It is preferable that the zoom lens according to the present embodiment satisfies the following conditional expression (4):

$$0.01 < fw/fG1 < 0.11 \quad (4)$$

where fG1 denotes a focal length of the first lens group G1.

The conditional expression (4) specifies the relationship of the focal length of the zoom lens according to the present embodiment in the wide-angle end state and the focal length of the first lens group G1. If the condition exceeds the upper limit value of the conditional expression (4), it becomes difficult to obtain a wide angle of view, which is not desirable. If the wide angle of view is satisfied, then it becomes difficult to correct coma aberration in the telephoto end state, which is not desirable. If the conditional is below the lower limit value of the conditional expression (4), on the other hand, the size of the entire optical system increases, which is not desirable. If downsizing is satisfied, then it becomes difficult to correct spherical aberration in the telephoto end state, which is not desirable.

To ensure the effect of the present embodiment, it is preferable that the lower limit value of the conditional expression (4) is 0.03. To further ensure the effect of the present embodiment, it is more preferable that the lower limit value of the conditional expression (4) is 0.06.

It is preferable that the zoom lens according to the present embodiment satisfies the following conditional expression (5):

$$0.3 < ft/fG1 < 1.0 \quad (5)$$

where fG1 denotes a focal length of the first lens group G1.

The conditional expression (5) specifies the relationship of the focal length of the zoom lens according to the present embodiment in the telephoto end state and the focal length of the first lens group G1. If the condition exceeds the upper limit value of the conditional expression (5), it becomes difficult to correct coma aberration in the telephoto end state, which is not desirable. If the condition is below the lower limit value of the conditional expression (5), on the other hand, the size of the entire optical system increases, which is not desirable. If downsizing is satisfied, then it becomes difficult to correct spherical aberration in the telephoto end state, which is not desirable.

To ensure the effect of the present embodiment, it is preferable that the upper limit value of the conditional expression (5) is 0.70. To further ensure the effect of the present embodiment, it is more preferable that the upper limit value of the conditional expression (5) is 0.60.

In the zoom lens according to the present embodiment, it is preferable that, each of the first lens group G1, the second lens group G2, the third lens group G3 and the fourth lens group G4 moves upon zooming from the wide-angle end state to the telephoto end state. According to this configuration, the group distance of each group can be changed greatly, and a target zoom ratio can be obtained even if the total lens length is short. Since power of each lens group is not required to obtain the zoom ratio, the power of each lens group can be decreased, and coma aberration can be corrected well throughout the entire zoom range.

In the zoom lens according to the present embodiment, it is preferable that the first lens group G1 is constituted only by a cemented lens. According to this configuration, the distance between the first lens group G1 and the second lens group G2 in the telephoto end state can be decreased, and lateral chromatic aberration can be corrected well.

In the zoom lens according to the present embodiment, it is preferable that the fourth lens group G4 is constituted only by a single lens. According to this configuration, the lens length when retracted in the lens barrel can be decreased.

In the zoom lens according to the present embodiment, it is preferable that the fourth lens group G4 has a positive lens, and the positive lens has a meniscus form. According to this configuration, astigmatism can be corrected well.

In the zoom lens according to the present embodiment, it is preferable that the fourth lens group G4 has a positive lens, and the positive lens has a meniscus form having a concave surface facing the image. According to this configuration, astigmatism can be corrected well.

In the zoom lens according to the present embodiment, it is preferable that the fourth lens group G4 has an aspherical surface. According to this configuration, astigmatism can be corrected well.

In the zoom lens according to the present embodiment, it is preferable that the first lens group G1 has, in order from the object, a negative lens and a positive lens. According to this configuration, spherical aberration and lateral chromatic aberration in the telephoto end state can be corrected well.

In the zoom lens according to the present embodiment, it is preferable that focusing is performed from an object at infinity to an object at close distance by moving the fourth lens group G4 in the optical axis direction. According to this configuration, fluctuation of spherical aberration upon focusing on a close distance is decreased.

EXAMPLES IN THE FIRST EMBODIMENT

Each example (Example 1 to Example 4) of the first embodiment will now be described with reference to the drawings. Table 1 to Table 4 shown below are tables listing the values of data according to Example 1 to Example 4.

In [Lens Data] in each table, the surface number is a number of the lens surface counted from the object side along the traveling direction of rays, r is a radius of curvature of each lens surface, d is a surface distance, which is a distance from each optical surface to the next optical surface (or image plane) on the optical axis, nd is a refractive index at d-line (wavelength=587.6 nm), and νd is an Abbe number at d-line. "∞" in the radius of curvature indicates a plane or an aperture. The refractive index of air that is 1.000000 is omitted.

In [Aspherical Data] in each table, the shape of the aspherical surface shown in [Lens Data] is given by expression (a). Here X(y) denotes a distance from the tangential plane at a vertex of the aspherical surface to the position on the aspherical surface at height y along the optical axis, r denotes a radius of curvature (paraxial radius of curvature) of a reference spherical surface, k denotes a conical coefficient, and Ai denotes an aspherical coefficient in degree i. "E-n" indicates "×10$^{-n}$". For example, 1.234E-05=1.234×10$^{-5}$.

$$X(y)=y^2/[r\times\{1+(1\kappa\times y^2/r^2)^{1/2}\}]+A4\times y^4+A6\times y^6+A8\times y^8+A10\times y^{10} \quad (a)$$

In [General Data], f is a focal length, $FN_o$ is an F number, ω is a half angle of view, Y is an image height, TL is a total lens length of the zoom lens, Bf is a distance from an image side surface of an optical element disposed closest to the image to the paraxial image plane, and Bf (air conversion) is an air-converted distance from the last lens surface to the paraxial image plane.

In [Zooming Data] in each table, Di (i is an integer) in each of the wide-angle end state, the intermediate focal length state and the telephoto end state indicates a variable distance between the i-th surface and the (i+1)th surface.

In [Zoom Lens Group Data] in each table, G is a group number, "first surface of group" indicates a surface number of the surface closest to the object in each group, "focal length of group" indicates a focal length of each group, and "lens configuration length" indicates a distance in each lens group from the lens surface closest to the object to the lens surface closest to the image on the optical axis.

In [Conditional Expression] in each table, values corresponding to the above mentioned conditional expressions (1) to (5) are shown.

In all the data values shown below, "mm" is normally used for the unit of focal length f, radius of curvature r, surface distance d and other lengths, unless otherwise specified, but the unit is not limited to mm, since an equivalent optical performance is obtained even if an optical system is proportionally expanded or proportionally reduced. The unit need not be "mm", but another appropriate unit can be used instead.

The above mentioned description is the same for all the examples hereinbelow, for which this description is omitted.

EXAMPLE 1

Example 1 will be described with reference to FIG. 1 to FIG. 3 and Table 1. FIG. 1 is a diagram depicting a configuration of a zoom lens ZL (ZL1) according to Example 1, and zoom locus thereof from a wide-angle end state (W) to a telephoto end state (T). As FIG. 1 shows, the zoom lens ZL1 according to Example 1 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a biconvex positive lens L34.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL1 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 1 shows each data of Example 1. The surface numbers 1 to 23 correspond to the surfaces 1 to 23 in FIG. 1. In Example 1, the fifth surface, the eleventh surface, the twelfth surface and the eighteenth surface are formed to be aspherical.

TABLE 1

[Lens Data]

| surface number | r | d | nd | vd |
|---|---|---|---|---|
| object surface | ∞ | | | |
| 1 | 31.1714 | 0.8000 | 1.922860 | 20.88 |
| 2 | 19.9477 | 3.7000 | 1.882997 | 40.76 |
| 3 | 204.6283 | D3 | | |
| 4 | 79.4369 | 0.8000 | 1.806100 | 40.73 |
| 5(aspherical surface) | 5.7047 | 4.3000 | | |
| 6 | −11.4129 | 0.5000 | 1.804000 | 46.57 |
| 7 | 167.3430 | 0.3900 | | |
| 8 | 31.8588 | 1.5000 | 1.945944 | 17.98 |
| 9 | −40.3748 | D9 | | |
| 10(aperture stop) | ∞ | 0.3000 | | |
| 11(aspherical surface) | 8.4088 | 2.6000 | 1.693500 | 53.22 |
| 12(aspherical surface) | −46.9548 | 0.2000 | | |
| 13 | 9.3404 | 2.5500 | 1.497820 | 82.56 |
| 14 | −32.0335 | 0.5000 | 1.903660 | 31.31 |
| 15 | 6.3494 | 1.1000 | | |
| 16 | 11.2931 | 1.9500 | 1.497820 | 82.52 |
| 17 | −19.0477 | D17 | | |
| 18(aspherical surface) | 9.9161 | 1.8000 | 1.592014 | 67.02 |
| 19 | 24.0902 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

TABLE 1-continued

[Aspherical Data]

fifth surface

κ = 1.0000, A4 = −1.67360E−04, A6 = −2.69450E−06,
A8 = −4.17240E−09, A10 = −6.24740E−09
eleventh surface κ = 1.0000, A4 = −1.37760E−04, A6 = 5.02900E−07,
A8 = 0.00000E+00, A10 = 0.00000E+00
twelfth surface κ = 1.0000, A4 = 8.36510E−05, A6 = 1.56840E−06, A8 = 0.00000E+00,
A10 = 0.00000E+00
eighteenth surface κ = 1.0000, A4 = −1.48460E−04, A6 = 1.02420E−07,
A8 = 0.00000E+00, A10 = 0.00000E+00

[General Data]
zoom ratio 4.01136

| | wide-angle end | intermediate position | intermediate position | telephoto end |
|---|---|---|---|---|
| f | 4.40000 | 6.50000 | 10.50000 | 17.65000 |
| FNo | 1.85748 | 2.05758 | 2.33332 | 2.67465 |
| ω | 44.55036 | 33.47522 | 21.12128 | 12.71826 |
| Y | 3.65000 | 4.05000 | 4.05000 | 4.05000 |
| TL | 49.26345 | 48.06344 | 51.31623 | 58.60831 |
| Bf | 0.59998 | 0.60001 | 0.60001 | 0.60002 |
| Bf(air conversion) | 4.77688 | 6.40418 | 8.82632 | 11.11292 |

[Zooming Data]

| variable distance | wide-angle end | intermediate position | intermediate position | telephoto end |
|---|---|---|---|---|
| D3 | 0.49969 | 2.79101 | 7.12071 | 12.63808 |
| D9 | 15.82231 | 9.93917 | 5.34659 | 2.30028 |
| D17 | 4.93279 | 5.69730 | 6.79084 | 9.32525 |
| D19 | 3.10867 | 4.73594 | 7.15807 | 9.44467 |

[Zoom Lens Group Data]

| group number | first surface of group | focal length of group | lens configuration length |
|---|---|---|---|
| G1 | 1 | 42.36471 | 4.50 |
| G2 | 4 | −6.53323 | 7.49 |
| G3 | 11 | 11.77596 | 8.90 |
| G4 | 18 | 27.18417 | 1.80 |

[Conditional Expression]

conditional expression (1) fw/TLw = 0.089
conditional expression (2) ft/TLt = 0.301
conditional expression (3) fw/LG2 = 0.587
conditional expression (4) fw/fG1 = 0.104
conditional expression (5) ft/fG1 = 0.417

As the data table in Table 1 shows, the zoom lens ZL1 according to this example satisfies all the conditional expressions (1) to (5).

Figure 2B:
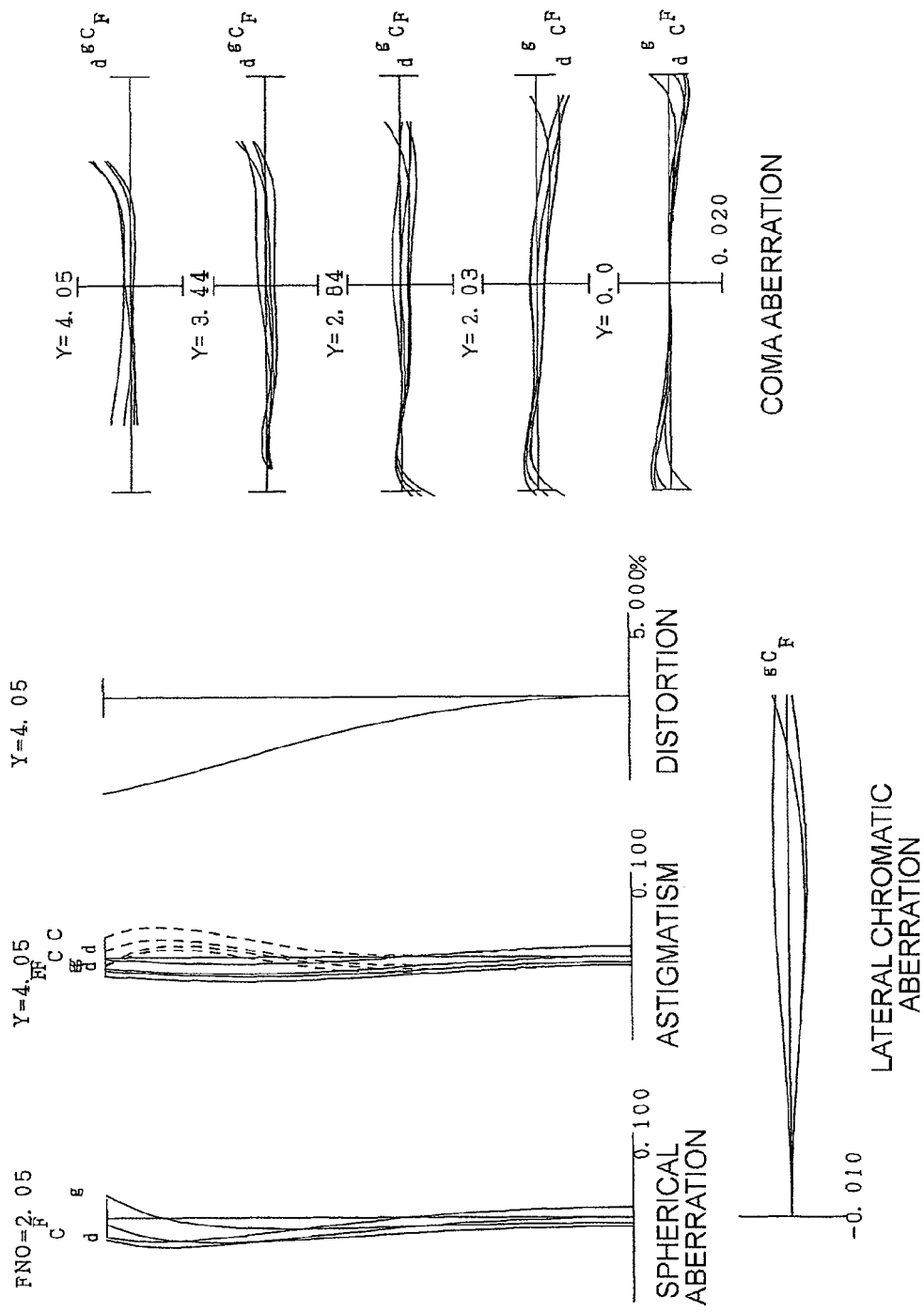
Figure 3A:
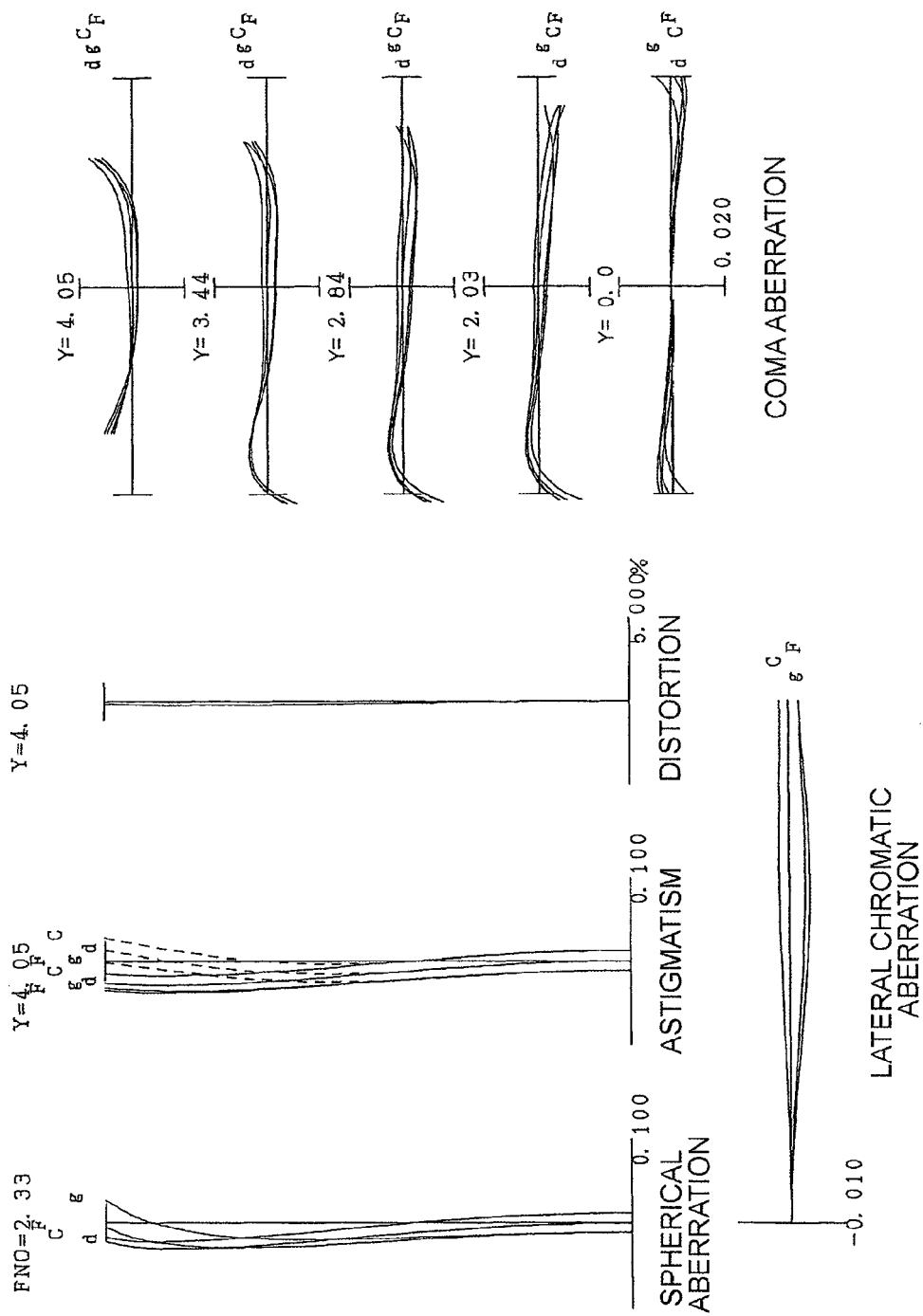
FIG. 3 are graphs showing various aberrations of the zoom lens according to Example 1, where FIG. 3A are graphs showing various aberrations of the zoom lens upon focusing on infinity in the intermediate focal length state on the telephoto end side, and FIG. 3B are graphs showing various aberrations of the zoom lens upon focusing on infinity in the telephoto end state.
Figure 3B:
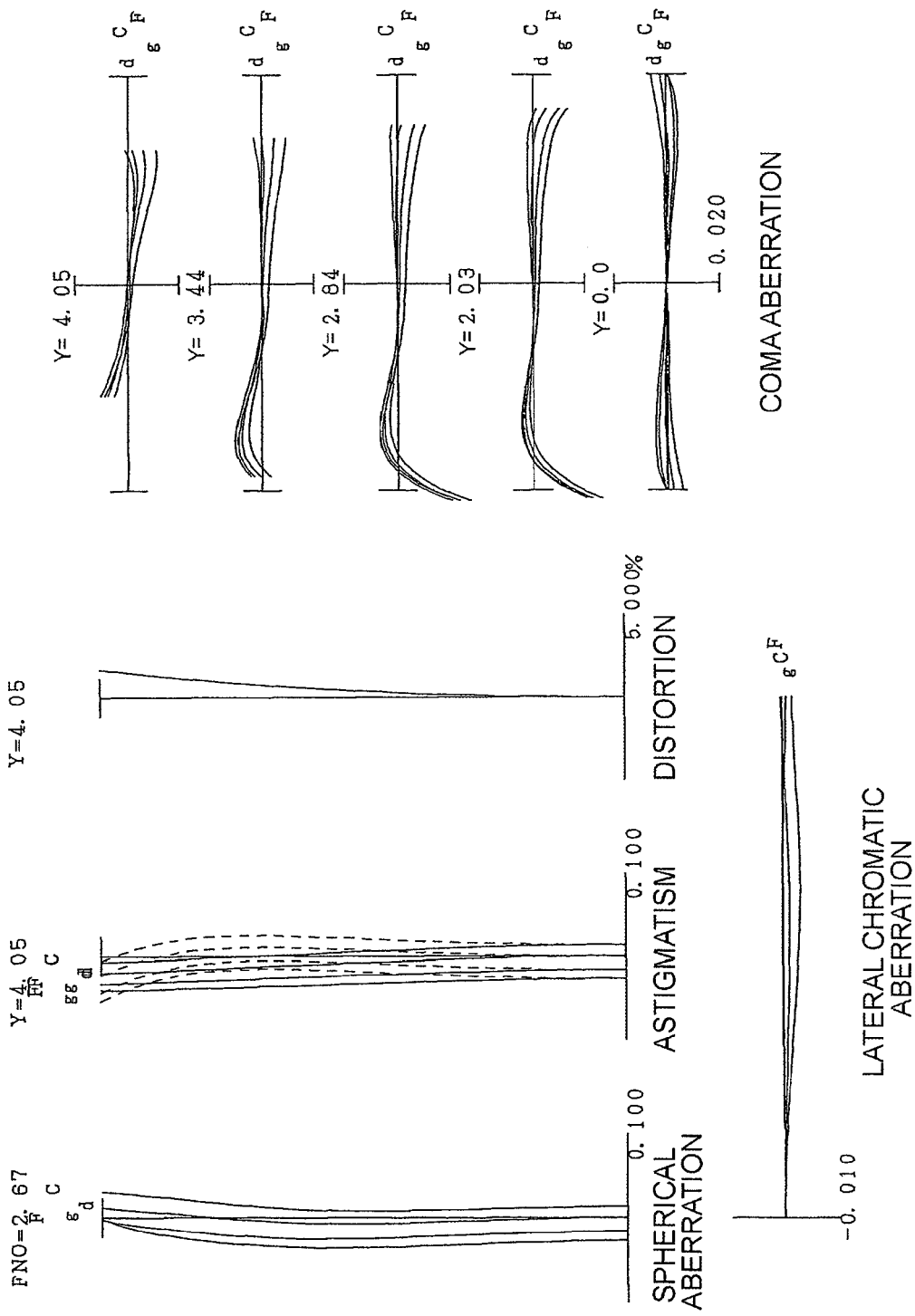

FIG. 2 to FIG. 3 are graphs showing various aberrations of the zoom lens ZL1 according to Example 1. In other words, FIG. 2A are graphs showing various aberrations of the zoom lens upon focusing on infinity in the wide-angle end state, FIG. 2B are graphs showing various aberrations of the zoom lens upon focusing on infinity in the intermediate focal length state on the wide-angle end side, FIG. 3A are graphs showing various aberrations of the zoom lens upon focusing on infinity in the intermediate focal length state on the telephoto end side, and FIG. 3B are graphs showing various aberrations of the zoom lens upon focusing on infinity in the telephoto end state.

In each graph showing aberrations, FNO indicates an F number, and Y indicates an image height. In each graph showing spherical aberrations, the solid line indicates spherical aberration. In the graph showing astigmatism, the solid line indicates the sagittal image surface, and the broken line indicates the meridional image surface. In the graph showing coma aberrations, the solid line indicates the meridional coma. The above description on the graphs showing aberrations is the same for other examples, where this description is omitted.

In Example 1, as seen in each graph showing aberrations, various aberrations are corrected well in each focal length state from the wide-angle end state to the telephoto end state, indicating the presence of excellent image forming performance.

EXAMPLE 2

Example 2 will be described with reference to FIG. 4 to FIG. 6 and Table 2. FIG. 4 is a diagram depicting a configuration of a zoom lens ZL (ZL2) according to Example 2, and zoom locus thereof from a wide-angle end state (W) to a telephoto end state (T). As FIG. 4 shows, the zoom lens ZL2 according to Example 2 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a positive meniscus lens L34 having a convex surface facing the image.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL2 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 2 shows each data of Example 2. The surface numbers 1 to 23 in Table 2 correspond to the surfaces 1 to 23 in FIG. 4. In Example 2, the fifth surface, the eleventh surface, the twelfth surface and the eighteenth surface are formed to be aspherical.

TABLE 2

[Lens Data]

| surface number | r | d | nd | vd |
|---|---|---|---|---|
| object surface | ∞ | | | |
| 1 | 35.2956 | 0.8000 | 1.922860 | 20.88 |
| 2 | 22.6544 | 3.7000 | 1.882997 | 40.76 |
| 3 | 190.7999 | D3 | | |
| 4 | 67.6303 | 0.8000 | 1.806100 | 40.71 |
| 5(aspherical surface) | 6.3565 | 4.7000 | | |
| 6 | −13.5784 | 0.5000 | 1.729157 | 54.68 |
| 7 | 228.2242 | 0.4000 | | |
| 8 | 27.0911 | 1.9000 | 1.945950 | 17.98 |
| 9 | −95.0914 | D9 | | |
| 10(aperture stop) | ∞ | 0.3000 | | |
| 11(aspherical surface) | 8.4701 | 2.6000 | 1.592010 | 67.05 |
| 12(aspherical surface) | −25.7686 | 0.2000 | | |
| 13 | 8.2954 | 2.6000 | 1.754999 | 52.32 |
| 14 | −20.1046 | 0.5000 | 1.903660 | 31.31 |
| 15 | 5.5755 | 1.5000 | | |
| 16 | −1000.0000 | 1.4000 | 1.497820 | 82.56 |
| 17 | −12.9328 | D17 | | |
| 18(aspherical surface) | 12.1411 | 1.7000 | 1.592010 | 67.05 |
| 19 | 40.9199 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

[Aspherical Data]

fifth surface

κ = 1.0000, A4 = −9.60350E−05, A6 = −2.54240E−06,
A8 = 9.11340E−08, A10 = −3.77080E−09
eleventh surface κ = 1.0000, A4 = −1.35330E−04, A6 = 5.12240E−07,
A8 = 0.00000E+00, A10 = 0.00000E+00
twelfth surface κ = 1.0000, A4 = 1.83340E−04, A6 = 7.99910E−07, A8 = 0.00000E+00,
A10 = 0.00000E+00
eighteenth surface κ = 1.0000, A4 = −2.74370E−05, A6 = 1.67510E−06,
A8 = 0.00000E+00, A10 = 0.00000E+00

[General Data]
zoom ratio 4.01136

| | wide-angle end | intermediate position | intermediate position | telephoto end |
|---|---|---|---|---|
| f | 4.40000 | 6.50000 | 10.50000 | 17.65000 |
| FNo | 1.87351 | 2.05356 | 2.34281 | 2.72209 |
| ω | 44.59754 | 33.28707 | 21.09399 | 12.78630 |
| Y | 3.65000 | 4.05000 | 4.05000 | 4.05000 |
| TL | 50.51496 | 48.44739 | 50.68890 | 57.62954 |
| Bf | 0.59998 | 0.59999 | 0.59998 | 0.59999 |
| Bf(air conversion) | 4.35462 | 5.69690 | 7.38339 | 8.51813 |

[Zooming Data]

| variable distance | wide-angle end | intermeditate position | intermeditate position | telephoto end |
|---|---|---|---|---|
| D3 | 0.50284 | 3.52919 | 8.27342 | 14.70383 |
| D9 | 18.04769 | 11.16843 | 5.73233 | 2.28794 |
| D17 | 3.76806 | 4.21112 | 5.45801 | 8.27788 |
| D19 | 2.68640 | 4.02867 | 5.71517 | 6.84991 |

[Zoom Lens Group Data]

| group number | first surface of group | focal length of group | lens configuration length |
|---|---|---|---|
| G1 | 1 | 49.87397 | 4.50 |
| G2 | 4 | −7.98240 | 8.30 |

TABLE 2-continued

| G3 | 11 | 11.51982 | 8.80 |
|----|----|----------|------|
| G4 | 18 | 28.53352 | 1.70 |

[Conditional Expression]

conditional expression (1) fw/TLw = 0.087
conditional expression (2) ft/TLt = 0.306
conditional expression (3) fw/LG2 = 0.530
conditional expression (4) fw/fG1 = 0.088
conditional expression (5) ft/fG1 = 0.354

As the data table in Table 2 shows, the zoom lens ZL2 according to this example satisfies all the conditional expressions (1) to (5).

Figure 5A:
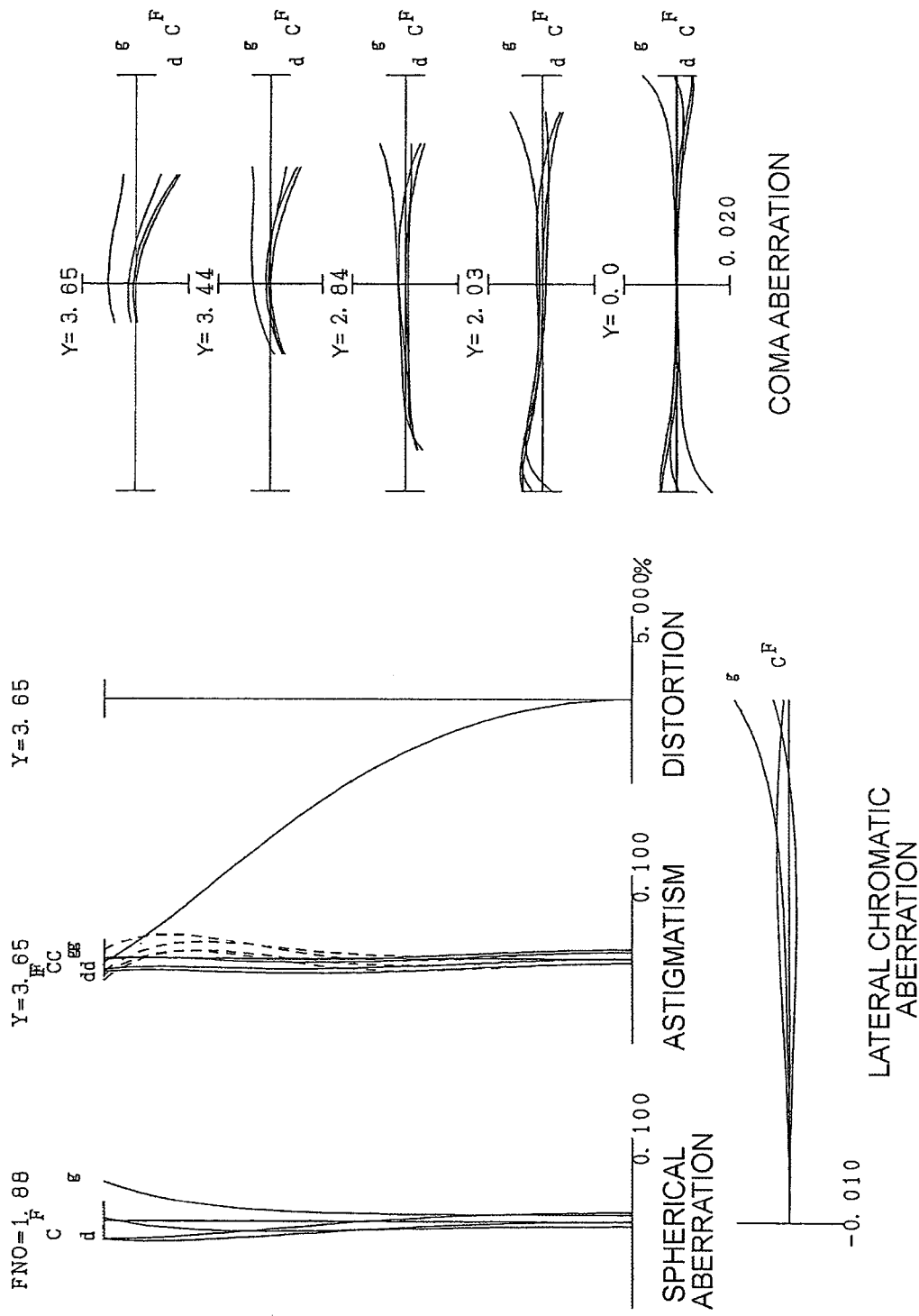
FIG. 5 are graphs showing various aberrations of the zoom lens according to Example 2, where FIG. 5A are graphs showing various aberrations of the zoom lens upon focusing on infinity in the wide-angle end state, and FIG. 5B are graphs showing various aberrations of the zoom lens upon focusing on infinity in the intermediate focal length state on the wide-angle end side.
Figure 5B:
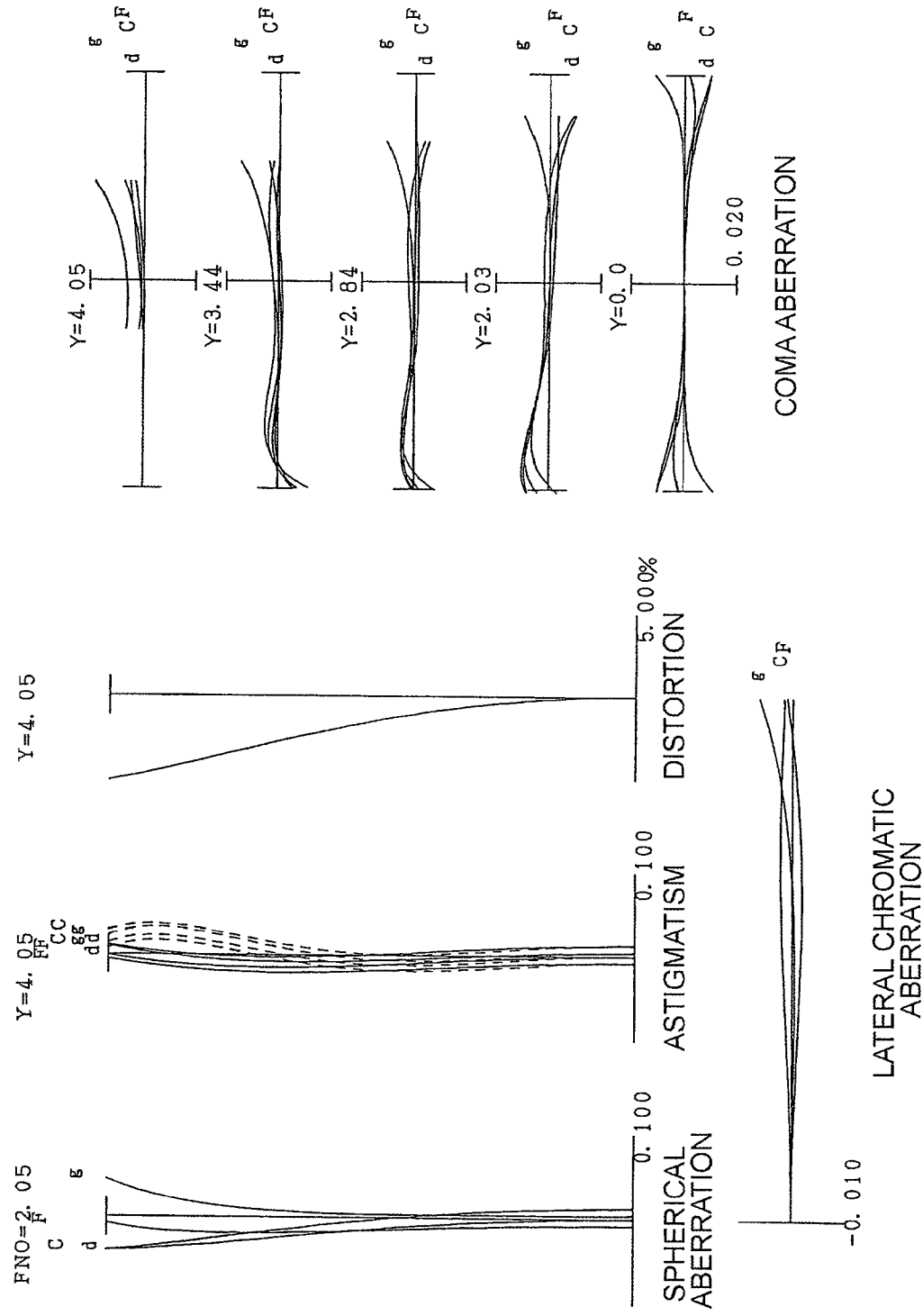
Figure 6A:
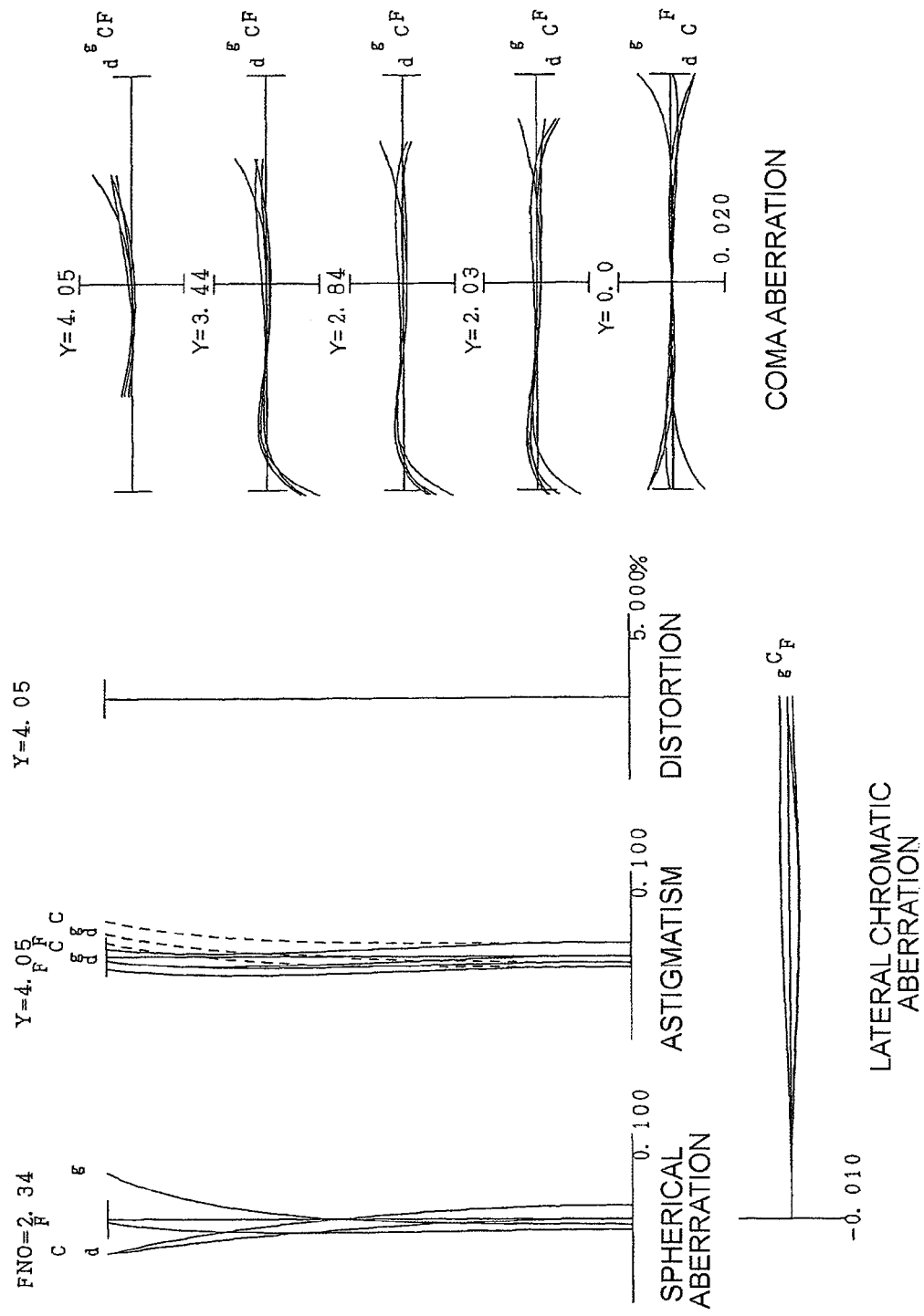
FIG. 6 are graphs showing various aberrations of the zoom lens according to Example 2, where FIG. 6A are graphs showing various aberrations of the zoom lens upon focusing on infinity in the intermediate focal length state on the telephoto end side, and FIG. 6B are graphs showing various aberrations of the zoom lens upon focusing on infinity in the telephoto end state.
Figure 6B:
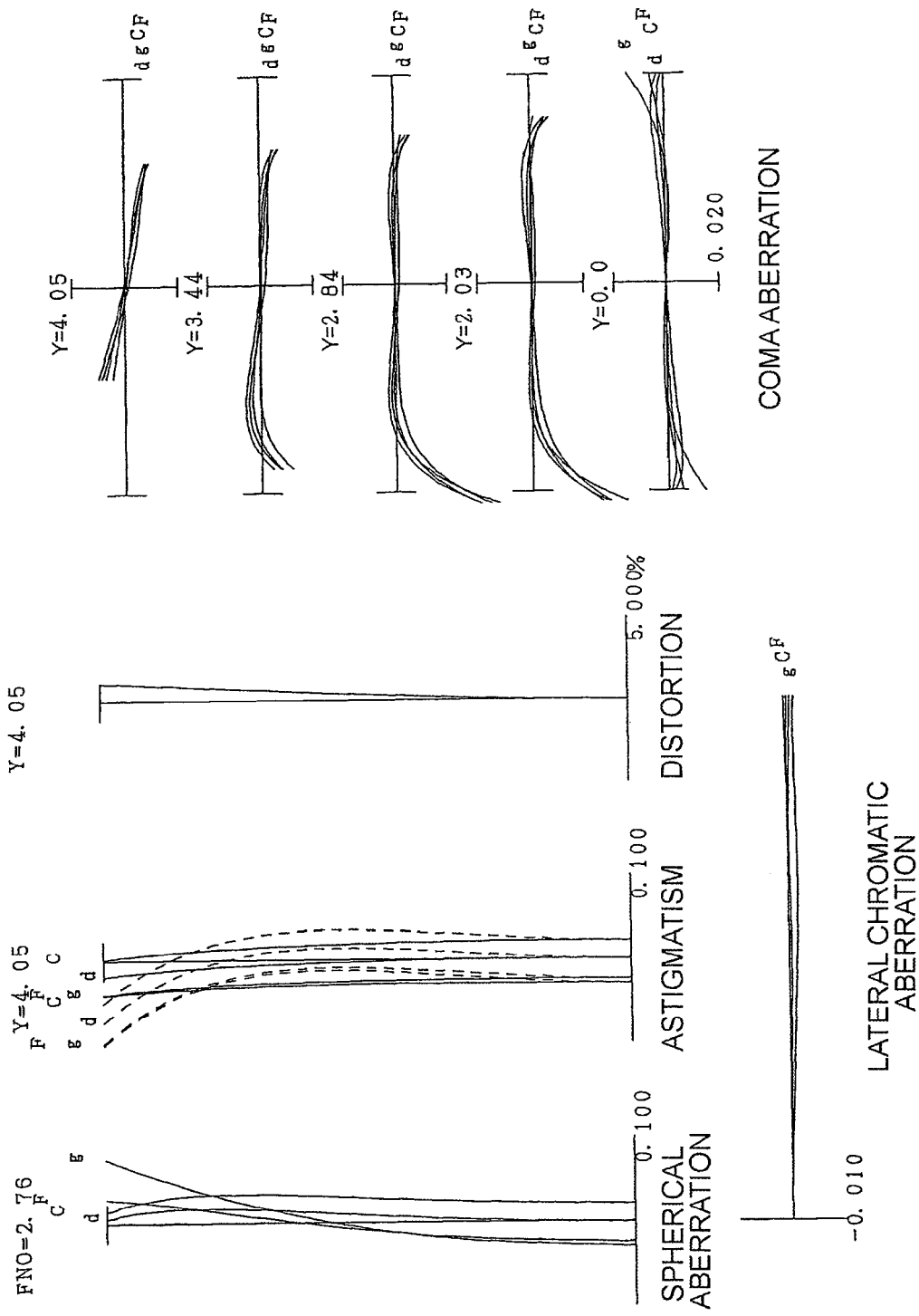

FIG. 5 to FIG. 6 are graphs showing various aberrations of the zoom lens ZL2 according to Example 2. In other words, FIG. 5A are graphs showing various aberrations of the zoom lens upon focusing on infinity in the wide-angle end state, FIG. 5B are graphs showing various aberrations of the zoom lens upon focusing on infinity in the intermediate focal length state on the wide-angle end side, FIG. 6A are graphs showing various aberrations of the zoom lens upon focusing on infinity in the intermediate focal length state on the telephoto end side, and FIG. 6B are graphs showing various aberrations of the zoom lens upon focusing on infinity in the telephoto end state.

In Example 2, as seen in each graph showing aberrations, various aberrations are corrected well in each focal length state from the wide-angle end state to the telephoto end state, indicating the presence of excellent image forming performance.

EXAMPLE 3

Example 3 will be described with reference to FIG. 7 to FIG. 9 and Table 3. FIG. 7 is a diagram depicting a configuration of a zoom lens ZL (ZL3) according to Example 3, and zoom locus thereof from a wide-angle end state (W) to a telephoto end state (T). As FIG. 3 shows, the zoom lens ZL3 according to Example 7 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a biconvex positive lens L34.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL3 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, and the third lens group G3 move toward the object. Moreover, the fourth lens group mover toward the object once then moves toward the image.

Table 3 shows each data of Example 3. The surface numbers 1 to 23 correspond to the surfaces 1 to 23 in FIG. 7. In Example 3, the fifth surface, the eleventh surface, the twelfth surface and the eighteenth surface are formed to be aspherical.

TABLE 3

[Lens Data]

| surface number | r | d | nd | vd |
|---|---|---|---|---|
| object surface | ∞ | | | |
| 1 | 39.9123 | 0.8000 | 1.922860 | 20.88 |
| 2 | 23.0576 | 3.2196 | 1.882997 | 40.76 |
| 3 | 4052.2893 | D3 | | |
| 4 | 76.7137 | 0.8000 | 1.806100 | 40.73 |
| 5(aspherical surface) | 5.5125 | 4.0878 | | |
| 6 | −12.7616 | 0.4000 | 1.754998 | 52.32 |
| 7 | 112.2377 | 0.2000 | | |
| 8 | 19.5926 | 1.5432 | 1.945944 | 17.98 |
| 9 | −148.8716 | D9 | | |
| 10(aperture stop) | ∞ | 0.3000 | | |
| 11(aspherical surface) | 7.2972 | 2.0489 | 1.693500 | 53.20 |
| 12(aspherical surface) | −29.3123 | 0.2000 | | |
| 13 | 10.7162 | 2.1519 | 1.497820 | 82.52 |
| 14 | −21.7754 | 0.4288 | 1.903658 | 31.31 |
| 15 | 6.3577 | 0.9862 | | |
| 16 | 71.0409 | 1.4296 | 1.497820 | 82.52 |
| 17 | −9.4623 | D17 | | |
| 18(aspherical surface) | 13.3200 | 1.6353 | 1.592014 | 67.02 |
| 19 | 40.0000 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

[Aspherical Data]

fifth surface

κ = 1.0000, A4 = −1.73930E−04, A6 = 2.20030E−06,
A8 = −3.03460E−07, A10 = 0.00000E+00 eleventh surface

κ = 1.0000, A4 = −2.22620E−04, A6 = 0.00000E+00,
A8 = 0.00000E+00, A10 = 0.00000E+00 twelfth surface

κ = 1.0000, A4 = 2.22230E−04, A6 = 8.36010E−07, A8 = 0.00000E+00,
A10 = 0.00000E+00 eighteenth surface

κ = 1.0000, A4 = 2.13990E−05, A6 = 0.00000E+00, A8 = 0.00000E+00,
A10 = 0.00000E+00

[General Data]
zoom ratio 6.02272

| | wide-angle end | intermediate position | intermediate position | telephoto end |
|---|---|---|---|---|
| f | 4.40000 | 6.95000 | 11.95000 | 26.49998 |
| FNo | 2.37724 | 2.77048 | 3.35120 | 4.64346 |
| ω | 44.29670 | 31.38125 | 18.65302 | 8.50753 |
| Y | 3.65000 | 4.05000 | 4.05000 | 4.05000 |
| TL | 47.00001 | 46.60167 | 52.08643 | 67.50003 |
| Bf | 0.60000 | 0.60001 | 0.60001 | 0.60003 |
| Bf(air conversion) | 5.54741 | 6.60484 | 8.32500 | 6.64872 |

TABLE 3-continued

[Zooming Data]

| variable distance | wide-angle end | intermediate position | intermediate position | telephoto end |
|---|---|---|---|---|
| D3 | 0.50000 | 3.14652 | 8.08610 | 16.69326 |
| D9 | 16.01226 | 9.79785 | 5.31731 | 2.35001 |
| D17 | 4.46719 | 6.57931 | 9.88487 | 21.33489 |
| D19 | 3.87917 | 4.93660 | 6.65675 | 4.98046 |

[Zoom Lens Group Data]

| group number | first surface of group | focal length of group | lens configuration length |
|---|---|---|---|
| G1 | 1 | 47.16497 | 4.02 |
| G2 | 4 | −6.82162 | 7.03 |
| G3 | 11 | 11.40788 | 7.25 |
| G4 | 18 | 32.98053 | 1.64 |

[Conditional Expression]

conditional expression (1) fw/TLw = 0.094
conditional expression (2) ft/TLt = 0.393
conditional expression (3) fw/LG2 = 0.626
conditional expression (4) fw/fG1 = 0.093
conditional expression (5) ft/fG1 = 0.562

As the data table in Table 3 shows, the zoom lens ZL3 according to this example satisfies all the conditional expressions (1) to (5).

Figure 8A:
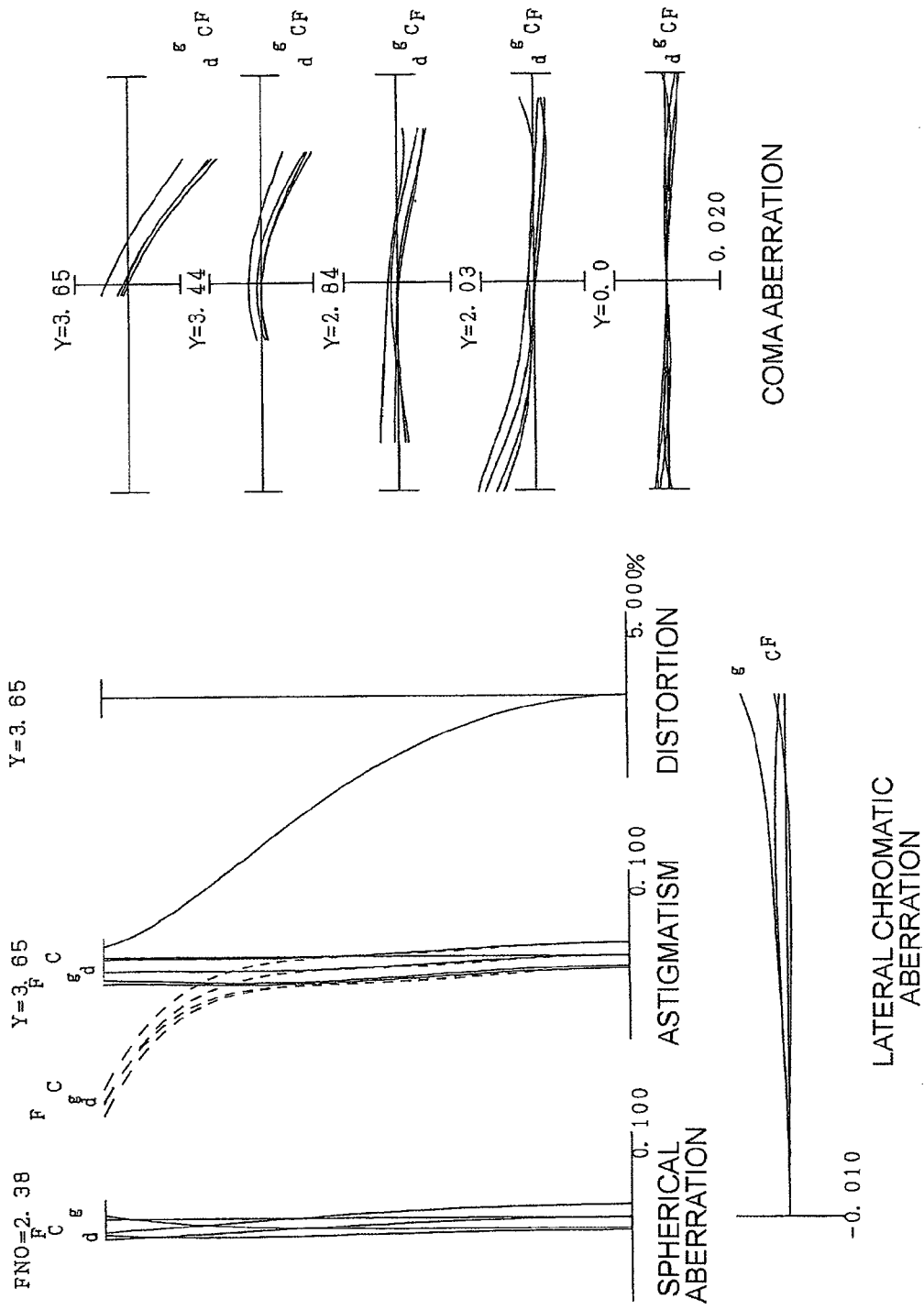
FIG. 8 are graphs showing various aberrations of the zoom lens according to Example 3, where FIG. 8A are graphs showing various aberrations of the zoom lens upon focusing on infinity in the wide-angle end state, and FIG. 8B are graphs showing various aberrations of the zoom lens upon focusing on infinity in the intermediate focal length state on the wide-angle end side.
Figure 8B:
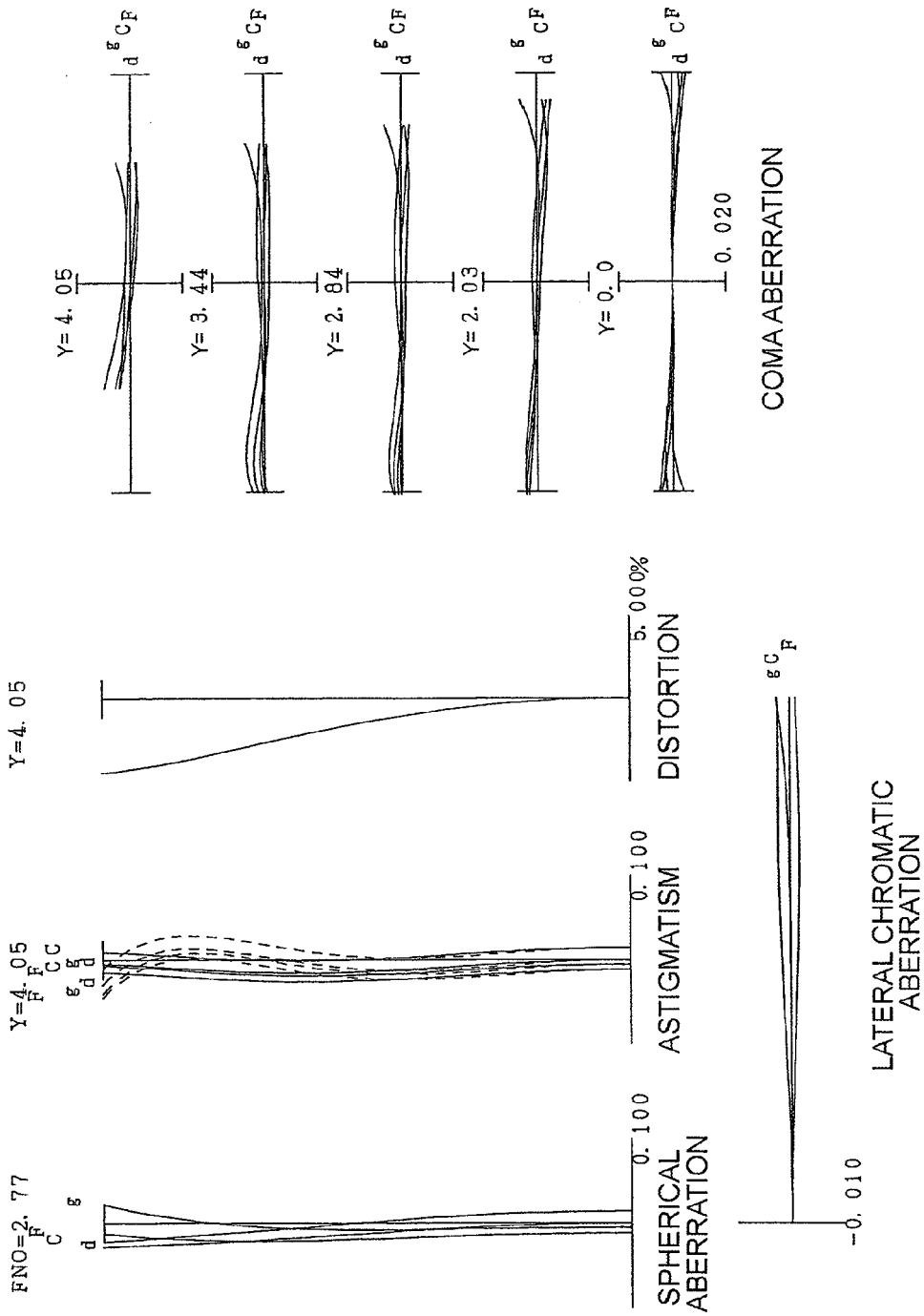
Figure 9B:
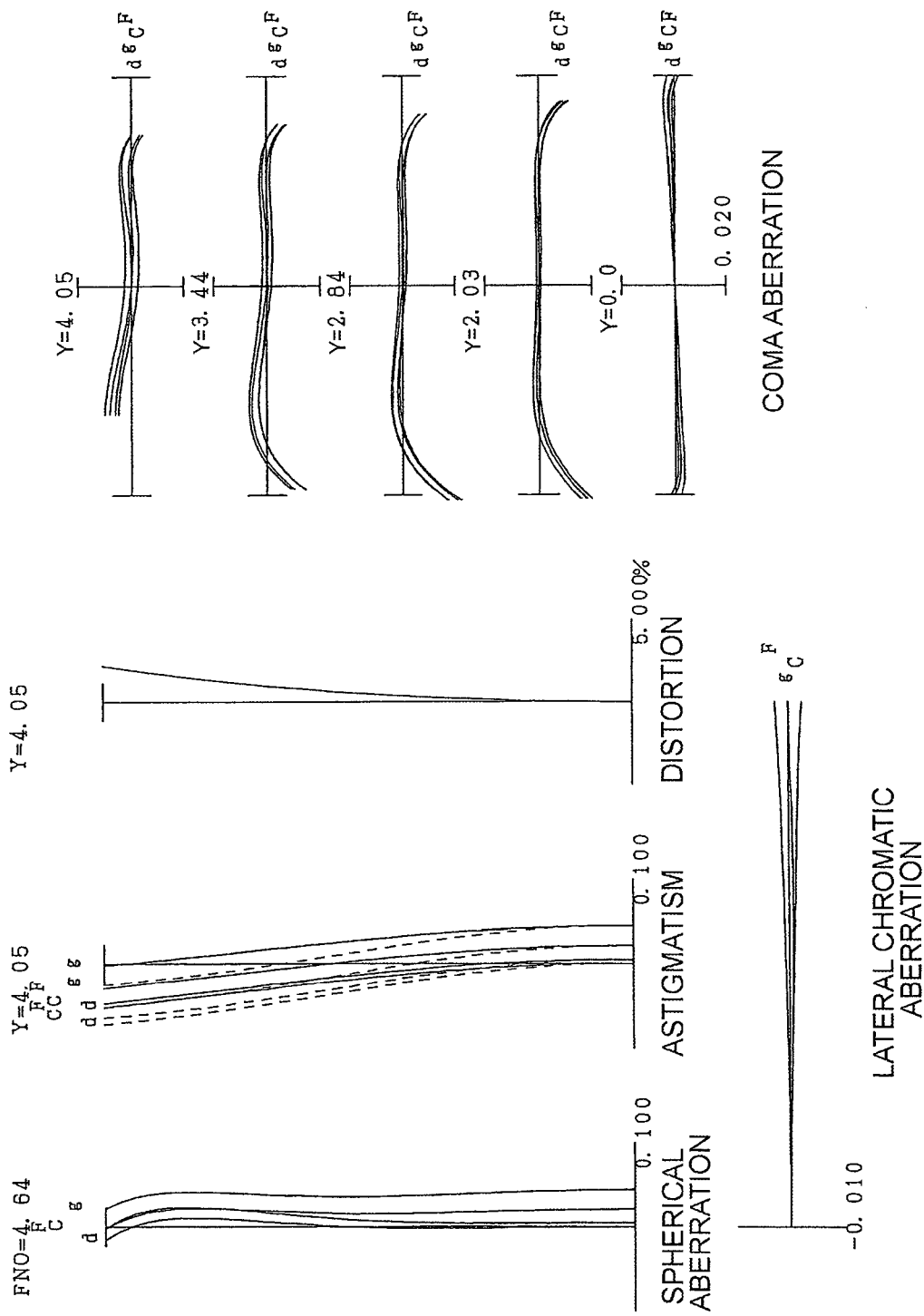
FIG. 9 are graphs showing various aberrations of the zoom lens according to Example 3, where FIG. 9A are graphs showing various aberrations of the zoom lens upon focusing on infinity in the intermediate focal length state on the telephoto end side, and FIG. 9B are graphs showing various aberrations of the zoom lens upon focusing on infinity in the telephoto end state.

FIG. 8 to FIG. 9 are graphs showing various aberrations of the zoom lens ZL3 according to Example 3. In other words, FIG. 8A are graphs showing various aberrations of the zoom lens upon focusing on infinity in the wide-angle end state, FIG. 8B are graphs showing various aberrations of the zoom lens upon focusing on infinity in the intermediate focal length state on the wide-angle end side, FIG. 9A are graphs showing various aberrations of the zoom lens upon focusing on infinity in the intermediate focal length state on the telephoto end side, and FIG. 9B are graphs showing various aberrations of the zoom lens upon focusing on infinity in the telephoto end state.

In Example 3, as seen in each graph showing aberrations, various aberrations are corrected well in each focal length state from the wide-angle end state to the telephoto end state, indicating the presence of excellent image forming performance.

EXAMPLE 4

Example 4 will be described with reference to FIG. 10 to FIG. 12 and Table 4. FIG. 10 is a diagram depicting a configuration of a zoom lens ZL (ZL4) according to Example 4, and zoom locus thereof from a wide-angle end state (W) to a telephoto end state (T). As FIG. 10 shows, the zoom lens ZL4 according to Example 4 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a biconvex positive lens L12.

The second lens group G2 comprises, in order from the object, a negative meniscus lens L21 having a convex surface facing the object, a biconcave negative lens L22 and a positive meniscus lens L23 having a convex surface facing the object.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL4 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 4 shows each data of Example 4. The surface numbers 1 to 21 in Table 4 correspond to the surfaces 1 to 21 in FIG. 10. In Example 4, the third surface, the fifth surface, the eleventh surface, the twelfth surface, the sixteenth surface, and the seventeenth surface are formed to be aspherical.

TABLE 4

[Lens Data]

| surface number | r | d | nd | vd |
|---|---|---|---|---|
| object surface | ∞ | | | |
| 1 | 50.0693 | 0.8000 | 1.922860 | 20.88 |
| 2 | 37.6780 | 3.1500 | 1.768020 | 49.23 |
| 3(aspherical surface) | −543.3419 | D3 | | |
| 4 | 81.3891 | 0.8000 | 1.806100 | 40.71 |
| 5(aspherical surface) | 7.1092 | 4.6000 | | |
| 6 | −28.8036 | 0.4000 | 1.882997 | 40.76 |
| 7 | 35.1263 | 0.2000 | | |
| 8 | 17.7515 | 2.0000 | 1.945950 | 17.98 |
| 9 | 683.8801 | D9 | | |
| 10(aperture stop) | ∞ | 0.3000 | | |
| 11(aspherical surface) | 7.0892 | 2.4000 | 1.592010 | 67.05 |
| 12(aspherical surface) | −23.8459 | 0.2000 | | |
| 13 | 7.3482 | 2.0000 | 1.754999 | 52.32 |
| 14 | −8.0530 | 0.4000 | 1.800999 | 34.97 |
| 15 | 4.4024 | D15 | | |
| 16(aspherical surface) | 12.5000 | 2.0000 | 1.743300 | 49.32 |
| 17(aspherical surface) | 68.9906 | D17 | | |
| 18 | ∞ | 0.2100 | 1.516330 | 64.14 |
| 19 | ∞ | 0.6000 | | |
| 20 | ∞ | 0.5000 | 1.516330 | 64.14 |
| 21 | ∞ | Bf | | |
| image plane | ∞ | | | |

[Aspherical Data]

third surface

κ = 1.0000, A4 = 5.69810E−08, A6 = 1.33280E−10, A8 = 0.00000E+00,
A10 = 0.00000E+00 fifth surface

κ = 1.0000, A4 = −4.34700E−05, A6 = 1.62960E−06,
A8 = −3.62310E−08, A10 = 0.00000E+00 eleventh surface

κ = 1.0000, A4 = −2.48810E−04, A6 = 0.00000E+00, A8 = 0.00000E+00,
A8 = 0.00000E+00, A10 = 0.00000E+00 twelfth surface

κ = 1.0000, A4 = 1.74320E−04, A6 = 1.75620E−06, A8 = 0.00000E+00,
A10 = 0.00000E+00

TABLE 4-continued sixteenth surface

κ = 1.0000, A4 = −1.11210E−04, A6 = 1.23010E−07,
A8 = 0.00000E+00, A10 = 0.00000E+00
seventeenth surface κ = 1.0000, A4 = −1.10490E−04, A6 = 0.00000E+00,
A8 = 0.00000E+00, A10 = 0.00000E+00

[General Data]
zoom ratio 4.81817

|  | wide-angle end | intermediate position | intermediate position | telephoto end |
|---|---|---|---|---|
| f | 4.40002 | 6.95003 | 11.94996 | 21.19996 |
| FNo | 2.43156 | 2.75232 | 3.18815 | 3.84569 |
| ω | 44.25227 | 31.29533 | 18.45589 | 10.58027 |
| Y | 3.65000 | 4.05000 | 4.05000 | 4.05000 |
| TL | 52.51649 | 49.42708 | 55.05101 | 66.51644 |
| Bf | 0.59988 | 0.59999 | 0.59997 | 0.59978 |
| Bf(air conversion) | 4.16308 | 5.53329 | 7.30753 | 8.19763 |

[Zooming Data]

| variable distance | wide-angle end | intermediate position | intermediate position | telephoto end |
|---|---|---|---|---|
| D3 | 0.49807 | 4.18722 | 12.31924 | 21.40722 |
| D9 | 22.18679 | 13.00892 | 6.87625 | 3.30950 |
| D15 | 6.17678 | 7.20589 | 9.05623 | 14.11032 |
| D17 | 2.49497 | 3.86506 | 5.63932 | 6.52962 |

[Zoom Lens Group Data]

| group number | first surface of group | focal length of group | lens configuration length |
|---|---|---|---|
| G1 | 1 | 63.61267 | 3.95 |
| G2 | 4 | −9.42714 | 8.00 |
| G3 | 11 | 12.24485 | 5.00 |
| G4 | 16 | 20.23265 | 2.00 |

[Conditional Expression]

conditional expression (1) fw/TLw = 0.084
conditional expression (2) ft/TLt = 0.319
conditional expression (3) fw/LG2 = 0.550
conditional expression (4) fw/fG1 = 0.069
conditional expression (5) ft/fG1 = 0.333

As the data table in Table 4 shows, the zoom lens ZL4 according to this example satisfies all the conditional expressions (1) to (5).

Figure 11A:
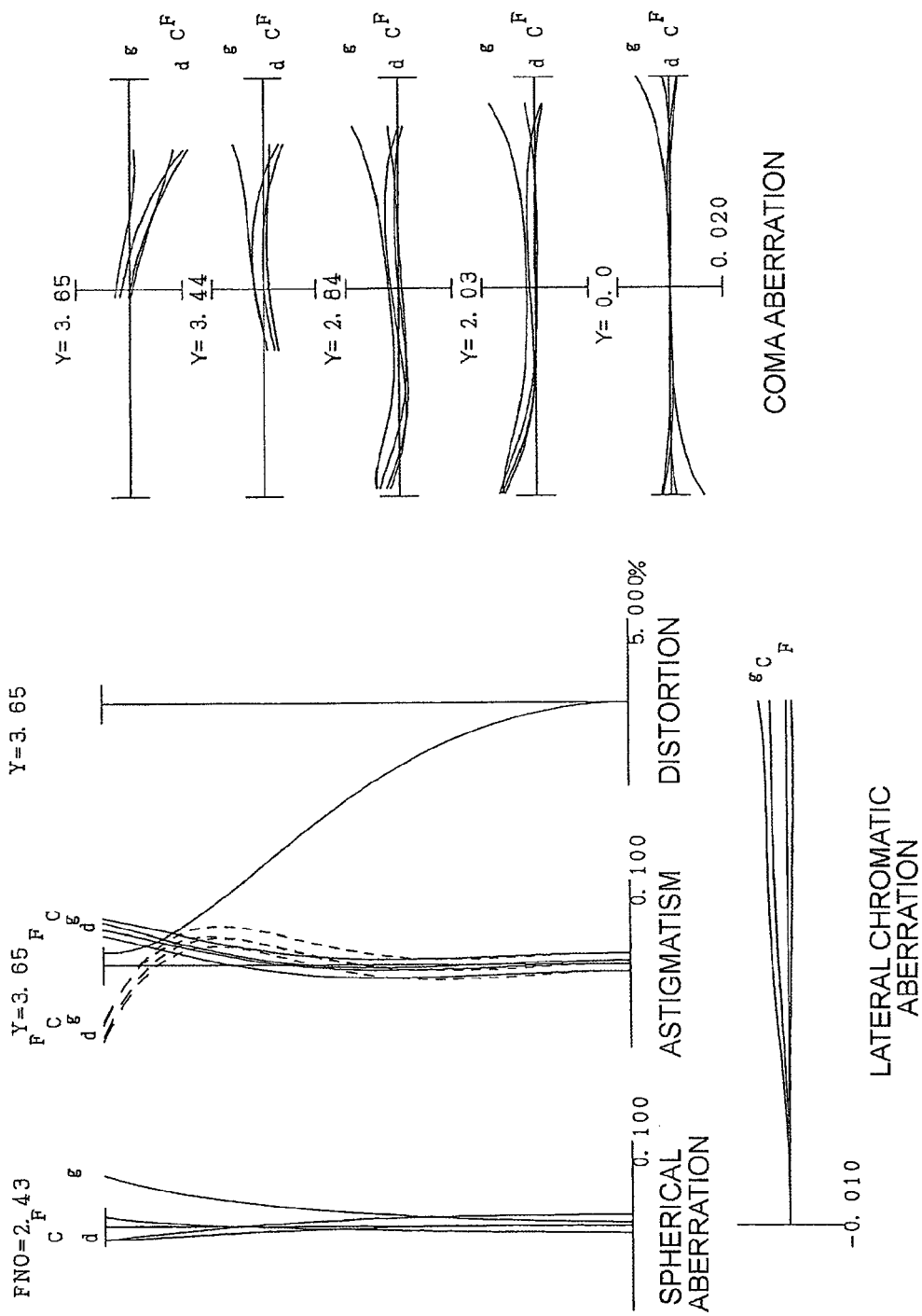
FIG. 11 are graphs showing various aberrations of the zoom lens according to Example 4, where FIG. 11A are graphs showing various aberrations of the zoom lens upon focusing on infinity in the wide-angle end state, and FIG. 11B are graphs showing various aberrations of the zoom lens upon focusing on infinity in the intermediate focal length state on the wide-angle end side.
Figure 11B:
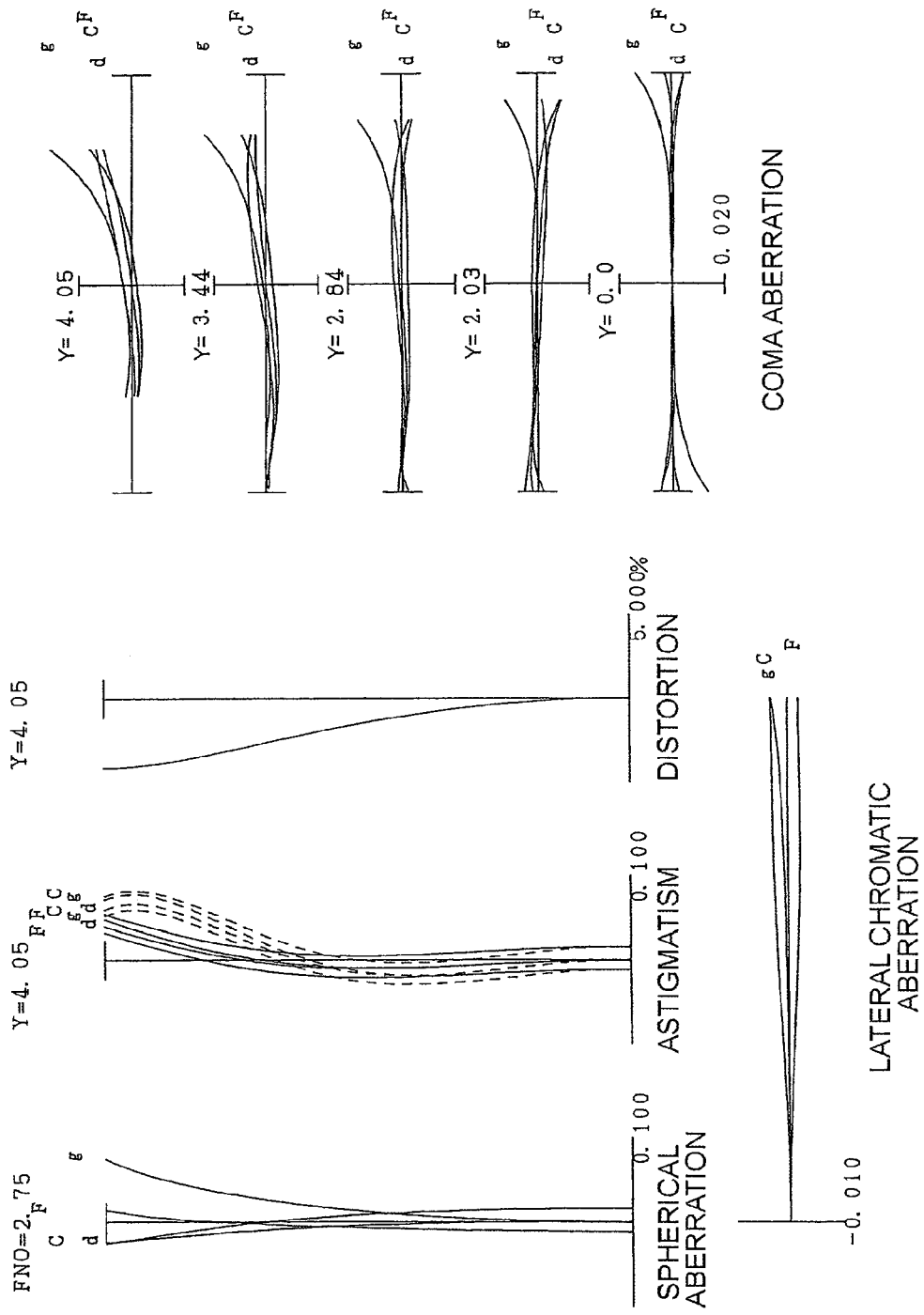
Figure 12A:
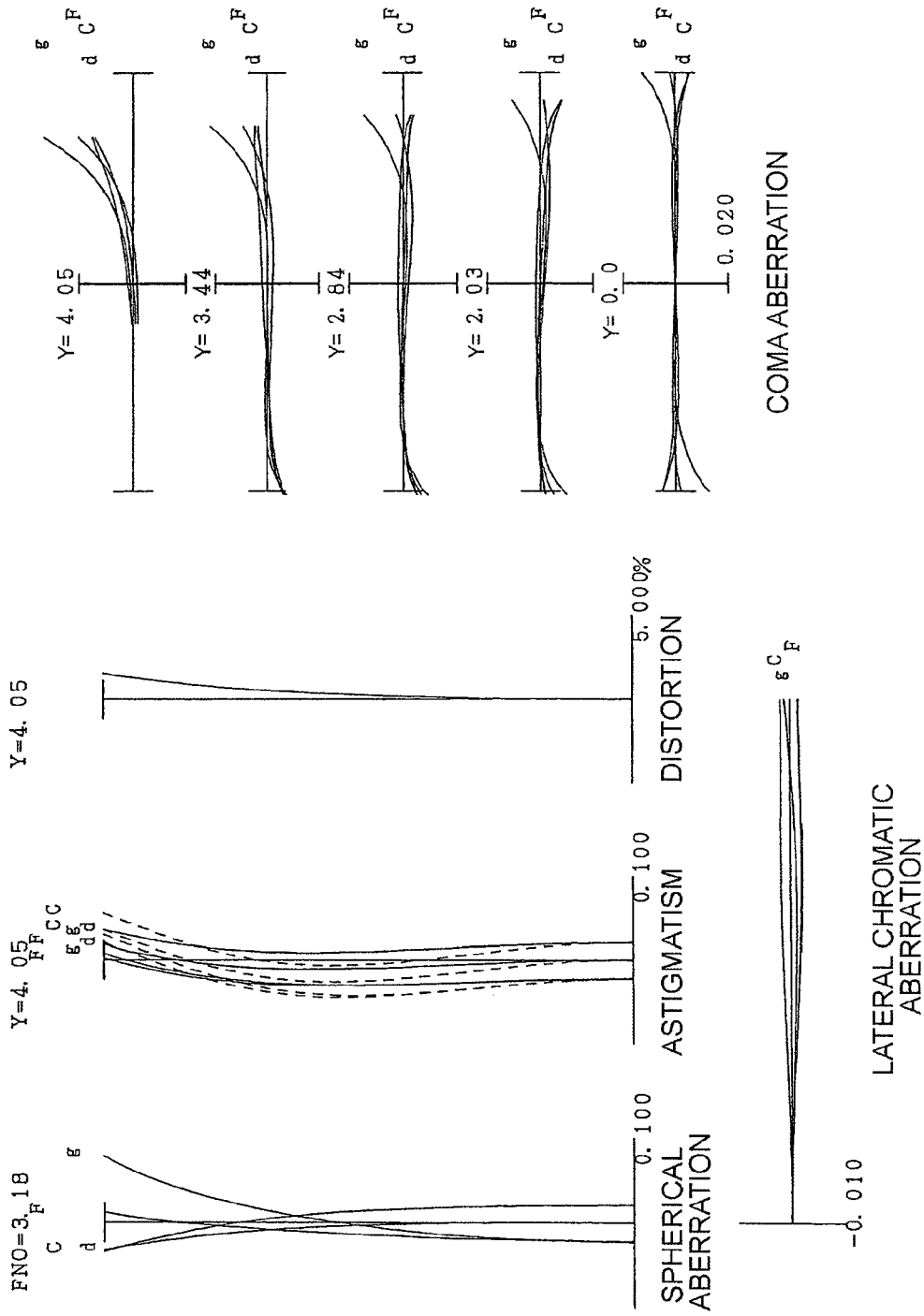
FIG. 12 are graphs showing various aberrations of the zoom lens according to Example 4, where FIG. 12A are graphs showing various aberrations of the zoom lens upon focusing on infinity in the intermediate focal length state on the telephoto end side, and FIG. 12B are graphs showing various aberrations of the zoom lens upon focusing on infinity in the telephoto end state.
Figure 12B:
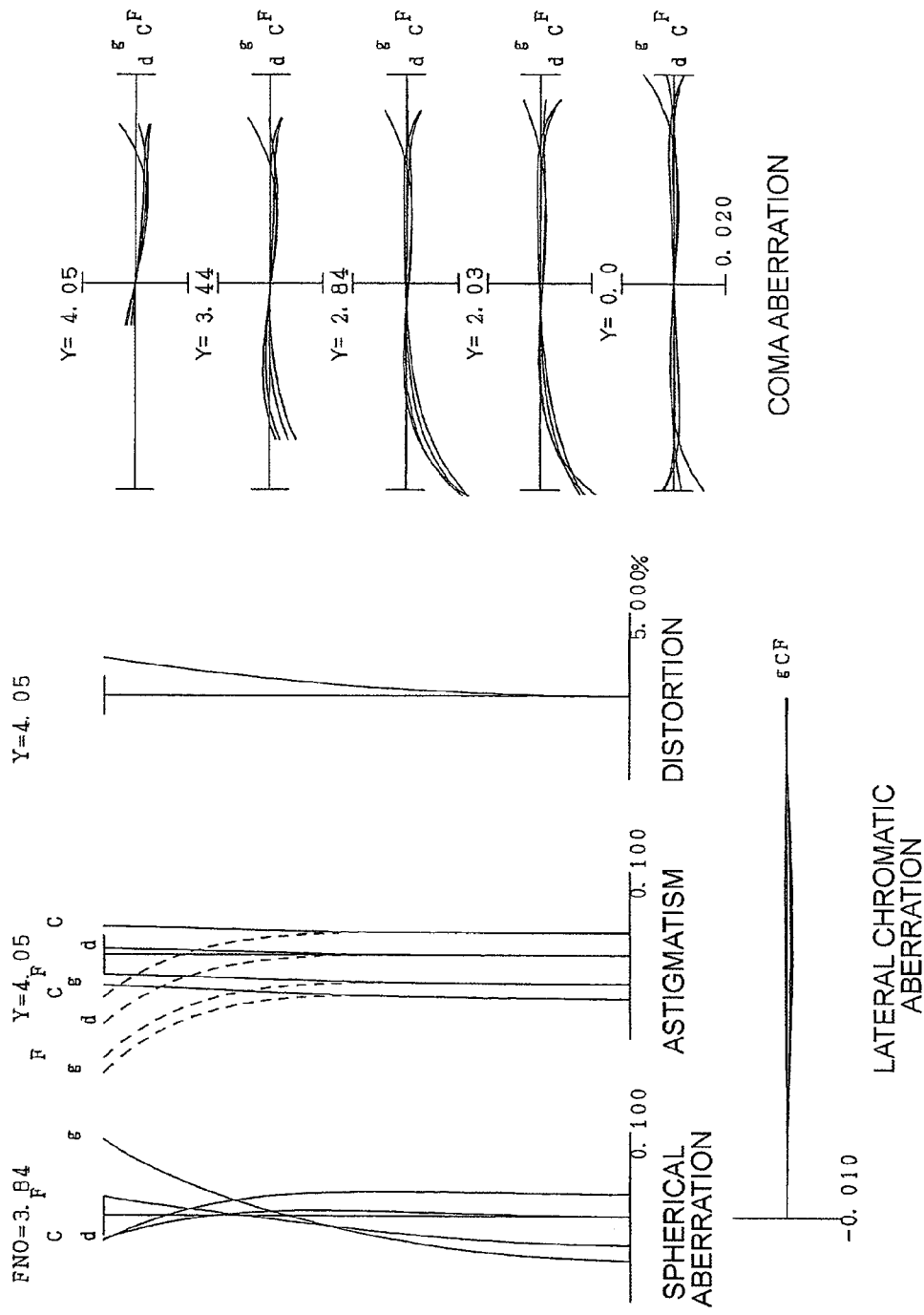

FIG. 11 to FIG. 12 are graphs showing various aberrations of the zoom lens ZL4 according to Example 4. In other words, FIG. 11A are graphs showing various aberrations of the zoom lens upon focusing on infinity in the wide-angle end state, FIG. 11B are graphs showing various aberrations of the zoom lens upon focusing on infinity in the intermediate focal length state on the wide-angle end side, FIG. 12A, are graphs showing various aberrations of the zoom lens upon focusing on infinity in the intermediate focal length state on the telephoto end side, and FIG. 12B are graphs showing various aberrations of the zoom lens upon focusing on infinity in the telephoto end state.

In Example 4, as seen in each graph showing aberrations, various aberrations are corrected well in each focal length state from the wide-angle end state to the telephoto end state, indicating the presence of excellent image forming performance.

Second Embodiments

A second embodiment will now be described with reference to FIG. 13 to FIG. 24. As FIG. 13 shows, a zoom lens according to the present embodiment is a zoom lens comprising, in order from an object, a first lens group G1 having positive refractive power, a second lens group G2 having negative refractive power, a third lens group G3 having positive refractive power, and a fourth lens group G4 having positive refractive power, wherein the following conditional expressions (6) to (8) are satisfied:

$$0.75 < fw/LG1 < 1.24 \qquad (6)$$

$$0.10 < fw/LG2 < 0.64 \qquad (7)$$

$$1.25 < ft/fG3 < 4.00 \qquad (8)$$

where fw denotes a focal length of the zoom lens in a wide-angle end state, ft denotes a focal length of the zoom lens in a telephoto end state, LG1 denotes a lens configuration length of the first lens group G1, LG2 denotes a lens configuration length of the second lens group G2, and fG3 denotes a focal length of the third lens group G3.

The conditional expression (6) specifies the relationship of the focal length of the zoom lens of the present embodiment in the wide-angle end state and the lens configuration length of the first lens group G1. If the condition exceeds the upper limit value of the conditional expression (6), it becomes difficult to obtain a wide angle of view, which is not desirable. If the wide angle of view is satisfied, then it becomes difficult to correct coma aberration throughout the entire zoom range, which is not desirable. If the condition is below the lower limit value of the conditional expression (6), on the other hand, the lens configuration length of the first lens group G1 increases, which is not desirable. If downsizing is satisfied, then it becomes difficult to correct coma aberration in the wide-angle end state, which is not desirable.

To ensure the effect of the present embodiment, it is preferable that the upper limit value of the conditional expression (6) is 1.20.

To also ensure the effect of the present embodiment, it is preferable that the lower limit value of the conditional expression (6) is 0.80. To further ensure the effect of the present embodiment, it is more preferable that the lower limit value of the conditional expression (6) is 0.85.

The conditional expression (7) specifies the relationship of the focal length of the zoom lens according to the present embodiment in the wide-angle end state and the lens configuration length of the second lens group G2. If the condition exceeds the upper limit value of the conditional expression (7), it becomes difficult to obtain a wide angle of view, which is not desirable. If the wide angle of view is satisfied, then it becomes difficult to correct astigmatism throughout the entire zoom range, which is not desirable. If the condition is below the lower limit value of the conditional expression (7), on the other hand, it becomes difficult to secure a high zoom ratio, which is not desirable. It also becomes difficult to correct the longitudinal chromatic aberration in the telephoto end state, which is not desirable.

To ensure the effect of the present embodiment, it is preferable that the lower limit value of the conditional expression (7) is 0.30. To further ensure the effect of the present embodiment, it is more preferable that the lower limit value of the conditional expression (7) is 0.40. To still further ensure the effect of the present embodiment, it is more preferable that the lower limit value of the conditional expression (7) is 0.50.

The conditional expression (8) specifies the relationship of the focal length of the zoom lens according to the present embodiment in the telephoto end state and the focal length of the third lens group G3. If the condition exceeds the upper limit value of the conditional expression (8), the power of the third lens group G3 increases, and it becomes difficult to correct spherical aberration throughout the entire zoom range, which is not desirable. If the condition is below the lower limit value of the conditional expression (8), on the other hand, it becomes difficult to correct astigmatism through the entire zoom range, which is not desirable.

To ensure the effect of the present embodiment, it is preferable that the upper limit value of the conditional expression (8) is 2.50. To further ensure the effect of the present embodiment, it is more preferable that the upper limit value of the conditional expression (8) is 2.45.

To ensure the effect of the present embodiment, it is preferable that the lower limit value of the conditional expression (8) is 1.30. To further ensure the effect of the present embodiment, it is more preferable that the lower limit value of the conditional expression (8) is 1.35.

It is preferable that the zoom lens according to the present embodiment satisfies the following conditional expression (9):

$$0.01 < fw/fG1 < 0.11 \qquad (9)$$

where fG1 denotes a focal length of the first lens group G1.

The conditional expression (9) specifies the relationship of the focal length of the zoom lens according to the present embodiment in the wide-angle end state and the focal length of the first lens group G1. If the condition exceeds the upper limit value of the conditional expression (9), it becomes difficult to obtain a wide angle of view, which is not desirable. If the wide angle of view is satisfied, then it becomes difficult to correct coma aberration in the telephoto end state, which is not desirable. If the conditional is below the lower limit value of the conditional expression (9), on the other hand, the size of the entire optical system increases, which is not desirable. If downsizing is satisfied, then it becomes difficult to correct spherical aberration in the telephoto end state, which is not desirable.

To ensure the effect of the present embodiment, it is preferable that the lower limit value of the conditional expression (9) is 0.03. To further ensure the effect of the present embodiment, it is more preferable that the lower limit value of the conditional expression (9) is 0.06.

It is preferable that the zoom lens according to the present embodiment satisfies the following conditional expression (10): where fG1 denotes a focal length of the first lens group G1.

$$0.3 < ft/fG1 < 1.0 \qquad (10)$$

where fG1 denotes a focal length of the first lens group G1.

The conditional expression (10) specifies the relationship of the focal length of the zoom lens according to the present embodiment in the telephoto end state and the focal length of the first lens group G1. If the condition exceeds the upper limit value of the conditional expression (10), it becomes difficult to correct coma aberration in the telephoto end state, which is not desirable. If the condition is below the lower limit value of the conditional expression (10), on the other hand, the size of the entire optical system increases, which is not desirable. If downsizing is satisfied, then it becomes difficult to correct spherical aberration in the telephoto end state, which is not desirable.

To ensure the effect of the present embodiment, it is preferable that the upper limit value of the conditional expression (10) is 0.70. To further ensure the effect of the present embodiment, it is more preferable that the upper limit value of the conditional expression (10) is 0.60.

In the zoom lens according to the present embodiment, it is preferable that, each of the first lens group G1, the second lens group G2, the third lens group G3 and the fourth lens group G4 moves upon zooming from the wide-angle end state to the telephoto end state. According to this configuration, the group distance between each group can be changed greatly, and a target zoom ratio can be obtained even if the total lens length is short. Since power of each lens group is not required to obtain the zoom ratio, the power of each lens group can be decreased, and coma aberration can be corrected well throughout the entire zoom range.

In the zoom lens according to the present embodiment, it is preferable that the first lens group G1 is constituted only by a cemented lens. According to this configuration, the distance between the first lens group G1 and the second lens group G2 in the telephoto end state can be decreased, and lateral chromatic aberration can be corrected well.

In the zoom lens according to the present embodiment, it is preferable that the fourth lens group G4 is constituted only by a single lens. According to this configuration, the lens length when retracted in the lens barrel can be decreased, which is desirable.

In the zoom lens according to the present embodiment, it is preferable that the fourth lens group G4 has a positive lens, and the positive lens has a meniscus form. According to this configuration, astigmatism can be corrected well.

In the zoom lens according to the present embodiment, it is preferable that the fourth lens group G4 has a positive lens, and the positive lens has a meniscus form having a concave surface facing the image. According to this configuration, astigmatism can be corrected well.

In the zoom lens according to the present embodiment, it is preferable that the fourth lens group G4 has an aspherical surface. According to this configuration, astigmatism can be corrected well.

In the zoom lens according to the present embodiment, it is preferable that the first lens group G1 moves toward the image once, and then moves toward the object turn) upon zooming from the wide-angle end state to the telephoto end state. According to this configuration, the first lens group G1 can be moved close to the image in a zoom position near the wide angle end, where the height of the abaxial ray becomes highest, and as a result, generation of an eclipse of a part of the abaxial ray can be prevented.

In the zoom lens according to the present embodiment, it is preferable that the first lens group G1 has, in order from the object, a negative lens and a positive lens. According to this configuration, spherical aberration and lateral chromatic aberration in the telephoto end state can be corrected well.

In the zoom lens according to the present embodiment, it is preferable that focusing is performed from an object at infinity to an object at close distance by moving the fourth lens group G4 in the optical axis direction. According to this configuration, fluctuation of spherical aberration upon focusing on a close distance is decreased.

EXAMPLES IN THE SECOND EMBODIMENTS

Each example (Example 5 to Example 8) according to the second embodiment will now be described with reference to the drawings. Table 5 to Table 8 show each data of Example 5 to Example 8.

The meanings and definitions of [Lens Data], [Aspherical Data], [General Data], [Zooming Data] and [Conditional Expression] are the same as the case of the above mentioned Example 1 to Example 4 according to the first embodiment, hence description thereof is omitted.

EXAMPLE 5

Example 5 will be described with reference to FIG. 13 to FIG. 15 and Table 5. FIG. 13 is a diagram depicting a configuration of a zoom lens ZL (ZL5) according to Example 5, and zoom locus thereof from a wide-angle end state (W) to a telephoto end state (T). As FIG. 13 shows, the zoom lens ZL5 according to Example 5 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a biconvex positive lens L34.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL5 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 5 shows each data of Example 5. The surface numbers 1 to 23 in Table 5 correspond to the surfaces 1 to 23 in FIG. 13. In Example 5, the fifth surface, the eleventh surface, the twelfth surface and the eighteenth surface are formed to be aspherical.

TABLE 5

[Lens Data]

| surface number | r | d | nd | vd |
|---|---|---|---|---|
| object surface | ∞ | | | |
| 1 | 31.1714 | 0.8000 | 1.922860 | 20.88 |
| 2 | 19.9477 | 3.7000 | 1.882997 | 40.76 |
| 3 | 204.6283 | D3 | | |
| 4 | 79.4369 | 0.8000 | 1.806100 | 40.73 |
| 5(aspherical surface) | 5.7047 | 4.3000 | | |
| 6 | −11.4129 | 0.5000 | 1.804000 | 46.57 |
| 7 | 167.3430 | 0.3900 | | |
| 8 | 31.8588 | 1.5000 | 1.945944 | 17.98 |
| 9 | −40.3748 | D9 | | |
| 10(aperture stop) | ∞ | 0.3000 | | |
| 11(aspherical surface) | 8.4088 | 2.6000 | 1.693500 | 53.22 |
| 12(aspherical surface) | −46.9548 | 0.2000 | | |
| 13 | 9.3404 | 2.5500 | 1.497820 | 82.56 |
| 14 | −32.0335 | 0.5000 | 1.903660 | 31.31 |
| 15 | 6.3494 | 1.1000 | | |
| 16 | 11.2931 | 1.9500 | 1.497820 | 82.52 |
| 17 | −19.0477 | D17 | | |
| 18(aspherical surface) | 9.9161 | 1.8000 | 1.592014 | 67.02 |
| 19 | 24.0902 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

[Aspherical Data]

fifth surface $\kappa = 1.0000$, $A4 = -1.67360E-04$, $A6 = -2.69450E-06$,
$A8 = -4.17240E-09$, $A10 = -6.24740E-09$
eleventh surface $\kappa = 1.0000$, $A4 = -1.37760E-04$, $A6 = 5.02900E-07$,
$A8 = 0.00000E+00$, $A10 = 0.00000E+00$
twelfth surface $\kappa = 1.0000$, $A4 = 8.36510E-05$, $A6 = 1.56840E-06$, $A8 = 0.00000E+00$,
$A10 = 0.00000E+00$
eighteenth surface $\kappa = 1.0000$, $A4 = -1.48460E-04$, $A6 = 1.02420E-07$,
$A8 = 0.00000E+00$, $A10 = 0.00000E+00$

[General Data]
zoom ratio 4.01136

| | wide-angle end | intermediate position | intermediate position | telephoto end |
|---|---|---|---|---|
| f | 4.40000 | 6.50000 | 10.50000 | 17.65000 |
| FNo | 1.85748 | 2.05758 | 2.33332 | 2.67465 |
| ω | 44.55036 | 33.47522 | 21.12128 | 12.71826 |
| Y | 3.65000 | 4.05000 | 4.05000 | 4.05000 |
| TL | 49.26345 | 48.06344 | 51.31623 | 58.60831 |
| Bf | 0.59998 | 0.60001 | 0.60001 | 0.60002 |
| Bf(air conversion) | 4.77688 | 6.40418 | 8.82632 | 11.11292 |

[Zooming Data]

| variable distance | wide-angle end | intermediate position | intermediate position | telephoto end |
|---|---|---|---|---|
| D3 | 0.49969 | 2.79101 | 7.12071 | 12.63808 |
| D9 | 15.82231 | 9.93917 | 5.34659 | 2.30028 |
| D17 | 4.93279 | 5.69730 | 6.79084 | 9.32525 |
| D19 | 3.10867 | 4.73594 | 7.15807 | 9.44467 |

[Zoom Lens Group Data]

| group number | first surface of group | focal length of group | lens configuration length |
|---|---|---|---|
| G1 | 1 | 42.36471 | 4.50 |
| G2 | 4 | −6.53323 | 7.49 |
| G3 | 11 | 11.77596 | 8.90 |
| G4 | 18 | 27.18417 | 1.80 |

[Conditional Expression]

conditional expression (6) fw/LG1 = 0.978
conditional expression (7) fw/LG2 = 0.587
conditional expression (8) ft/fG3 = 1.499
conditional expression (9) fw/fG1 = 0.104
conditional expression (10) ft/fG1 = 0.417

As the data table in Table 5 shows, the zoom lens ZL5 according to this example satisfies all the conditional expressions (6) to (10).

Figure 14A:
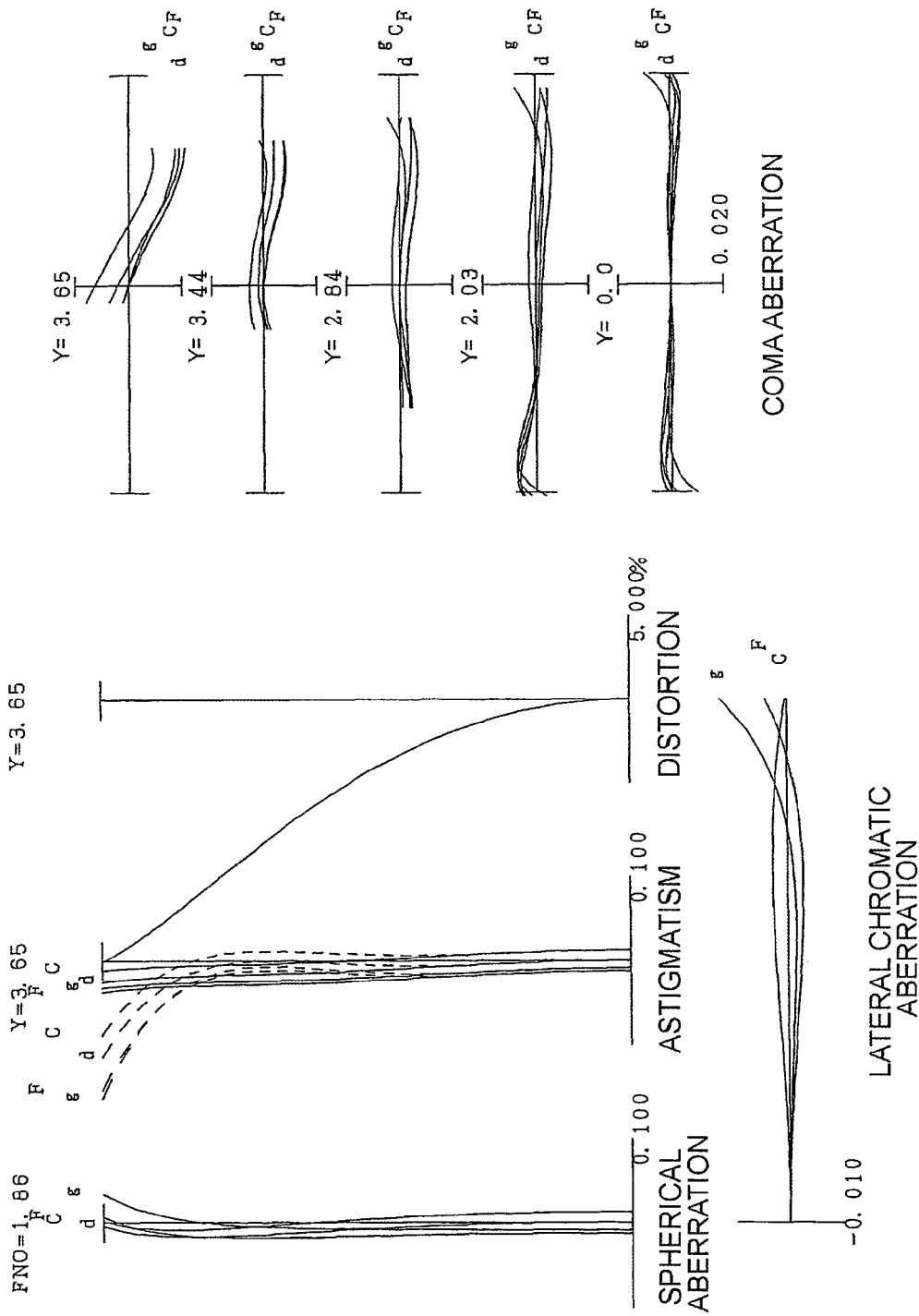
FIG. 14 are graphs showing various aberrations of the zoom lens according to Example 5, where FIG. 14A are graphs showing various aberrations of the zoom lens upon focusing on infinity in the wide-angle end state, and FIG. 14B are graphs showing various aberrations of the zoom lens upon focusing on infinity in the intermediate focal length state on the wide-angle end side.
Figure 14B:
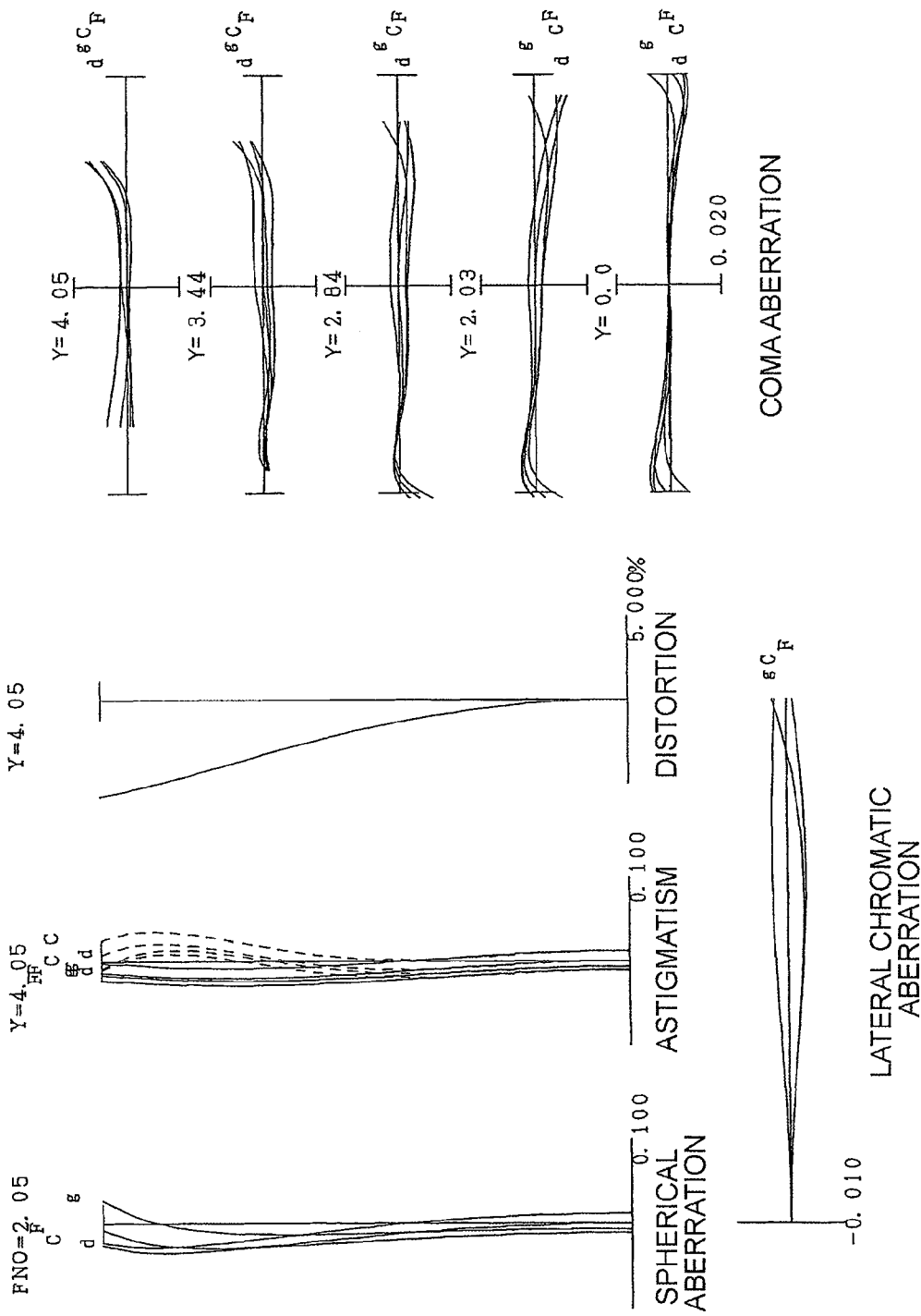
Figure 15A:
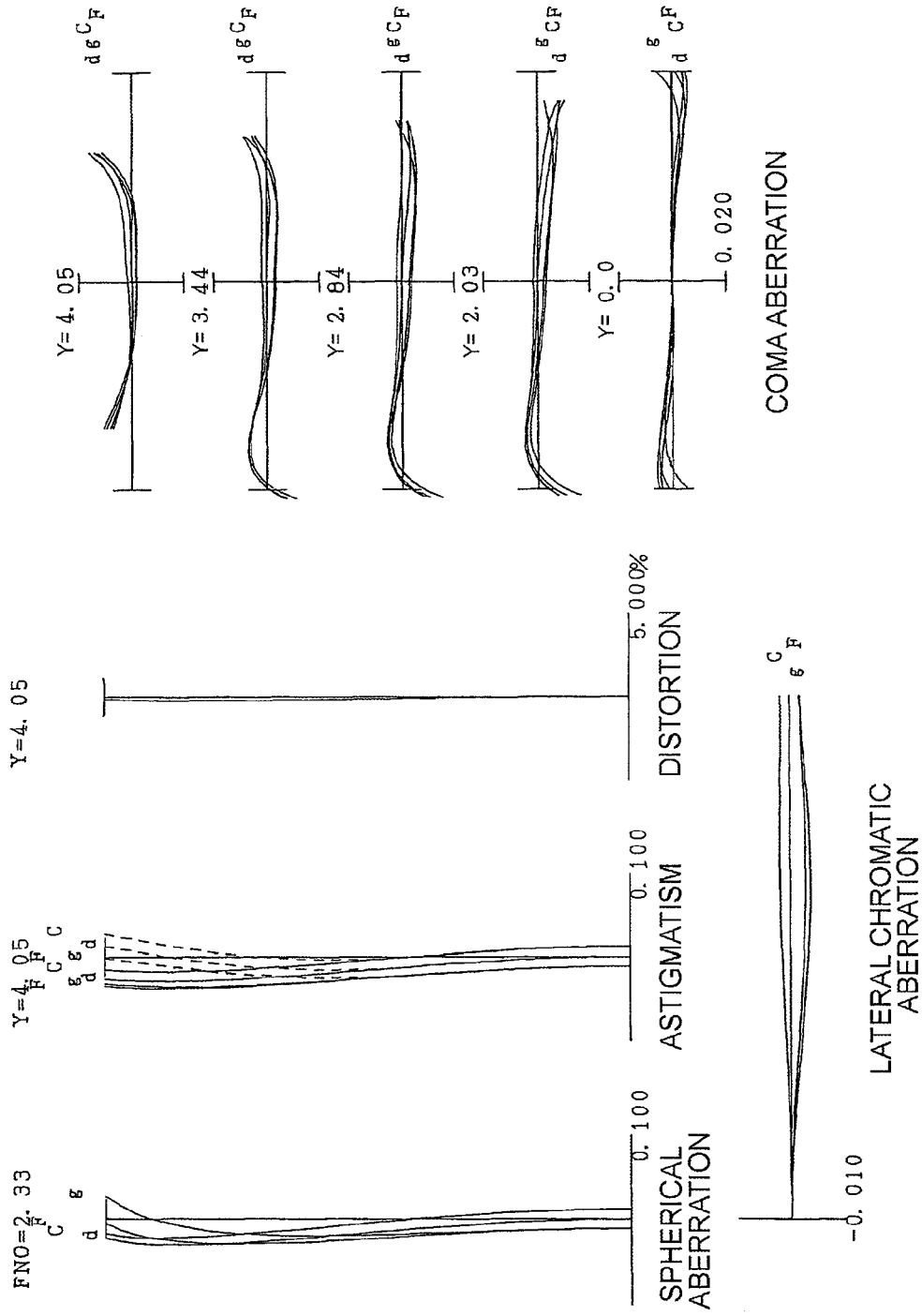
FIG. 15 are graphs showing various aberrations of the zoom lens according to Example 5, where FIG. 15A are graphs showing various aberrations of the zoom lens upon focusing on infinity in the intermediate focal length state on the telephoto end side, and FIG. 15B are graphs showing various aberrations of the zoom lens upon focusing on infinity in the telephoto end state.
Figure 15B:
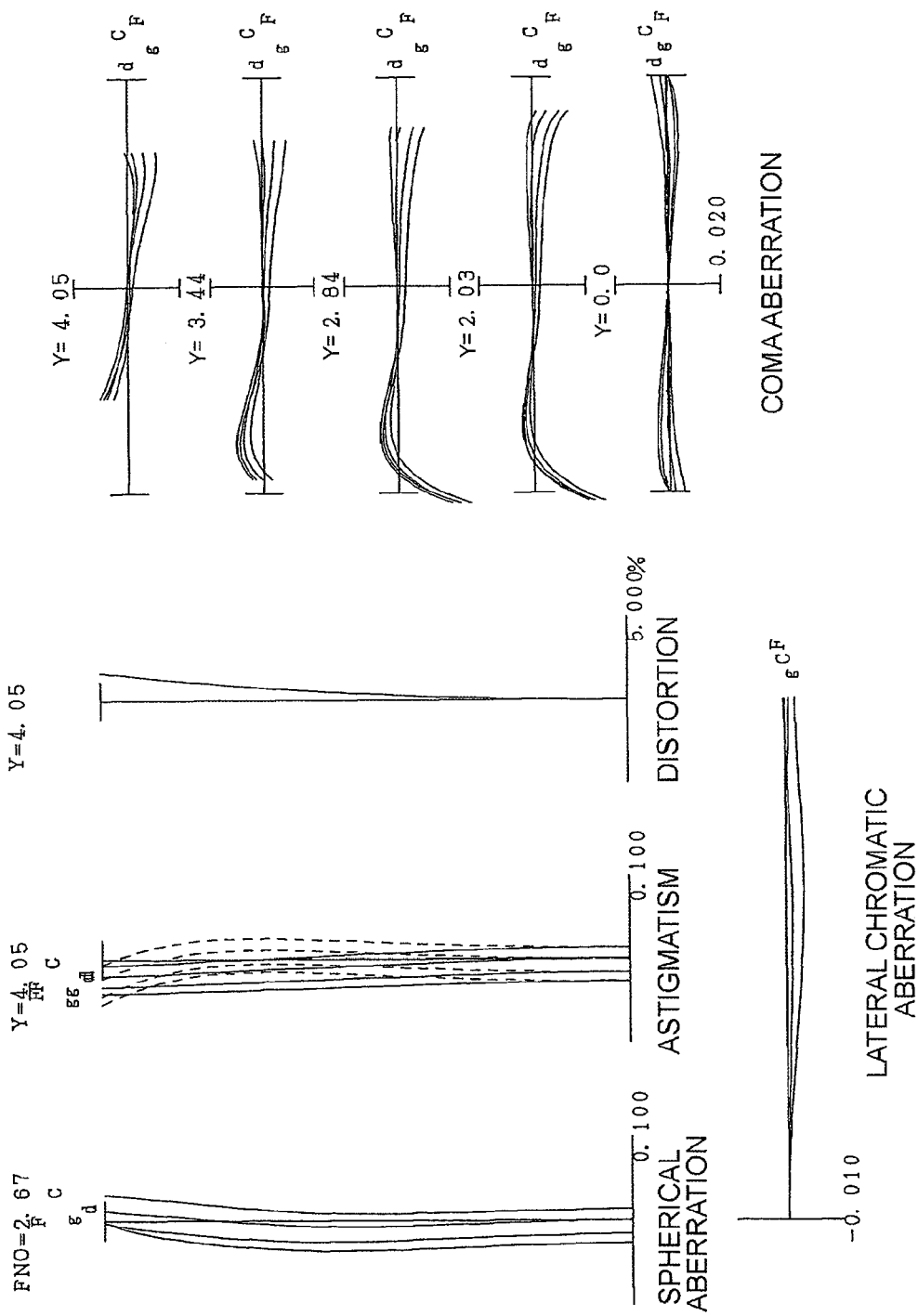

FIG. 14 to FIG. 15 are graphs showing various aberrations of the zoom lens ZL5 according to Example 5. In other words, FIG. 14A are graphs showing various aberrations of the zoom lens upon focusing on infinity in the wide-angle end state, FIG. 14B are graphs showing various aberrations of the zoom lens upon focusing on infinity in the intermediate focal length state on the wide-angle end side, FIG. 15A are graphs showing various aberrations of the zoom lens upon focusing on infinity in the intermediate focal length state on the telephoto end side, and FIG. 15B are graphs showing various aberrations of the zoom lens upon focusing on infinity in the telephoto end state.

In each graph showing aberrations, FNO indicates an F number, and Y indicates an image height. In each graph showing spherical aberrations, the solid line indicates spherical aberration. In the graph showing astigmatism, the solid line indicates the sagittal image surface, and the broken line indicates the meridional image surface. In the graph showing coma aberrations, the solid line indicates the meridional coma. The above description on the graphs showing aberrations is the same for other examples, where this description is omitted.

In Example 5, as seen in each graph showing aberrations, various aberrations are corrected well in each focal length state from the wide-angle end state to the telephoto end state, indicating the presence of excellent image forming performance.

EXAMPLE 6

Figure 16:
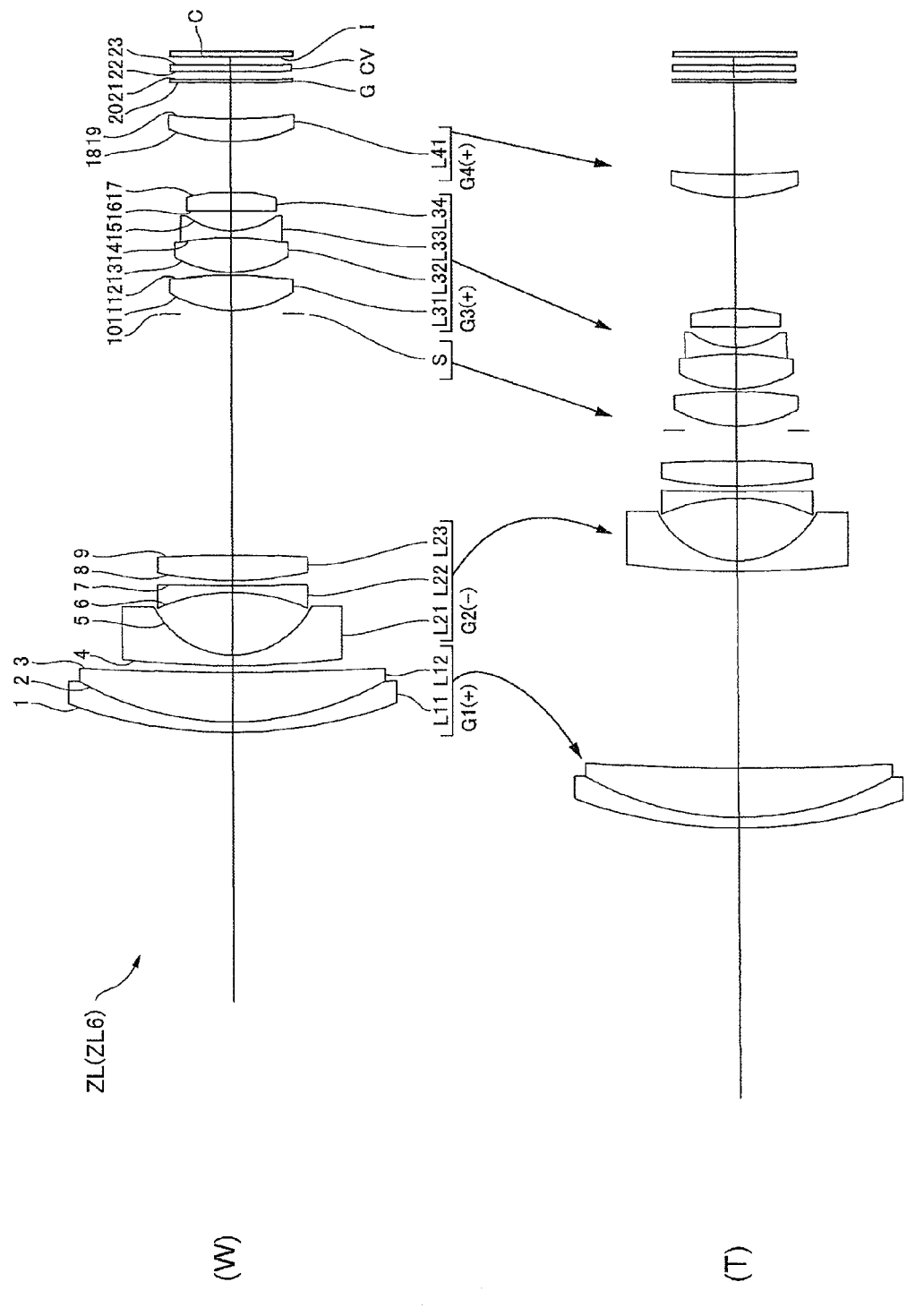
FIG. 16 is a diagram depicting a configuration of a zoom lens according to Example 6, and a zoom locus of the zoom lens from a wide-angle end state (W) to a telephoto end state (T)

Example 6 will be described with reference to FIG. 16 to FIG. 18 and Table 6. FIG. 16 is a diagram depicting a configuration of a zoom lens ZL (ZL6) according to Example 6, and zoom locus thereof from a wide-angle end state (W) to a telephoto end state (T). As FIG. 16 shows, the zoom lens ZL6 according to Example 6 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a positive meniscus lens L34 having a convex surface facing the image.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL6 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 6 shows each data of Example 6. The surface numbers 1 to 23 in Table 6 correspond to the surfaces 1 to 23 in FIG. 16. In Example 6, the fifth surface, the eleventh surface, the twelfth surface and the eighteenth surface are formed to be aspherical.

TABLE 6

[Lens Data]

| surface number | r | d | nd | vd |
|---|---|---|---|---|
| object surface | ∞ | | | |
| 1 | 35.2956 | 0.8000 | 1.922860 | 20.88 |
| 2 | 22.6544 | 3.7000 | 1.882997 | 40.76 |
| 3 | 190.7999 | D3 | | |
| 4 | 67.6303 | 0.8000 | 1.806100 | 40.71 |
| 5(aspherical surface) | 6.3565 | 4.7000 | | |
| 6 | −13.5784 | 0.5000 | 1.729157 | 54.68 |
| 7 | 228.2242 | 0.4000 | | |
| 8 | 27.0911 | 1.9000 | 1.945950 | 17.98 |
| 9 | −95.0914 | D9 | | |
| 10(aperture stop) | ∞ | 0.3000 | | |
| 11(aspherical surface) | 8.4701 | 2.6000 | 1.592010 | 67.05 |
| 12(aspherical surface) | −25.7686 | 0.2000 | | |
| 13 | 8.2954 | 2.6000 | 1.754999 | 52.32 |
| 14 | −20.1046 | 0.5000 | 1.903660 | 31.31 |
| 15 | 5.5755 | 1.5000 | | |
| 16 | −1000.0000 | 1.4000 | 1.497820 | 82.56 |
| 17 | −12.9328 | D17 | | |
| 18(aspherical surface) | 12.1411 | 1.7000 | 1.592010 | 67.05 |
| 19 | 40.9199 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

[Aspherical Data]

fifth surface

κ = 1.0000, A4 = −9.60350E−05, A6 = −2.54240E−06,
A8 = 9.11340E−08, A10 = −3.77080E−09 eleventh surface

κ = 1.0000, A4 = −1.35330E−04, A6 = 5.12240E−07,
A8 = 0.00000E+00, A10 = 0.00000E+00 twelfth surface

κ = 1.0000, A4 = 1.83340E−04, A6 = 7.99910E−07, A8 = 0.00000E+00,
A10 = 0.00000E+00 eighteenth surface

κ = 1.0000, A4 = −2.74370E−05, A6 = 1.67510E−06,
A8 = 0.00000E+00, A10 = 0.00000E+00

[General Data]
zoom ratio 4.01136

| | wide-angle end | intermediate position | intermediate position | telephoto end |
|---|---|---|---|---|
| f | 4.40000 | 6.50000 | 10.50000 | 17.65000 |
| FNo | 1.87351 | 2.05356 | 2.34281 | 2.72209 |
| ω | 44.59754 | 33.28707 | 21.09399 | 12.78630 |
| Y | 3.65000 | 4.05000 | 4.05000 | 4.05000 |
| TL | 50.51496 | 48.44739 | 50.68890 | 57.62954 |
| Bf | 0.59998 | 0.59999 | 0.59998 | 0.59999 |
| Bf(air conversion) | 4.35462 | 5.69690 | 7.38339 | 8.51813 |

[Zooming Data]

| variable distance | wide-angle end | intermediate position | intermediate position | telephoto end |
|---|---|---|---|---|
| D3 | 0.50284 | 3.52919 | 8.27342 | 14.70383 |
| D9 | 18.04769 | 11.16843 | 5.73233 | 2.28794 |
| D17 | 3.76806 | 4.21112 | 5.45801 | 8.27788 |
| D19 | 2.68640 | 4.02867 | 5.71517 | 6.84991 |

TABLE 6-continued

[Zoom Lens Group Data]

| group number | first surface of group | focal length of group | lens configuration length |
|---|---|---|---|
| G1 | 1 | 49.87397 | 4.50 |
| G2 | 4 | −7.98240 | 8.30 |
| G3 | 11 | 11.51982 | 8.80 |
| G4 | 18 | 28.53352 | 1.70 |

[Conditional Expression]

conditional expression (6) fw/LG1 = 0.978
conditional expression (7) fw/LG2 = 0.530
conditional expression (8) ft/fG3 = 1.532
conditional expression (9) fw/fG1 = 0.088
conditional expression (10) ft/fG1 = 0.354

As the data table in Table 6 shows, the zoom lens ZL6 according to this example satisfies all the conditional expressions (6) to (10).

Figure 17A:
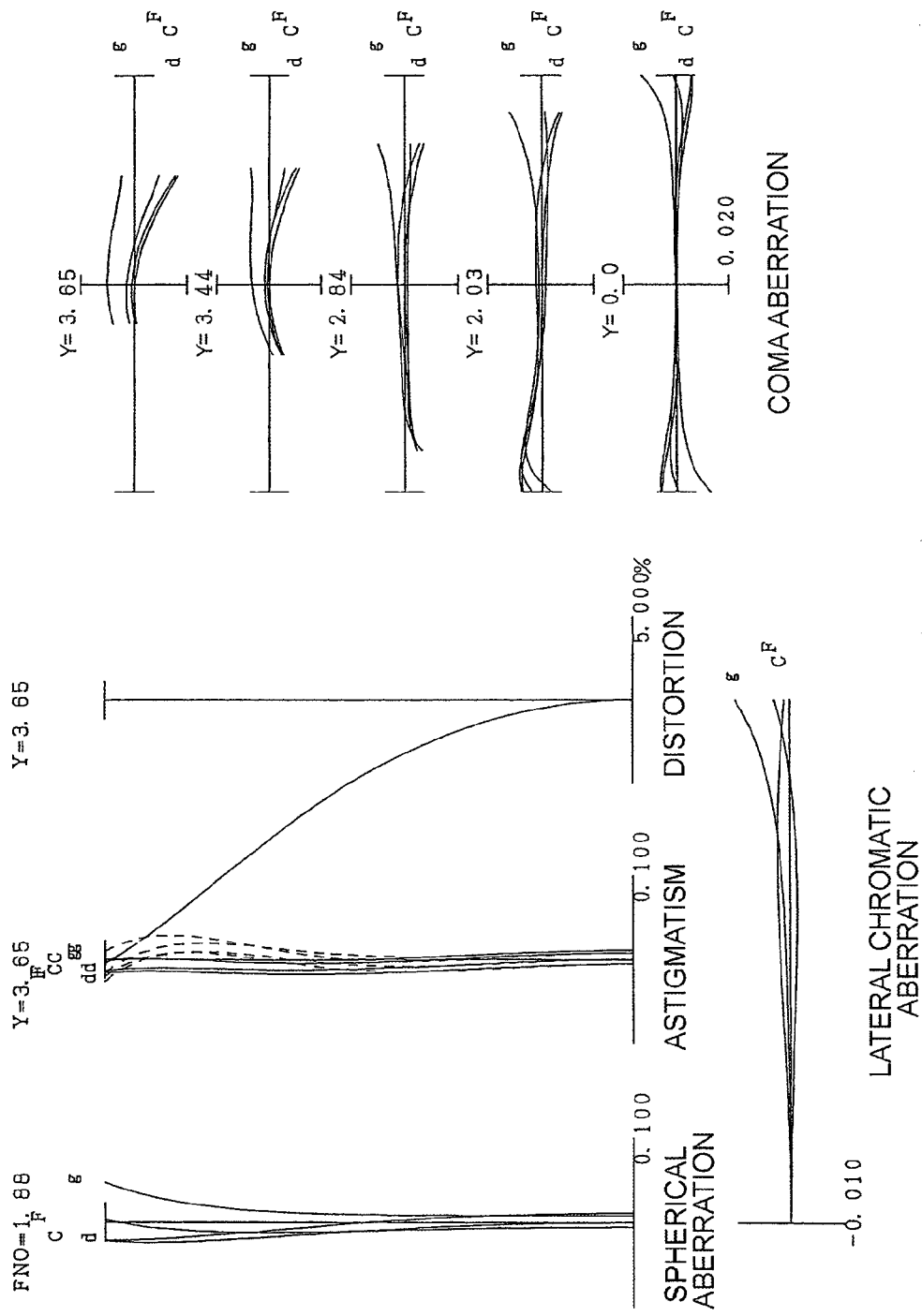
FIG. 17 are graphs showing various aberrations of the zoom lens according to Example 6, where FIG. 17A are graphs showing various aberrations of the zoom lens upon focusing on infinity in the wide-angle end state, and FIG. 17B are graphs showing various aberrations of the zoom lens upon focusing on infinity in the intermediate focal length state on the wide-angle end side.
Figure 18A:
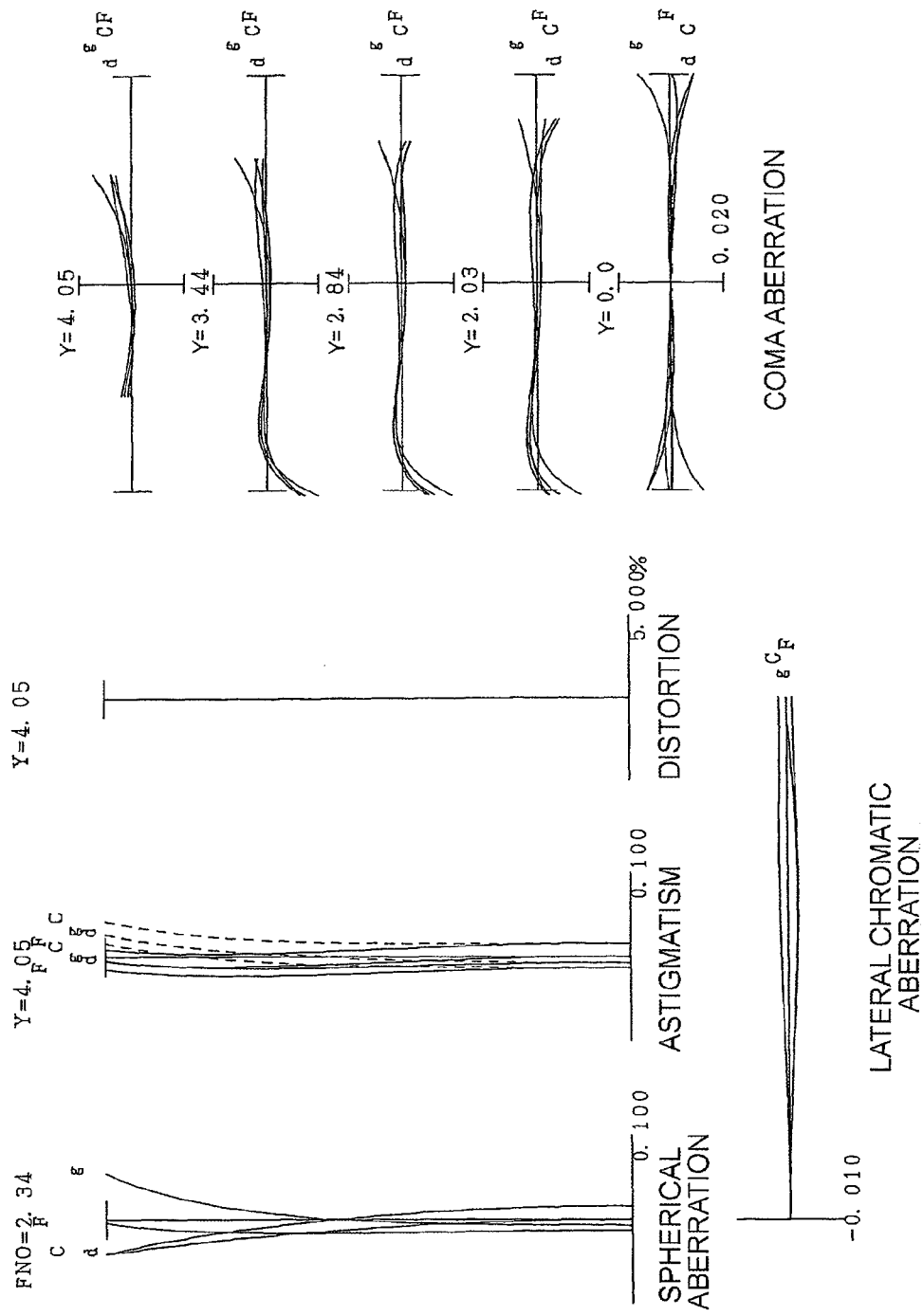
FIG. 18 are graphs showing various aberrations of the zoom lens according to Example 6, where FIG. 18A are graphs showing various aberrations of the zoom lens upon focusing on infinity in the intermediate focal length state on the telephoto end side, and FIG. 18B are graphs showing various aberrations of the zoom lens upon focusing on infinity in the telephoto end state.

FIG. 17 to FIG. 18 are graphs showing various aberrations of the zoom lens ZL6 according to Example 6. In other words, FIG. 17A are graphs showing various aberrations of the zoom lens upon focusing on infinity in the wide-angle end state, FIG. 17B are graphs showing various aberrations of the zoom lens upon focusing on infinity in the intermediate focal length state on the wide-angle end side, FIG. 18A are graphs showing various aberrations of the zoom lens upon focusing on infinity in the intermediate focal length state on the telephoto end side, and FIG. 18B are graphs showing various aberrations of the zoom lens upon focusing on infinity in the telephoto end state.

In Example 6, as seen in each graph showing aberrations, various aberrations are corrected well in each focal length state from the wide-angle end state to the telephoto end state, indicating the presence of excellent image forming performance.

EXAMPLE 7

Example 7 will be described with reference to FIG. 19 to FIG. 21 and Table 7. FIG. 19 is a diagram depicting a configuration of a zoom lens ZL (ZL7) according to Example 7, and zoom locus thereof from a wide-angle end state (W) to a telephoto end state (T). As FIG. 19 shows, the zoom lens ZL1 according to Example 7 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33, and a biconvex positive lens L34.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL7 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S and the third lens group G3 move toward the object. Moreover, the fourth lens group movers toward the object once then movers toward the image.

Table 7 shows each data of Example 7. The surface numbers 1 to 23 in Table 7 correspond to the surfaces 1 to 23 in FIG. 19. In Example 7, the fifth surface, the eleventh surface, the twelfth surface and the eighteenth surface are formed to be aspherical.

TABLE 7

[Lens Data]

| surface number | r | d | nd | vd |
|---|---|---|---|---|
| object surface | ∞ | | | |
| 1 | 39.9123 | 0.8000 | 1.922860 | 20.88 |
| 2 | 23.0576 | 3.2196 | 1.882997 | 40.76 |
| 3 | 4052.2893 | D3 | | |
| 4 | 76.7137 | 0.8000 | 1.806100 | 40.73 |
| 5(aspherical surface) | 5.5125 | 4.0878 | | |
| 6 | −12.7616 | 0.4000 | 1.754998 | 52.32 |
| 7 | 112.2377 | 0.2000 | | |
| 8 | 19.5926 | 1.5432 | 1.945944 | 17.98 |
| 9 | −148.8716 | D9 | | |
| 10(aperture stop) | ∞ | 0.3000 | | |
| 11(aspherical surface) | 7.2972 | 2.0489 | 1.693500 | 53.20 |
| 12(aspherical surface) | −29.3123 | 0.2000 | | |
| 13 | 10.7162 | 2.1519 | 1.497820 | 82.52 |
| 14 | −21.7754 | 0.4288 | 1.903658 | 31.31 |
| 15 | 6.3577 | 0.9862 | | |
| 16 | 71.0409 | 1.4296 | 1.497820 | 82.52 |
| 17 | −9.4623 | D17 | | |
| 18(aspherical surface) | 13.3200 | 1.6353 | 1.592014 | 67.02 |
| 19 | 40.0000 | D19 | | |
| 20 | ∞ | 0.2100 | 1.516330 | 64.14 |
| 21 | ∞ | 0.6000 | | |
| 22 | ∞ | 0.5000 | 1.516330 | 64.14 |
| 23 | ∞ | Bf | | |
| image plane | ∞ | | | |

[Aspherical Data]

fifth surface

κ = 1.0000, A4 = −1.73930E−04, A6 = 2.20030E−06,
A8 = −3.03460E−07, A10 = 0.00000E+00
eleventh surface κ = 1.0000, A4 = −2.22620E−04, A6 = 0.00000E+00,
A8 = 0.00000E+00, A10 = 0.00000E+00
twelfth surface κ = 1.0000, A4 = 2.22230E−04, A6 = 8.36010E−07, A8 = 0.00000E+00,
A10 = 0.00000E+00
eighteenth surface κ = 1.0000, A4 = 2.13990E−05, A6 = 0.00000E+00, A8 = 0.00000E+00,
A10 = 0.00000E+00

[General Data]
zoom ratio 6.02272

| | wide-angle end | intermediate position | intermediate position | telephoto end |
|---|---|---|---|---|
| f | 4.40000 | 6.95000 | 11.95000 | 26.49998 |
| FNo | 2.37724 | 2.77048 | 3.35120 | 4.64346 |

TABLE 7-continued

| ω | 44.29670 | 31.38125 | 18.65302 | 8.50753 |
|---|---|---|---|---|
| Y | 3.65000 | 4.05000 | 4.05000 | 4.05000 |
| TL | 47.00001 | 46.60167 | 52.08643 | 67.50003 |
| Bf | 0.60000 | 0.60001 | 0.60001 | 0.60003 |
| Bf(air conversion) | 5.54741 | 6.60484 | 8.32500 | 6.64872 |

[Zooming Data]

| variable distance | wide-angle end | intermediate position | intermediate position | telephoto end |
|---|---|---|---|---|
| D3 | 0.50000 | 3.14652 | 8.08610 | 16.69326 |
| D9 | 16.01226 | 9.79785 | 5.31731 | 2.35001 |
| D17 | 4.46719 | 6.57931 | 9.88487 | 21.33489 |
| D19 | 3.87917 | 4.93660 | 6.65675 | 4.98046 |

[Zoom Lens Group Data]

| group number | first surface of group | focal length of group | lens configuration length |
|---|---|---|---|
| G1 | 1 | 47.16497 | 4.02 |
| G2 | 4 | −6.82162 | 7.03 |
| G3 | 11 | 11.40788 | 7.25 |
| G4 | 18 | 32.98053 | 1.64 |

[Conditional Expression]

conditional expression (6) fw/LG1 = 1.095
conditional expression (7) fw/LG2 = 0.626
conditional expression (8) ft/fG3 = 2.323
conditional expression (9) fw/fG1 = 0.093
conditional expression (10) ft/fG1 = 0.562

As the data table in Table 7 shows, the zoom lens ZL7 according to this example satisfies all the conditional expressions (6) to (10).

Figure 20A:
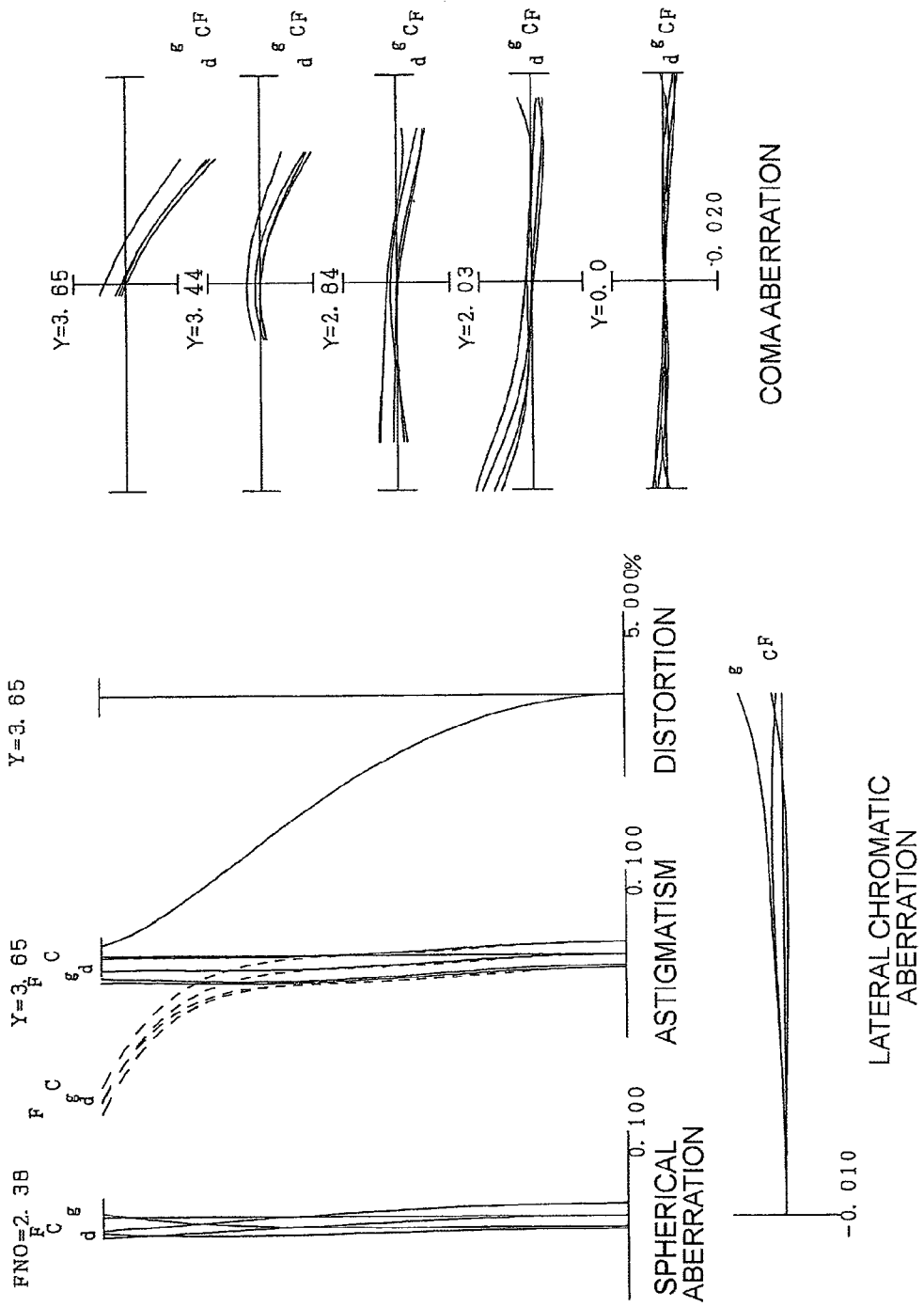
FIG. 20 are graphs showing various aberrations of the zoom lens according to Example 7, where FIG. 20A are graphs showing various aberrations of the zoom lens upon focusing on infinity in the wide-angle end state, and FIG. 20B are graphs showing various aberrations of the zoom lens upon focusing on infinity in the intermediate focal length state on the wide-angle end side.
Figure 20B:
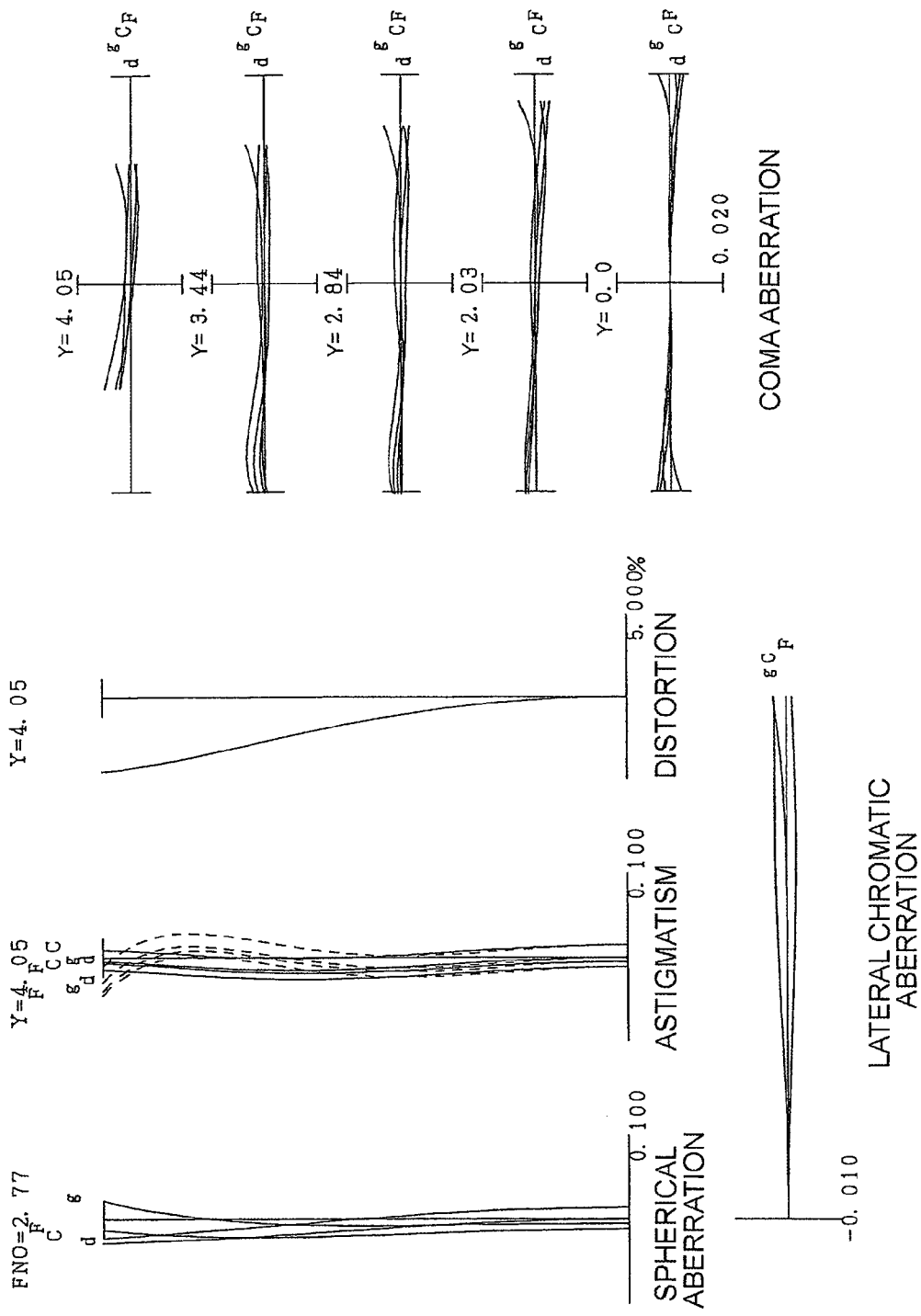
Figure 21A:
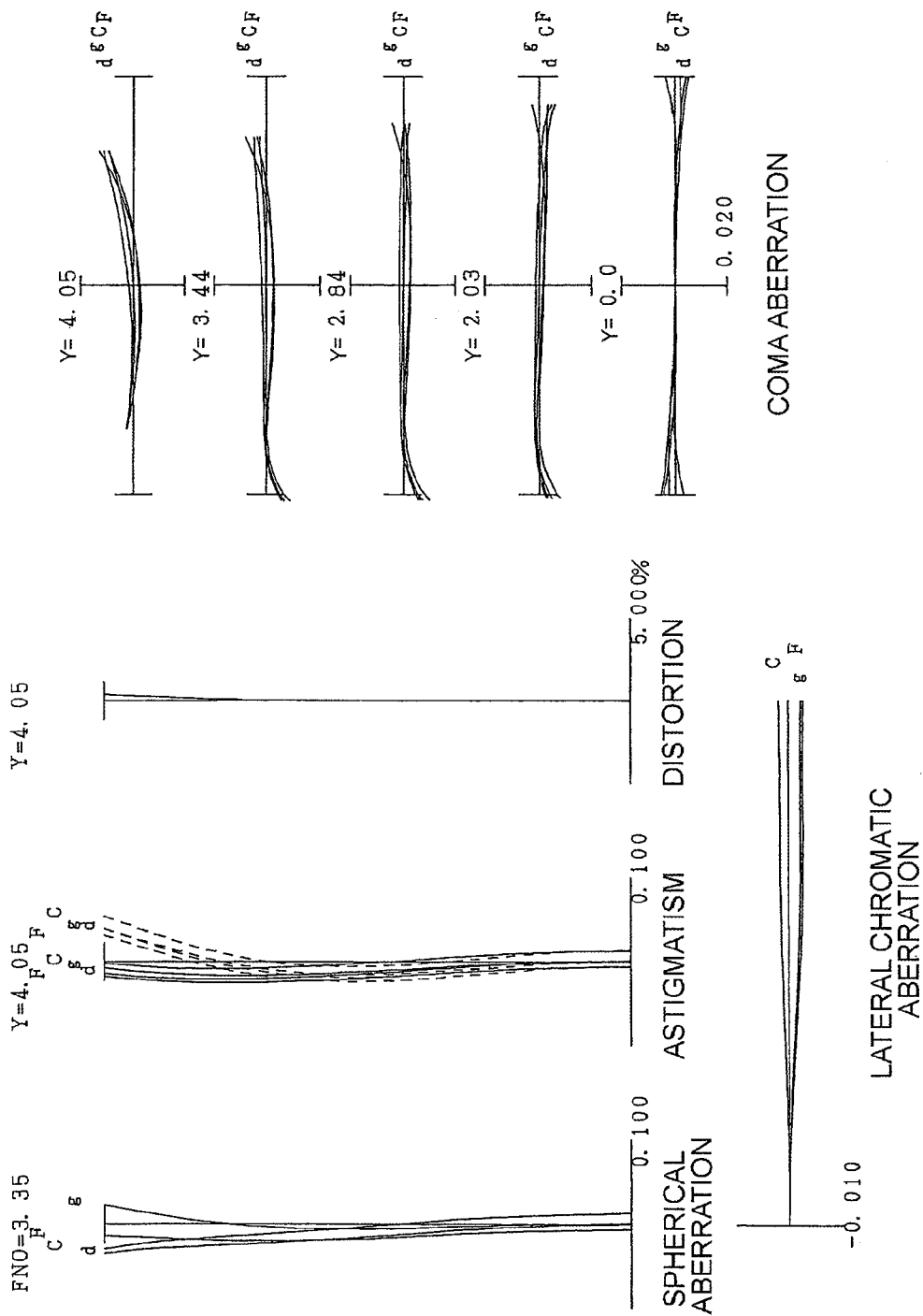
FIG. 21 are graphs showing various aberrations of the zoom lens according to Example 7, where FIG. 21A are graphs showing various aberrations of the zoom lens upon focusing on infinity in the intermediate focal length state on the telephoto end side, and FIG. 21B are graphs showing various aberrations of the zoom lens upon focusing on infinity in the telephoto end state.
Figure 21B:
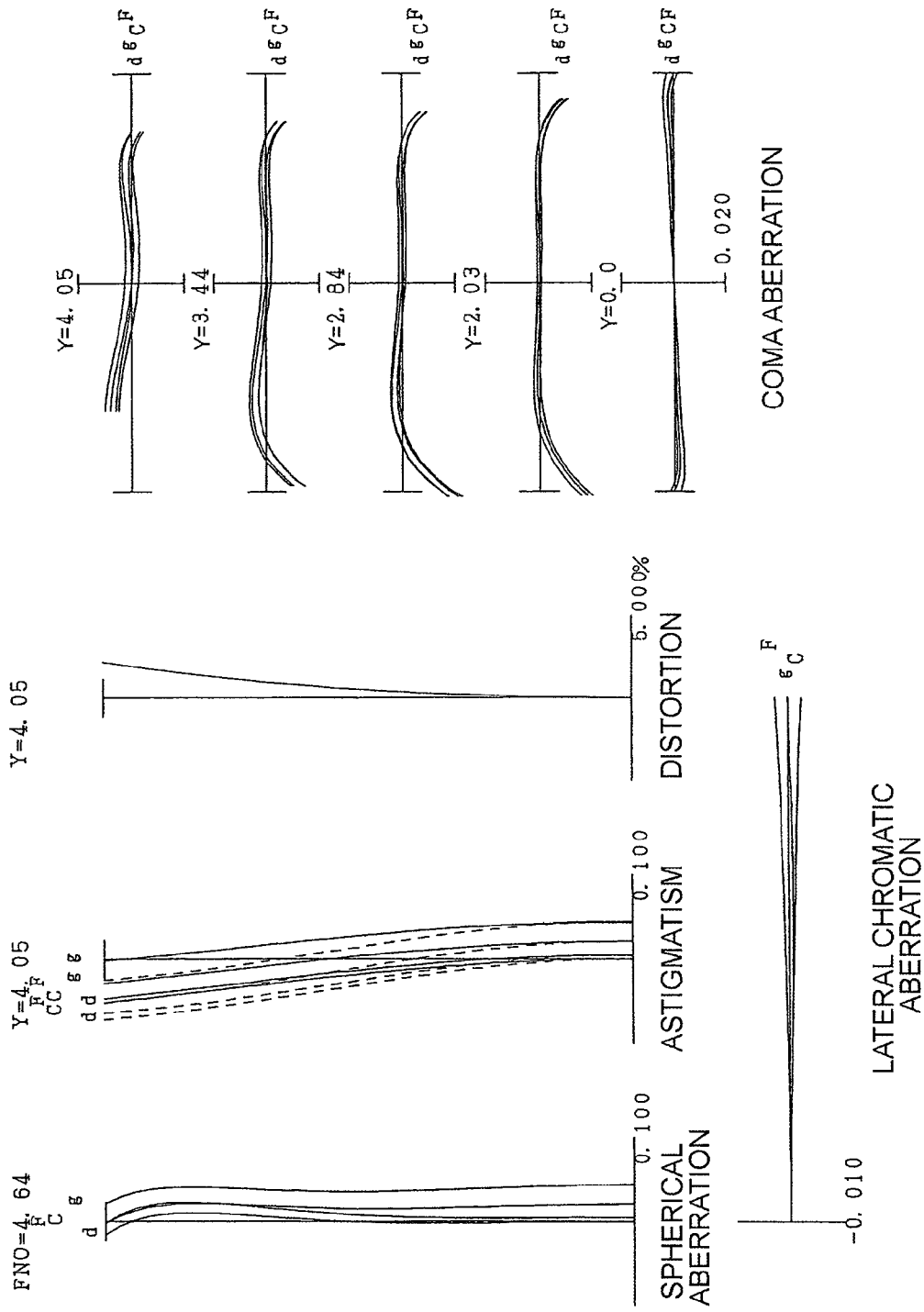

FIG. 20 to FIG. 21 are graphs showing various aberrations of the zoom lens ZL7 according to Example 7. In other words, FIG. 20A are graphs showing various aberrations of the zoom lens upon focusing on infinity in the wide-angle end state, FIG. 20B are graphs showing various aberrations of the zoom lens upon focusing on infinity in the intermediate focal length state on the wide-angle end side, FIG. 21A are graphs showing various aberrations of the zoom lens upon focusing on infinity in the intermediate focal length state on the telephoto end side, and FIG. 21B are graphs showing various aberrations of the zoom lens upon focusing on infinity in the telephoto end state.

In Example 7, as seen in each graph showing aberrations, various aberrations are corrected well in each focal length state from the wide-angle end state to the telephoto end state, indicating the presence of excellent image forming performance.

EXAMPLE 8

Example 8 will be described with reference to FIG. 22 to FIG. 24 and Table 8. FIG. 22 is a diagram depicting a configuration of a zoom lens ZL (ZL8) according to Example 8, and zoom locus thereof from a wide-angle end state (W) to a telephoto end state (T). As FIG. 22 shows, the zoom lens ZL8 according to Example 8 comprises, in order from an object, a first lens group G1 having positive refractive power, a second lens group G2 having negative refractive power, a third lens group G3 having positive refractive power and a fourth lens group G4 having positive refractive power.

The first lens group G1 is constituted by a cemented lens of, in order from the object, a negative meniscus lens L11 having a convex surface facing the object and a positive meniscus lens L12 having a convex surface facing the object.

The second lens group G2 comprises, in order from the object, a negative meniscus lens L21 having a convex surface facing the object, a biconcave negative lens L22 and a biconvex positive lens L23.

An aperture stop S for adjusting the quantity of light is disposed between the second lens group G2 and the third lens group G3.

The third lens group G3 comprises, in order from the object, a biconvex positive lens L31, a cemented lens of a biconvex positive lens L32 and a biconcave negative lens L33.

The fourth lens group G4 is constituted by a positive meniscus lens L41 having a convex surface facing the object.

Between the fourth lens group G4 and the image plane I, a glass block G, such as a low pass filter and an infrared cut-off filter, for cutting off a spatial frequency higher than the critical resolution of a picture element C (e.g. CCD, CMOS) disposed on the image plane I, and a cover glass CV of the picture element C, are disposed.

In the zoom lens ZL8 having this configuration, each of the first lens group G1 to the fourth lens group G4 and the aperture stop S move upon zooming from the wide-angle end state to the telephoto end state. At this time, the first lens group G1 and the second lens group G2 move toward the image once, then move toward the object. The aperture stop S, the third lens group G3 and the fourth lens group G4 move toward the object.

Table 8 shows each data of Example 8. The surface numbers 1 to 21 in Table 8 correspond to the surfaces 1 to 21 in FIG. 22. In Example 8, the third surface, the fifth surface, the eleventh surface, the twelfth surface, the sixteenth surface, and seventeenth surface are formed to be aspherical.

TABLE 8

[Lens Data]

| surface number | r | d | nd | vd |
|---|---|---|---|---|
| object surface | ∞ | | | |
| 1 | 50.0693 | 0.8000 | 1.922860 | 20.88 |
| 2 | 37.6780 | 3.1500 | 1.768020 | 49.23 |
| 3(aspherical surface) | −543.3419 | D3 | | |
| 4 | 81.3891 | 0.8000 | 1.806100 | 40.71 |
| 5(aspherical surface) | 7.1092 | 4.6000 | | |
| 6 | −28.8036 | 0.4000 | 1.882997 | 40.76 |
| 7 | 35.1263 | 0.2000 | | |
| 8 | 17.7515 | 2.0000 | 1.945950 | 17.98 |
| 9 | 683.8801 | D9 | | |
| 10(aperture stop) | ∞ | 0.3000 | | |
| 11(aspherical surface) | 7.0892 | 2.4000 | 1.592010 | 67.05 |
| 12(aspherical surface) | −23.8459 | 0.2000 | | |
| 13 | 7.3482 | 2.0000 | 1.754999 | 52.32 |
| 14 | −8.0530 | 0.4000 | 1.800999 | 34.97 |
| 15 | 4.4024 | D15 | | |
| 16(aspherical surface) | 12.5000 | 2.0000 | 1.743300 | 49.32 |
| 17(aspherical surface) | 68.9906 | D17 | | |
| 18 | ∞ | 0.2100 | 1.516330 | 64.14 |
| 19 | ∞ | 0.6000 | | |
| 20 | ∞ | 0.5000 | 1.516330 | 64.14 |
| 21 | ∞ | Bf | | |
| image plane | ∞ | | | |

[Aspherical Data]

third surface

κ = 1.0000, A4 = 5.69810E−08, A6 = 1.33280E−10, A8 = 0.00000E+00, A10 = 0.00000E+00 fifth surface

κ = 1.0000, A4 = −4.34700E−05, A6 = 1.62960E−06, A8 = −3.62310E−08, A10 = 0.00000E+00

TABLE 8-continued eleventh surface $\kappa = 1.0000, A4 = -2.48810E-04, A6 = 0.00000E+00,$
$A8 = 0.00000E+00, A10 = 0.00000E+00$
twelfth surface $\kappa = 1.0000, A4 = 1.74320E-04, A6 = 1.75620E-06, A8 = 0.00000E+00,$
$A10 = 0.00000E+00$
sixteenth surface $\kappa = 1.0000, A4 = -1.11210E-04, A6 = 1.23010E-07,$
$A8 = 0.00000E+00, A10 = 0.00000E+00$
seventeenth surface $\kappa = 1.0000, A4 = -1.10490E-04, A6 = 0.00000E+00,$
$A8 = 0.00000E+00, A10 = 0.00000E+00$

[General Data]
zoom ratio 4.81817

|  | wide-angle end | intermediate position | intermediate position | telephoto end |
|---|---|---|---|---|
| f | 4.40002 | 6.95003 | 11.94996 | 21.19996 |
| FNo | 2.43156 | 2.75232 | 3.18815 | 3.84569 |
| ω | 44.25227 | 31.29533 | 18.45589 | 10.58027 |
| Y | 3.65000 | 4.05000 | 4.05000 | 4.05000 |
| TL | 52.51649 | 49.42708 | 55.05101 | 66.51644 |
| Bf | 0.59988 | 0.59999 | 0.59997 | 0.59978 |
| Bf(air conversion) | 4.16308 | 5.53329 | 7.30753 | 8.19763 |

[Zooming Data]

| variable distance | wide-angle end | intermediate position | intermediate position | telephoto end |
|---|---|---|---|---|
| D3 | 0.49807 | 4.18722 | 12.31924 | 21.40722 |
| D9 | 22.18679 | 13.00892 | 6.87625 | 3.30950 |
| D15 | 6.17678 | 7.20589 | 9.05623 | 14.11032 |
| D17 | 2.49497 | 3.86506 | 5.63932 | 6.52962 |

[Zoom Lens Group Data]

| group number | first surface of group | focal length of group | lens configuration length |
|---|---|---|---|
| G1 | 1 | 63.61267 | 3.95 |
| G2 | 4 | -9.42714 | 8.00 |
| G3 | 11 | 12.24485 | 5.00 |
| G4 | 16 | 20.23265 | 2.00 |

[Conditional Expression]

conditional expression (6) fw/LG1 = 1.114
conditional expression (7) fw/LG2 = 0.550
conditional expression (8) ft/fG3 = 1.731
conditional expression (9) fw/fG1 = 0.069
conditional expression (10) ft/fG1 = 0.333

As the data table in Table 8 shows, the zoom lens ZL8 according to this example satisfies all the conditional expressions (6) to (10).

Figure 23A:
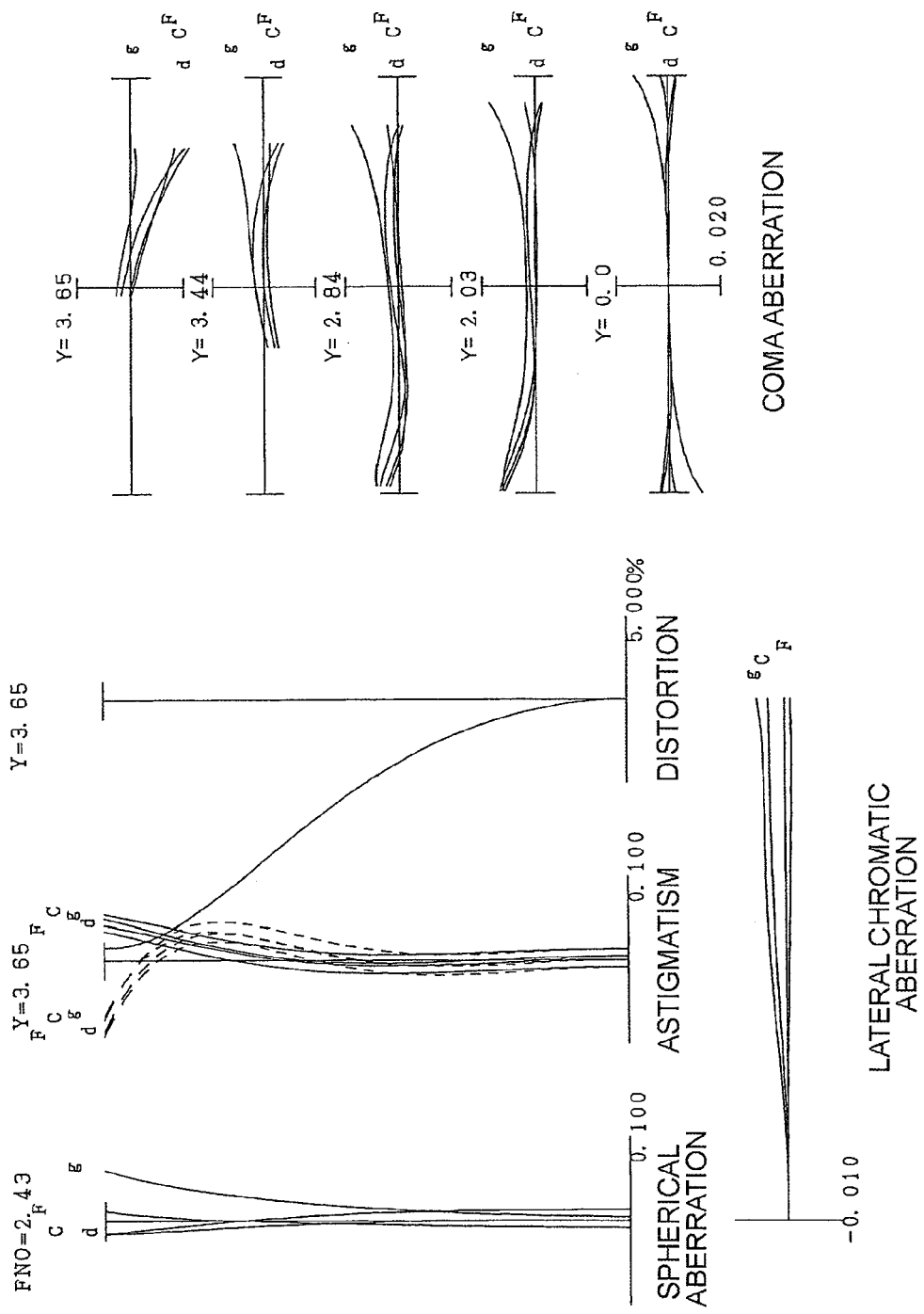
FIG. 23 are graphs showing various aberrations of the zoom lens according to Example 8, where FIG. 23A are graphs showing various aberrations of the zoom lens upon focusing on infinity in the wide-angle end state, and FIG. 23B are graphs showing various aberrations of the zoom lens upon focusing on infinity in the intermediate focal length state on the wide-angle end side.
Figure 23B:
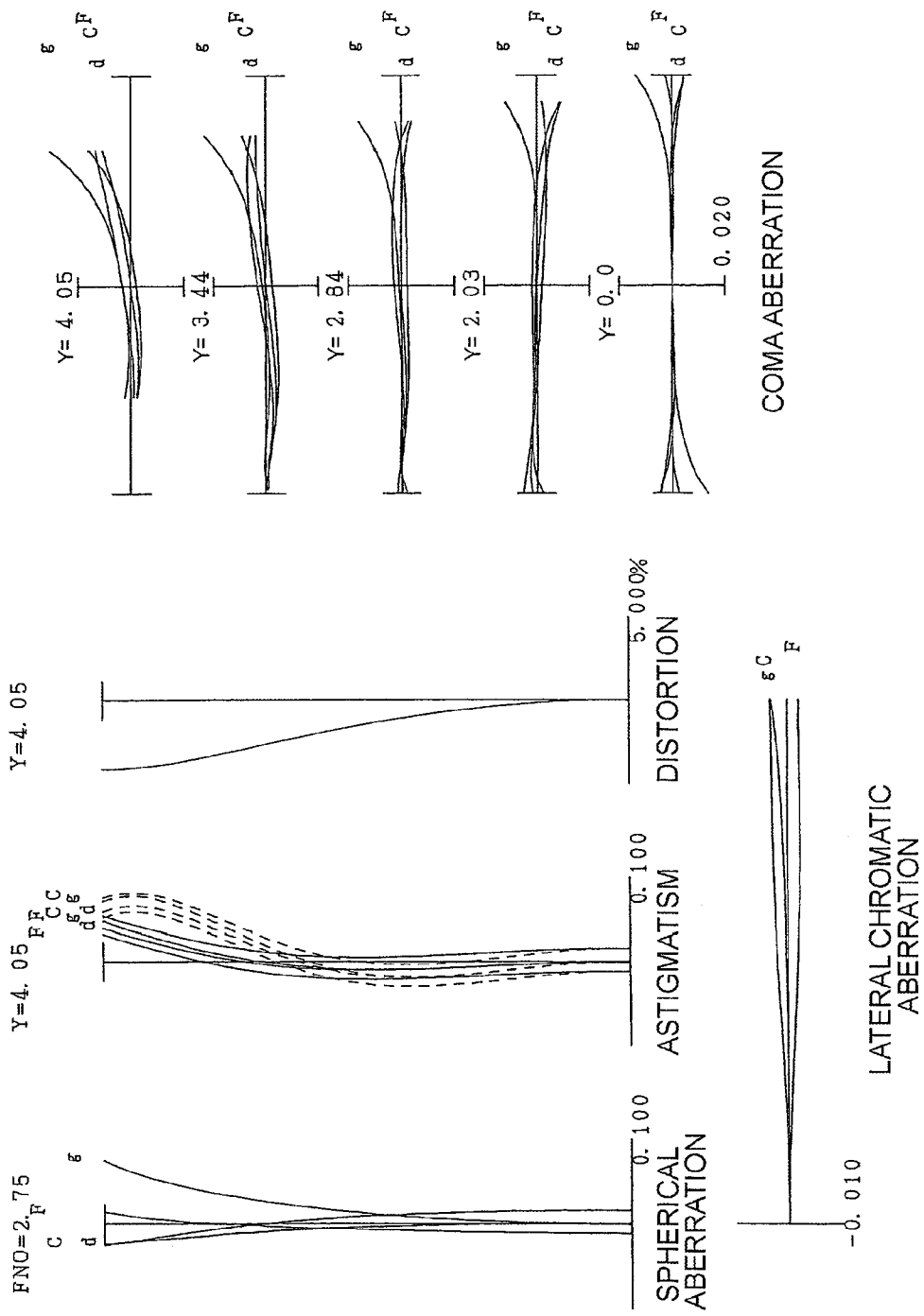
Figure 24A:
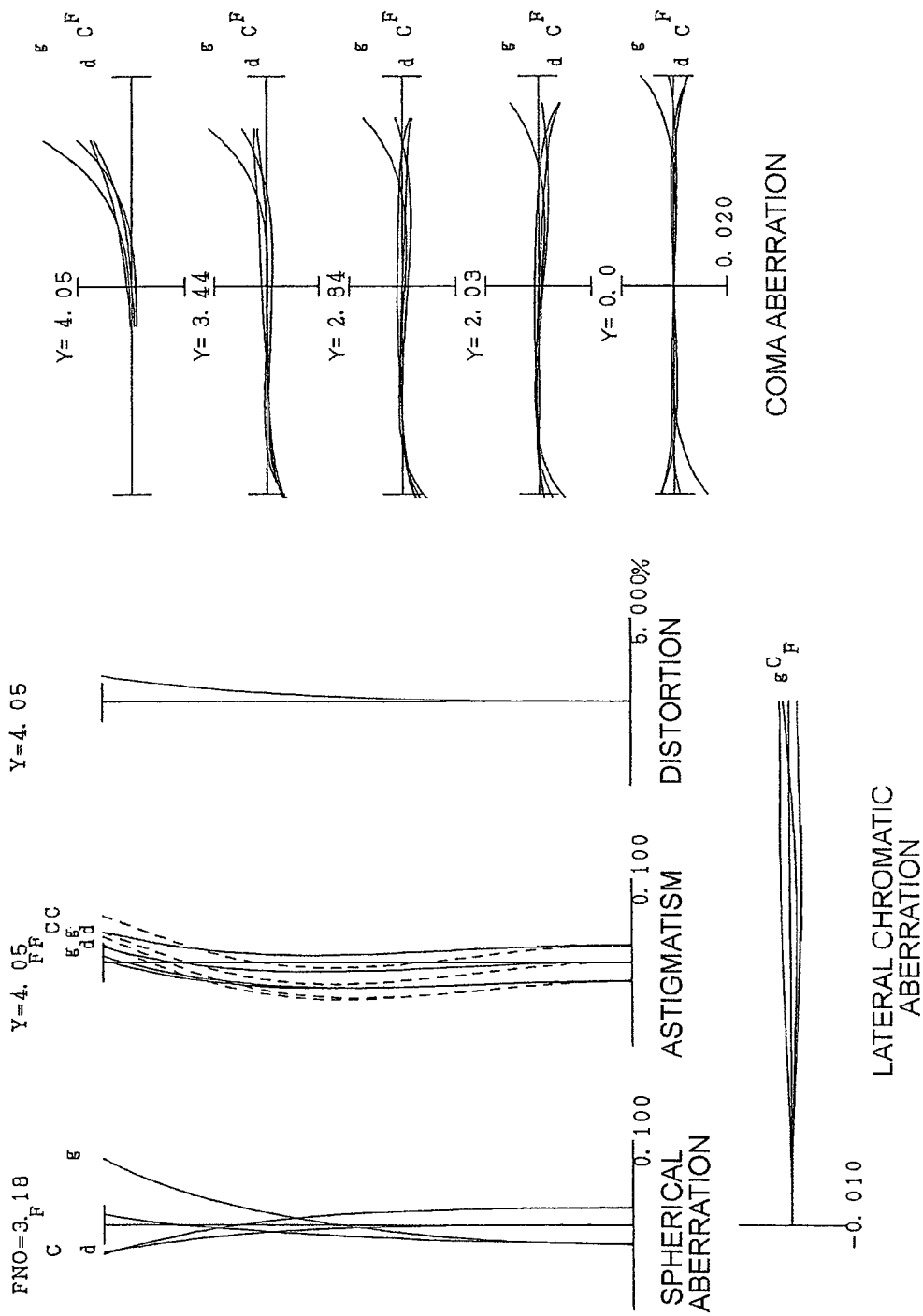
FIG. 24 are graphs showing various aberrations of the zoom lens according to Example 8, where FIG. 24A are graphs showing various aberrations of the zoom lens upon focusing on infinity in the intermediate focal length state on the telephoto end side, and FIG. 24B are graphs showing various aberrations of the zoom lens upon focusing on infinity in the telephoto end state.
Figure 24B:
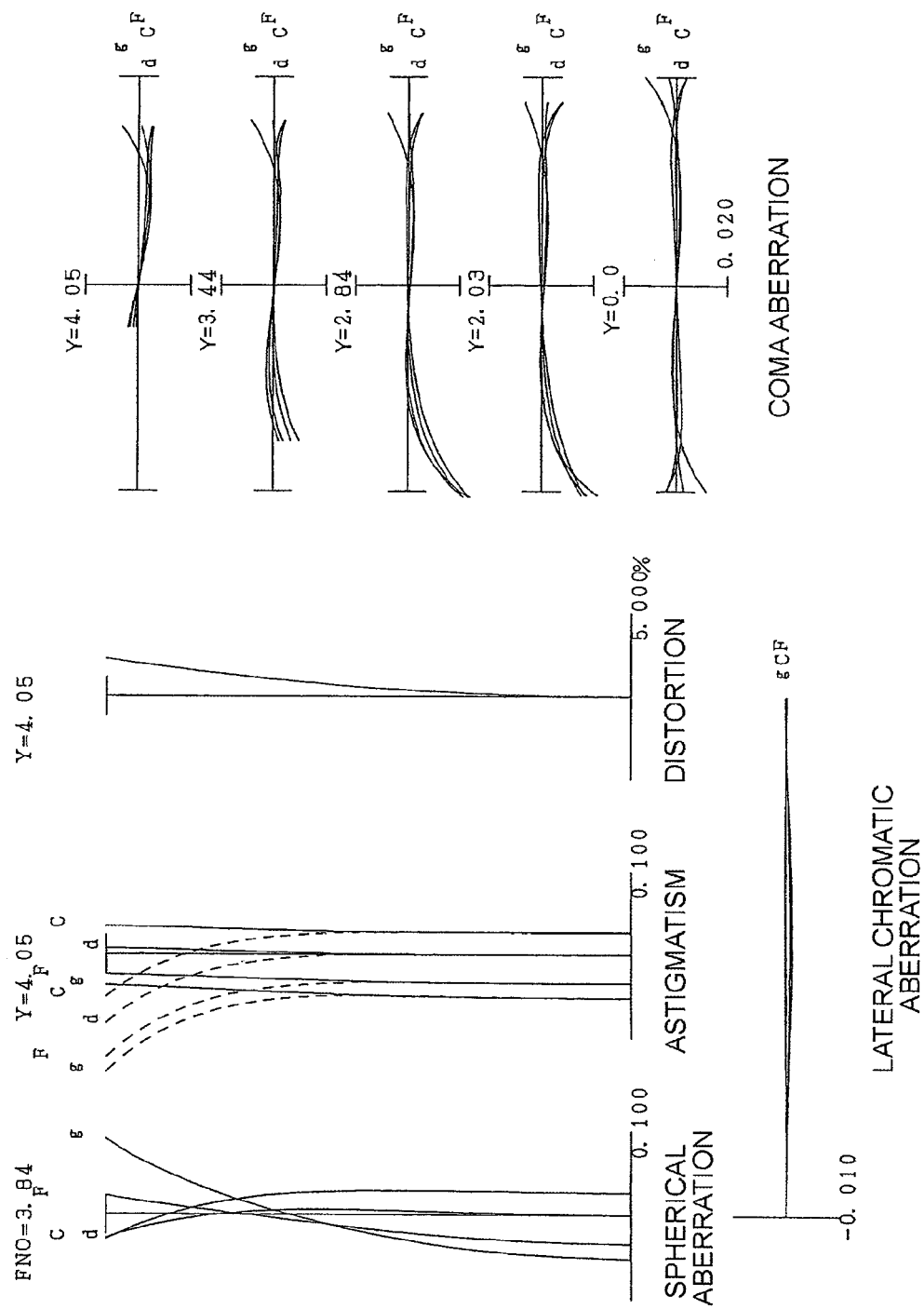

FIG. 23 to FIG. 24 are graphs showing various aberrations of the zoom lens ZL8 according to Example 8. In other words, FIG. 23A are graphs showing various aberrations of the zoom lens upon focusing on infinity in the wide-angle end state, FIG. 23B are graphs showing various aberrations of the zoom lens upon focusing on infinity in the intermediate focal length state on the wide-angle end side, FIG. 24A are graphs showing various aberrations of the zoom lens upon focusing on infinity in the intermediate focal length state on the telephoto end side, and FIG. 24B are graphs showing various aberrations of the zoom lens upon focusing on infinity in the telephoto end state.

In Example 8, as seen in each graph showing aberrations, various aberrations are corrected well in each focal length state from the wide-angle end state to the telephoto end state, indicating the presence of excellent image forming performance.

Zoom Lens Application Example

Figure 25A:
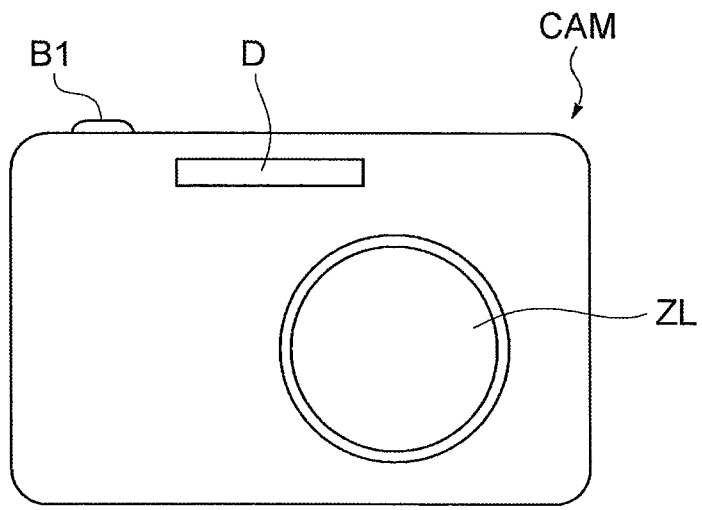
FIG. 25A is a front view of the digital still camera.
Figure 25B:
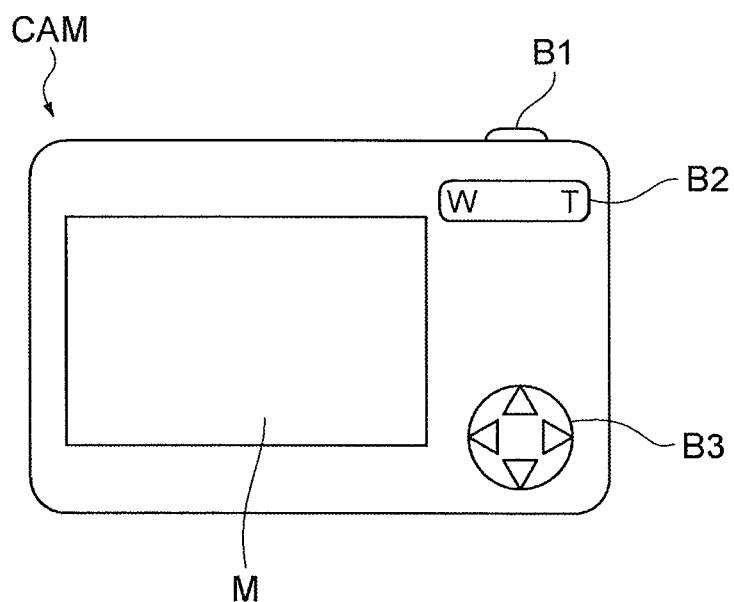
FIG. 25B is a rear view of the digital still camera.

FIG. 25 shows a digital still camera CAM (optical apparatus) having the zoom lens as an image capturing lens ZL. In this digital still camera CAM, if a power button, which is not illustrated, is pressed, a shutter, which is not illustrated, of the image-capturing lens ZL is released, lights from an object are corrected by the image-capturing lens ZL, and form an image on a picture element C (e.g. CCD, CMOS) (see FIG. 1) disposed on the image plane I (see FIG. 1). The object image formed on the picture element C is displayed on a liquid crystal monitor M disposed behind the digital still camera CAM. The user determines the composition of the object image while viewing the liquid crystal monitor 2, then presses a release button B1 to capture the object image by the picture element C, and stores it in memory, which is not illustrated.

This camera CAM includes an auxiliary light emitting unit D, which emits auxiliary light when the object is dark, a wide (W)-tele (T) button B2 for zooming the image capturing lens ZL from a wide-angle end state (W) to the telephoto end state (T), and a function button B3, which is used for setting various conditions for the digital still camera CAM.

Figure 26:
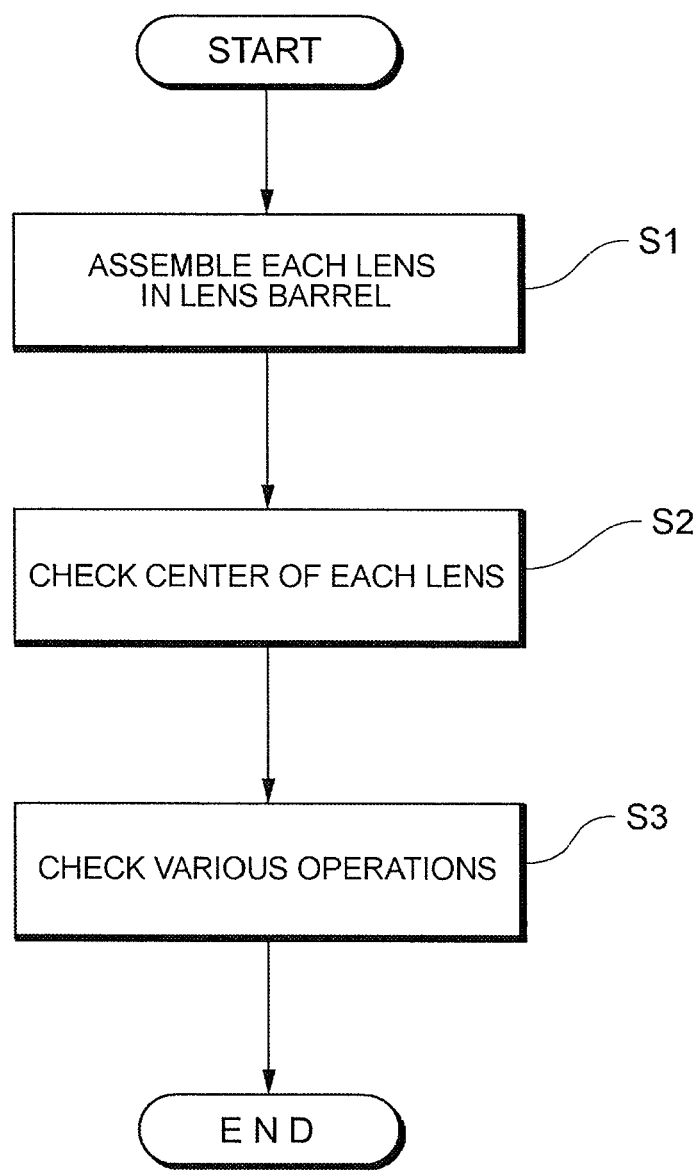
FIG. 26 is a flow chart depicting a method of manufacturing the zoom lens.

Now a method of manufacturing the zoom lens having the above configuration will be described with reference to FIG. 26. First each lens (lenses L11 to L41 in FIG. 1) are assembled in a lens barrel (step S1). When each lens is assembled in the lens barrel, each lens may be assembled in the lens barrel one at a time in order along the optical axis, or a part or all of the lenses may be integratedly held on a holding member, and then assembled in the lens barrel member. After assembling each lens in the lens barrel, it is confirmed whether the object image is formed in a state where each lens is assembled in the lens barrel, that is, whether the center of each lens is aligned (step S2). Then the various operations of the zoom lens are confirmed (step S3). Examples of the various operations are: a zoom operation in which lens groups for zooming from the wide-angle end state to the telephoto end state (each of the first lens group G1 to the fourth lens group G4 in this embodiment) move along the optical axis; a focusing operation in which a lens group which performs focusing from an object at a long distance to an object at a short distance (fourth lens group G4 in this embodiment) move along the optical axis; and a hand motion blur correction operation in which at least a part of the lenses move so as to have components orthogonal to the optical axis. The sequence of confirming the various operations are arbitrary.

In the above embodiments, the following content can be adopted within a range where the optical performance is not diminished.

In each of the examples, a zoom lens comprised of four lens groups was shown, but the present invention can also be applied to a configuration comprising a different number of lens groups, such as five groups or six groups. In the configuration, a lens or a lens group may be added to the side closest to the object, or a lens or a lens group may be added to th side closest to the image. A lens group refers to a portion having at least one lens isolated by an air distance which changes upon zooming.

A single or a plurality of lens group(s) or a partial lens group may be designed to be a focusing lens group which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the fourth lens group G4 is designed to be the focusing lens group.

In the present embodiment, a lens group or a partial lens group may be designed to be a vibration-isolating lens group, which corrects image blurs generated by hand motion by vibrating the lens group or the partial lens group in a direction orthogonal to the optical axis, or rotating (oscillating) the lens group or the partial lens group in an in-plane direction including the optical axis. It is particularly preferable that at least a part of the third lens group G3 is designed to be the vibration-isolating lens group.

In the present embodiment, the lens surface may be formed to be a spherical surface or a plane, or an aspherical surface. If the lens surface is a spherical surface or a plane, then lens processing, assembly and adjustment are easy, and deterioration of optical performance, due to an error in processing, assembly and adjustment, can be prevented, which is desirable. Furthermore, even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite-aspherical surface generated by forming resin on the surface of the glass to be an aspherical shape. The lens surface may be a diffraction surface, and the lens may be a refractive index distributed lens (GRIN lens) or plastic lens.

In the present embodiment, it is preferable that the aperture stop S is disposed near the third lens group G3, but the role of the aperture stop may be substituted by the frame of the lens, without disposing a separate element as the aperture stop.

In the present embodiment, each lens surface may be coated by an anti-reflection film which has high transmittance in a wide wavelength range, in order to decrease flares and ghosts, and implement a high optical performance with high contrast.

The zoom ratio of the zoom lens (variable power optical system) of the present embodiment is about 3 to 10.

In the zoom lens (variable power optical system) of the present embodiment, it is preferable that the first lens group G1 has one positive lens component.

In the zoom lens (variable power optical system) of the present embodiment, it is preferable that the second lens group G2 has one positive lens component and two negative lens components. It is preferable that the lens components are disposed to be negative, negative and positive, in order from the object, with maintaining an air distance therebetween respectively.

In the zoom lens (variable power optical system) of the present embodiment, it is preferable that the third lens group G3 has two positive lens components and one negative lens component. It is preferable that the lens components are disposed to be positive, negative and positive, in order from the object, with maintaining an air distance therebetween respectively.

In the zoom lens (variable power optical system) of the present embodiment, it is preferable that the fourth lens group G4 has one positive lens component.

Embodiments were described using the configuration requirements in order to assist understanding of the present invention, but needless to say, the present invention is not limited to this embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A zoom lens comprising, in order from an object:
a first lens group having positive refractive power; a second lens group having negative refractive power; a third lens group having positive refractive power; and a fourth lens group having positive refractive power,
the first group moving toward an image once then moving toward the object, upon zooming from a wide-angle end state to a telephoto end state, and
the following conditional expressions being satisfied:

$$0.070 < fw/TLw < 0.100$$

$$0.301 \leq ft/TLt < 0.40$$

$$0.10 < fw/LG2 < 0.64$$

where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, and LG2 denotes a lens configuration length of the second lens group.

2. The zoom lens according to claim 1, wherein the following conditional expression is satisfied:

$$0.01 < fw/fG1 < 0.11$$

where fG1 denotes a focal length of the first lens group.

3. The zoom lens according to claim 1, wherein the following conditional expression is satisfied:

$$0.3 < ft/fG1 < 1.0$$

where fG1 denotes a focal length of the first lens group.

4. The zoom lens according to claim 1, wherein the following conditional expression is satisfied:

$$0.75 < fw/LG1 < 1.24$$

where LG1 denotes a lens configuration length of the first lens group.

5. The zoom lens according to claim 1, wherein the following conditional expression is satisfied:

$$1.25 < ft/fG3 < 4.00$$

where fG3 is a focal length of the third lens group.

6. The zoom lens according to claim 1, wherein each of the first lens group, the second lens group, the third lens group and the fourth lens group moves, upon zooming from the wide-angle end state to the telephoto end state.

7. The zoom lens according to claim 1, wherein the first lens group is constituted only by a cemented lens.

8. The zoom lens according to claim 1, wherein the fourth lens group is constituted only by a single lens.

9. The zoom lens according to claim 1, wherein the fourth lens group has a positive lens, and the positive lens has a meniscus form.

10. The zoom lens according to claim 1, wherein the fourth lens group has a positive lens, and the positive lens has a meniscus form having a concave surface facing the image.

11. The zoom lens according to claim 1, wherein the fourth lens group has an aspherical surface.

12. The zoom lens according to claim 1, wherein the first lens group has, in order from the object, a negative lens and a positive lens.

13. The zoom lens according to claim 1, wherein focusing from an object at infinity to an object at close distance is performed by moving the fourth lens group in an optical axis direction.

14. An optical apparatus comprising the zoom lens according to claim 1.

15. A method of manufacturing a zoom lens having, in order from an object: a first lens group having positive refractive power; a second lens group having negative refractive power; a third lens group having positive refractive power; and a fourth lens group having positive refractive power, the method comprising:
   moving the first lens group toward an image once then moving the same toward the object, upon zooming from a wide-angle end state to a telephoto end state, and
   assembling each lens in a lens barrel and confirming operation so that the following conditional expressions are satisfied:

$0.070 < fw/TLw < 0.100$ $0.301 \leq ft/TLt < 0.40$ $0.10 < fw/LG2 < 0.64$ where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, and LG2 denotes a lens configuration length of the second lens group.

16. The method of manufacturing the zoom lens according to claim 5, wherein the following conditional expression is satisfied:

$0.01 < fw/fG1 < 0.11$ where fG1 denotes a focal length of the first lens group.

17. The method of manufacturing the zoom lens according to claim 5, wherein the following conditional expression is satisfied:

$0.3 < ft/fG1 < 1.0$ where fG1 denotes a focal length of the first lens group.

18. The method of manufacturing the zoom lens according to claim 5, wherein the following conditional expression is satisfied:

$0.75 < fw/LG1 < 1.24$ where LG1 denotes a lens configuration length of the first lens group.

19. The method of manufacturing the zoom lens according to claim 5, wherein the following conditional expression is satisfied:

$1.25 < ft/fG3 < 4.00$ where fG3 is a focal length of the third lens group.

20. A zoom lens comprising, in order from an object:
   a first lens group having positive refractive power; a second lens group having negative refractive power; a third lens group having positive refractive power; and a fourth lens group having positive refractive power,
   the first group moving toward an image once then moving toward the object, upon zooming from a wide-angle end state to a telephoto end state, and
   the following conditional expressions being satisfied:

$0.050 < fw/TLw < 0.100$ $0.301 \leq ft/TLt < 0.80$ $0.10 < fw/LG2 < 0.64$ $0.3 < ft/fG1 < 1.0$ where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, LG2 denotes a lens configuration length of the second lens group, and fG1 denotes a focal length of the first lens group.

21. A zoom lens comprising, in order from an object:
   a first lens group having positive refractive power; a second lens group having negative refractive power; a third lens group having positive refractive power; and a fourth lens group having positive refractive power,
   the first group moving toward an image once then moving toward the object, upon zooming from a wide-angle end state to a telephoto end state, and
   the following conditional expressions being satisfied:

$0.050 < fw/TLw < 0.100$ $0.301 \leq ft/TLt < 0.80$ $0.10 < fw/LG2 < 0.64$ $0.75 < fw/LG1 < 1.24$ where fw denotes a focal length of the zoom lens in the wide-angle end state, ft denotes a focal length of the zoom lens in the telephoto end state, TLw denotes a total length of the zoom lens in the wide-angle end state, TLt denotes a total length of the zoom lens in the telephoto end state, LG2 denotes a lens configuration length of the second lens group, and LG1 denotes a lens configuration length of the first lens group.

22. A zoom lens comprising, in order from an object:
   a first lens group having positive refractive power; a second lens group having negative refractive power; a third lens group having positive refractive power; and a fourth lens group having positive refractive power, and
   the following conditional expressions being satisfied:

$0.75 < fw/LG1 < 1.24$ $0.530 \leq fw/LG2 < 0.64$ $1.499 \leq ft/fG3 < 2.45$ where fw denotes a focal length of the zoom lens in a wide-angle end state, ft denotes a focal length of the zoom lens in a telephoto end state, LG1 denotes a lens configuration length of the first lens group, LG2 denotes a lens configuration length of the second lens group, and fG3 denotes a focal length of the third lens group, and
   wherein the following conditional expression is also satisfied:

$0.01 < fw/fG1 < 0.11$ where fG1 denotes a focal length of the first lens group.

23. The zoom lens according to claim 22, wherein the following conditional expression is satisfied:

$0.3 < ft/fG1 < 1.0$ where fG1 denotes a focal length of the first lens group.

24. An optical apparatus comprising the zoom lens according to claim 22.

25. A zoom lens comprising, in order from an object:
a first lens group having positive refractive power; a second lens group having negative refractive power; a third lens group having positive refractive power; and a fourth lens group having positive refractive power, and
the following conditional expressions being satisfied:

$0.75 < fw/LG1 < 1.24$ $0.530 \leq fw/LG2 < 0.64$ $1.25 < ft/fG3 < 2.45$ where fw denotes a focal length of the zoom lens in a wide-angle end state, ft denotes a focal length of the zoom lens in a telephoto end state, LG1 denotes a lens configuration length of the first lens group, LG2 denotes a lens configuration length of the second lens group, and fG3 denotes a focal length of the third lens group, and
wherein the following conditional expression is also satisfied:

$0.333 \leq ft/fG1 < 1.0$ where fG1 denotes a focal length of the first lens group.

26. A method of manufacturing a zoom lens having, in order from an object:
a first lens group having positive refractive power; a second lens group having negative refractive power; a third lens group having positive refractive power; and a fourth lens group having positive refractive power,
the method comprising assembling each lens and a lens barrel and confirming operation so that the following conditional expressions are satisfied:

$0.75 < fw/LG1 < 1.24$ $0.530 \leq fw/LG2 < 0.64$ $1.499 \leq ft/fG3 < 2.45$ where fw denotes a focal length of the zoom lens in a wide-angle end state, ft denotes a focal length of the zoom lens in a telephoto end state, LG1 denotes a lens configuration length of the first lens group, LG2 denotes a lens configuration length of the second lens group, and fG3 denotes a focal length of the third lens group, and
wherein the following conditional expression is also satisfied:

$0.01 < fw/fG1 < 0.11$ where fG1 denotes a focal length of the first lens group.

27. The method of manufacturing the zoom lens according to claim 26, wherein the following conditional expression is satisfied:

$0.3 < ft/fG1 < 1.0$ where fG1 denotes a focal length of the first lens group.

* * * * *